(12) United States Patent
Thompson

(10) Patent No.: US 12,529,075 B2
(45) Date of Patent: Jan. 20, 2026

(54) PLASMID ENCODING A NGF AND Fc FUSION PROTEIN

(71) Applicant: Wyvern Pharmaceuticals Inc., Calgary (CA)

(72) Inventor: Bradley G. Thompson, Calgary (CA)

(73) Assignee: Wyvern Pharmaceuticals Inc., Calgary (CA)

( * ) Notice: Subject to any disclaimer, the term of this patent is extended or adjusted under 35 U.S.C. 154(b) by 0 days.

(21) Appl. No.: 18/964,155

(22) Filed: Nov. 29, 2024

(65) Prior Publication Data

US 2025/0263744 A1  Aug. 21, 2025

Related U.S. Application Data

(62) Division of application No. 18/582,222, filed on Feb. 20, 2024, now Pat. No. 12,416,020.

(51) Int. Cl.
| | |
|---|---|
| C12N 15/00 | (2006.01) |
| C07K 14/48 | (2006.01) |
| C07K 14/62 | (2006.01) |
| C07K 14/705 | (2006.01) |
| C12N 9/22 | (2006.01) |
| C12N 15/86 | (2006.01) |

(52) U.S. Cl.
CPC .............. *C12N 15/86* (2013.01); *C07K 14/48* (2013.01); *C07K 14/62* (2013.01); *C07K 14/705* (2013.01); *C07K 14/70596* (2013.01); *C12N 9/22* (2013.01); *C07K 2319/30* (2013.01); *C12N 2750/14143* (2013.01); *C12N 2800/00* (2013.01)

(58) Field of Classification Search
None
See application file for complete search history.

(56) References Cited

U.S. PATENT DOCUMENTS

| | | | |
|---|---|---|---|
| 8,841,416 | B2 | 9/2014 | Ledbetter |
| 11,085,055 | B2 | 8/2021 | Mallol et al. |
| 11,162,102 | B2 | 11/2021 | Minshull et al. |
| 11,359,001 | B2 | 6/2022 | Lancaster |
| 11,530,423 | B1 | 12/2022 | Thompson |
| 11,873,505 | B2 | 1/2024 | Thompson |
| 11,976,104 | B2 | 5/2024 | Wei |
| 12,018,274 | B2 | 6/2024 | Thompson |
| 12,134,770 | B1 | 11/2024 | Thompson |
| 12,180,521 | B2 | 12/2024 | Ledbetter |
| 2003/0104523 | A1 | 6/2003 | Bauer |
| 2021/0253664 | A1 | 8/2021 | Wei |
| 2024/0026377 | A1 | 1/2024 | Thompson |
| 2025/0002884 | A1 | 1/2025 | Posada |
| 2025/0011445 | A1 | 1/2025 | Bergmann |

FOREIGN PATENT DOCUMENTS

| | | | |
|---|---|---|---|
| CA | 2721333 A1 | | 10/2009 |
| CN | 114829384 | * | 7/2022 |
| IN | P202305938 | * | 7/2023 |
| KR | 100808908 B1 | | 3/2008 |
| WO | 2004096156 A2 | | 11/2004 |
| WO | 2020041590 A1 | | 2/2020 |
| WO | 2021168413 A1 | | 8/2021 |
| WO | 2022074236 A2 | | 4/2022 |
| WO | 2022178078 A1 | | 8/2022 |
| WO | WO-2023051412 A1 | * | 4/2023 |
| WO | WO-2023088351 A1 | * | 5/2023 |
| WO | 2024107701 A2 | | 5/2024 |
| WO | 2024191937 A2 | | 9/2024 |

OTHER PUBLICATIONS

Dwyer et al. (J. Biol. Chem. 274:9738-43, 1999) (Year: 1999).
Chapter 7 Monomeric Fc-Fusion Proteins Baisong Mei, Susan C. Low, Snejana Krassova, Robert T. Peters, Glenn F. Pierce.Jennifer A. Dumont Book Editor(s):Stefan R. Schmidt First published: Feb. 12, 2013 https://doi.org/10.1002/9781118354599.ch7 (Year: 2013).
A rationally engineered DNase1-Fc fusion protein ameliorates autoimmune glomerulonephritis. By: Mouchess, Maria [Reprint Author] Journal of Immunology, (May 1, 2019) vol. 202, No. 1, Suppl. S, pp. 132.4. (Year: 2019).
A Rationally Engineered Hyperactive Actin-Resistant DNase1-Fc Fusion Protein Ameliorates Autoimmune Glomerulonephritis. By: Austin, Cary D. FASEB Journal, (Apr. 2019) vol. 33, No. Suppl. 1, pp. 802.10. (Year: 2019).
Bottoni et al. "Targeting BTK through microRNA in chronic lymphocytic leukemia." Blood, The Journal of the American Society of Hematology 128.26 (2016): 3101-3112.
O'Brien et al. "Overview of microRNA biogenesis, mechanisms of actions, and circulation." Frontiers in endocrinology 9 (2018): 402.
Gorski et al. "RNA-based recognition and targeting: sowing the seeds of specificity." Nature Reviews Molecular Cell Biology 18.4 (2017): 215-228.
Brutons Tyrosine Kinase Genbank Sequence (2023).

(Continued)

*Primary Examiner* — Michael C Wilson
(74) *Attorney, Agent, or Firm* — Gowling WLG (Canada) LLP

(57) ABSTRACT

Some embodiments of the present disclosure relate to one or more compositions that upregulate the production of one or more sequences of mRNA. The sequences of mRNA may encode for translation of a target biomolecule, thereby causing an increase in bioavailability of the target biomolecule within a subject that is administered the one or more compositions. In some embodiments of the present disclosure, the target biomolecule is a fusion protein with an Fc fragment, such as a toll-like receptor 3-Fc (TLR3-Fc). In some embodiments of the present disclosure, the target biomolecule is toll-like receptor 9-Fc (TLR9-Fc). In some embodiments of the present disclosure, the target biomolecule is deoxyribonuclease I-Fc (DNAse I-Fc). In some embodiments of the present disclosure, the target biomolecule is neural growth factor-Fc (NGF-Fc). In some embodiments of the present disclosure, the target biomolecule is insulin-Fc.

3 Claims, No Drawings

Specification includes a Sequence Listing.

(56) References Cited

OTHER PUBLICATIONS

Christensen et al. "Recombinant adeno-associated virus-mediated microRNA delivery into the postnatal mouse brain reveals a role for miR-134 in dendritogenesis in vivo." Frontiers in neural circuits 3 (2010): 848.
Bofill-De Ros et al. "Guidelines for the optimal design of miRNA-based shRNAs." Methods 103 (2016): 157-166.
Denzler et al. "Impact of microRNA levels, target-site complementarity, and cooperativity on competing endogenous RNA-regulated gene expression." Molecular cell 64.3 (2016): 565-579.
Van Den Berg et al. "Design of effective primary microRNA mimics with different basal stem conformations." Molecular Therapy Nucleic Acids 5 (2016).
Nature (2010. Gene Expression. Scitable. Available online at Nature.com) <https://www.nature.com/scitable/topicpage/gene-expression-14121669> (2010).
GenBank EGF Sequence (2023).
Ahmadzadeh et al. "BRAF mutation in hairy cell leukemia." Oncology reviews 8.2 (2014): 253.
Patton et al. "Biogenesis, delivery, and function of extracellular RNA." Journal of extracellular vesicles 4.1 (2015): 27494.
Clark et al. "Detection of BRAF splicing variants in plasma-derived cell-free nucleic acids and extracellular vesicles of melanoma patients failing targeted therapy therapies." Oncotarget 11.44 (2020): 4016.
NCBI search results for SEQ ID No. 5 (2024).
NCBI Nucleotide Sequence ALK Lingand, search performed Dec. 26, 2024 (2023).
NCBI Nucleotide Sequence ALK Receptor, search performed Dec. 26, 2024 (2023).
GenBank EGFR Sequence (2023).
GenBank FLT3 Sequence (2024).
NCBI Nucleotide Sequence for PARP, search performed Dec. 26, 2024 (2024).
Tritschler et al. "Concepts and limitations for learning developmental trajectories from single cell genomics." Development 146.12 (2019): dev170506.
Kondratov et al. "Direct head-to-head evaluation of recombinant adeno-associated viral vectors manufactured in human versus insect cells." Molecular Therapy 25.12 (2017): 2661-2675.
Wang et al. "Adeno-associated virus vector as a platform for gene therapy delivery." Nature reviews Drug discovery 18.5 (2019): 358-378.

* cited by examiner

PLASMID ENCODING A NGF AND Fc FUSION PROTEIN

This application contains a Sequence Listing electronically submitted via Patent Center to the United States Patent and Trademark Office as an XML Document file entitled "A8149440US-Sequence Listing.xml" created on 2024 Feb. 8 and having a size of 68,245 bytes. The information contained in the Sequence Listing is incorporated by reference herein.

TECHNICAL FIELD

The present disclosure generally relates to compositions for regulating the production of fusion proteins. In particular, the present disclosure relates to compositions for regulating gene expression and, consequently, the production of fusion proteins.

BACKGROUND

Bioactive molecules, including toll-like receptors, enzymes, and hormones, are necessary for the homeostatic control of biological systems.

When bioactive molecules are over-expressed, under-expressed or mis-expressed, homeostasis is lost, and disease is often the result.

As such, it may be desirable to establish therapies, treatments and/or interventions that address when homeostasis and the regulation of bioactive molecules are lost in order to prevent or treat the resulting disease.

SUMMARY

Some embodiments of the present disclosure relate to one or more compositions that upregulate the production of one or more sequences of mRNA. The sequences of mRNA may encode for translation of a target biomolecule, thereby causing an increase in bioavailability of the target biomolecule within a subject that is administered the one or more compositions. In some embodiments of the present disclosure, the target biomolecule is a fusion protein with an Fc fragment, such as a toll-like receptor 3-Fc (TLR3-Fc). In some embodiments of the present disclosure, the target biomolecule is toll-like receptor 9-Fc (TLR9-Fc). In some embodiments of the present disclosure, the target biomolecule is deoxyribonuclease I-Fc (DNAse I-Fc). In some embodiments of the present disclosure, the target biomolecule is neural growth factor-Fc (NGF-Fc). In some embodiments of the present disclosure, the target biomolecule is insulin-Fc.

In some embodiments of the present disclosure the compositions comprise a plasmid of deoxyribonucleic acid (DNA) that includes one or more insert sequences of nucleic acids that encode for the production of mRNA and a backbone sequence of nucleic acids that facilitates introduction of the one or more insert sequences into one or more of a subject's cells where it is expressed and/or replicated. Expression of the one or more insert sequences by one or more cells of the subject results in an increased production of the mRNA and, consequently, increased translation of the target biomolecule by one or more of the subject's cells.

Some embodiments of the present disclosure relate to a recombinant plasmid (RP). In some embodiments of the present disclosure, the RP comprises a nucleotide sequence of SEQ ID NO. 1 and SEQ ID NO. 2. The RP comprises a nucleotide sequence encoding one or more nucleotide sequences encoding an mRNA sequence that encodes for the fusion protein DNAse I-Fc.

Some embodiments of the present disclosure relate to a recombinant plasmid. In some embodiments of the present disclosure, the RP comprises a nucleotide sequence of SEQ ID NO. 1 and SEQ ID NO. 3. The RP comprises a nucleotide sequence encoding one or more nucleotide sequences encoding an mRNA sequence that encodes for the fusion protein TLR3-Fc.

Some embodiments of the present disclosure relate to a recombinant plasmid. In some embodiments of the present disclosure, the RP comprises a nucleotide sequence of SEQ ID NO. 1 and SEQ ID NO. 4. The RP comprises a nucleotide sequence encoding one or more nucleotide sequences encoding an mRNA sequence that encodes for the fusion protein TLR9-Fc.

Some embodiments of the present disclosure relate to a recombinant plasmid. In some embodiments of the present disclosure, the RP comprises a nucleotide sequence of SEQ ID NO. 1 and SEQ ID NO. 5. The RP comprises a nucleotide sequence encoding one or more nucleotide sequences encoding an mRNA sequence that encodes for the fusion protein NGF-Fc.

Some embodiments of the present disclosure relate to a recombinant plasmid. In some embodiments of the present disclosure, the RP comprises a nucleotide sequence of SEQ ID NO. 1 and SEQ ID NO. 6. The RP comprises a nucleotide sequence encoding one or more nucleotide sequences encoding an mRNA sequence that encodes for the fusion protein insulin-Fc.

Some embodiments of the present disclosure relate to a method of making a composition/target cell complex. The method comprising a step of administering a RP comprising SEQ ID NO. 1 and one of SEQ ID NO. 2, SEQ ID NO. 3, SEQ ID NO. 4, SEQ ID NO. 5 or SEQ ID NO. 6 to a target cell for forming the composition/target cell complex, wherein the composition/target cell complex causes the target cell to increase production of one or more sequences of mRNA that increases production of a target biomolecule.

Embodiments of the present disclosure relate to at least one approach for inducing endogenous production of one or more sequences of mRNA that encodes for a target biomolecule, for example TLR3-Fc. A first approach utilizes gene vectors containing nucleotide sequences for increasing the endogenous production of one or more sequences of mRNA, which are complete or partial sequences and/or combinations thereof of TLR3-Fc, which can be administered to a subject to increase the subject's production of one or more sequences of the mRNA.

Embodiments of the present disclosure relate to at least one approach for inducing endogenous production of one or more sequences of mRNA that encodes for a target biomolecule, for example TLR9-Fc. A first approach utilizes gene vectors containing nucleotide sequences for increasing the endogenous production of one or more sequences of mRNA, which are complete or partial sequences and/or combinations thereof of TLR9-Fc, which can be administered to a subject to increase the subject's production of one or more sequences of the mRNA.

Embodiments of the present disclosure relate to at least one approach for inducing endogenous production of one or more sequences of mRNA that encodes for a target biomolecule, for example DNAse I-Fc. A first approach utilizes gene vectors containing nucleotide sequences for increasing the endogenous production of one or more sequences of mRNA, which are complete or partial sequences and/or combinations thereof of DNAse I-Fc, which can be administered to a subject to increase the subject's production of one or more sequences of the mRNA.

Embodiments of the present disclosure relate to at least one approach for inducing endogenous production of one or more sequences of mRNA that encodes for a target biomolecule, for example NGF-Fc. A first approach utilizes gene vectors containing nucleotide sequences for increasing the endogenous production of one or more sequences of mRNA, which are complete or partial sequences and/or combinations thereof of NGF-Fc, which can be administered to a subject to increase the subject's production of one or more sequences of the mRNA.

Embodiments of the present disclosure relate to at least one approach for inducing endogenous production of one or more sequences of mRNA that encodes for a target biomolecule, for example insulin-Fc. A first approach utilizes gene vectors containing nucleotide sequences for increasing the endogenous production of one or more sequences of mRNA, which are complete or partial sequences and/or combinations thereof of insulin-Fc, which can be administered to a subject to increase the subject's production of one or more sequences of the mRNA.

DETAILED DESCRIPTION

Unless defined otherwise, all technical and scientific terms used therein have the meanings that would be commonly understood by one of skill in the art in the context of the present description. Although any methods and materials similar or equivalent to those described therein can also be used in the practice or testing of the present disclosure, the preferred compositions, methods and materials are now described. All publications mentioned therein are incorporated therein by reference to disclose and describe the methods and/or materials in connection with which the publications are cited.

As used therein, the singular forms "a", "an", and "the" include plural references unless the context clearly dictates otherwise. For example, reference to "a composition" includes one or more compositions and reference to "a subject" or "the subject" includes one or more subjects.

As used therein, the terms "about" or "approximately" refer to within about 25%, preferably within about 20%, preferably within about 15%, preferably within about 10%, preferably within about 5% of a given value or range. It is understood that such a variation is always included in any given value provided therein, whether or not it is specifically referred to.

As used therein, the term "ameliorate" refers to improve and/or to make better and/or to make more satisfactory.

As used therein, the term "cell" refers to a single cell as well as a plurality of cells or a population of the same cell type or different cell types. Administering a composition to a cell includes in vivo, in vitro and ex vivo administrations and/or combinations thereof.

As used therein, the term "complex" refers to an association, either direct or indirect, between one or more particles of a composition and one or more target cells. This association results in a change in the metabolism of the target cell. As used therein, the phrase "change in metabolism" refers to an increase or a decrease in the one or more target cells' production of one or more proteins, and/or any post-translational modifications of one or more proteins.

As used therein, the term "composition" refers to a substance that, when administered to a subject, causes one or more chemical reactions and/or one or more physical reactions and/or one or more physiological reactions and/or one or more immunological reactions in the subject. In some embodiments of the present disclosure, the composition is a plasmid vector.

As used therein, the term "endogenous" refers to the production and/or modification of a molecule that originates within a subject.

As used therein, the term "exogenous" refers to a molecule that is within a subject but that did not originate within the subject. As used therein, the terms "production", "producing" and "produce" refer to the synthesis and/or replication of DNA, the transcription of one or more sequences of RNA, the translation of one or more amino acid sequences, the post-translational modifications of an amino acid sequence, and/or the production of one or more regulatory molecules that can influence the production and/or functionality of an effector molecule or an effector cell. For clarity, "production" is also used therein to refer to the functionality of a regulatory molecule, unless the context reasonably indicates otherwise.

As used therein, the term "subject" refers to any therapeutic target that receives the composition. The subject can be a vertebrate, for example, a mammal including a human. The term "subject" does not denote a particular age or sex. The term "subject" also refers to one or more cells of an organism, an in vitro culture of one or more tissue types, an in vitro culture of one or more cell types, ex vivo preparations, and/or a sample of biological materials such as tissue, and/or biological fluids.

As used therein, the term "target biomolecule" refers to a protein-Fc fusion molecule that is found within a subject. A biomolecule may be endogenous or exogenous to a subject.

As used therein, the term "target cell" refers to one or more cells and/or cell types that are affected, either directly or indirectly, by a biomolecule.

As used therein, the term "therapeutically effective amount" refers to the amount of the composition used that is of sufficient quantity to ameliorate, treat and/or inhibit one or more of a disease, disorder or a symptom thereof. The "therapeutically effective amount" will vary depending on the composition used, the route of administration of the composition and the severity of the disease, disorder or symptom thereof. The subject's age, weight and genetic make-up may also influence the amount of the composition that will be a therapeutically effective amount.

As used therein, the terms "treat", "treatment" and "treating" refer to obtaining a desired pharmacologic and/or physiologic effect. The effect may be prophylactic in terms of completely or partially preventing an occurrence of a disease, disorder or symptom thereof and/or the effect may be therapeutic in providing a partial or complete amelioration or inhibition of a disease, disorder, or symptom thereof. Additionally, the term "treatment" refers to any treatment of a disease, disorder, or symptom thereof in a subject and includes: (a) preventing the disease from occurring in a subject which may be predisposed to the disease but has not yet been diagnosed as having it; (b) inhibiting the disease, i.e., arresting its development; and (c) ameliorating the disease.

As used therein, the terms "unit dosage form" and "unit dose" refer to a physically discrete unit that is suitable as a unitary dose for patients. Each unit contains a predetermined quantity of the composition and optionally, one or more suitable pharmaceutically acceptable carriers, one or more excipients, one or more additional active ingredients, or combinations thereof. The amount of composition within each unit is a therapeutically effective amount.

Where a range of values is provided therein, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges, and are also, encompassed within the disclosure, subject to any specifically excluded limit in the stated range. Where the stated range includes one or both of the limits, ranges excluding either or both of those included limits are also included in the disclosure.

In some embodiments of the present disclosure, a composition is a recombinant plasmid (RP) for introducing genetic material, such as one or more nucleotide sequences, into a target cell for reproduction or transcription of an insert that comprises one or more nucleotide sequences that are carried within the RP. In some embodiments of the present disclosure, the RP is delivered without a carrier, by a viral vector, by a protein coat, or by a lipid vesicle. In some embodiments of the present disclosure, the vector is an adeno-associated virus vector.

In some embodiments of the present disclosure, the insert comprises one or more nucleotide sequences that encode for production of at least one sequence of mRNA that increases the production of target biomolecules, such as a fusion protein with an Fc fragment. An Fc fragment is the distal portion of the heavy chain of an antibody.

In some embodiments of the present disclosure, the target biomolecule is TLR3-Fc.

In some embodiments of the present disclosure, the target biomolecule is TLR9-Fc.

In some embodiments of the present disclosure, the target biomolecule is DNAse I-Fc.

In some embodiments of the present disclosure, the target biomolecule is NGF-Fc.

In some embodiments of the present disclosure, the target biomolecule is insulin-Fc.

Some embodiments of the present disclosure relate to a composition that can be administered to a subject with a condition that results, directly or indirectly, from the dysregulated production of a biomolecule. When a therapeutically effective amount of the composition is administered to the subject, the subject may change production and/or functionality of one or more biomolecules.

In some embodiments of the present disclosure, the subject may respond to receiving the therapeutic amount of the composition by changing production and/or functionality of one or more intermediary molecules by changing production of one or more DNA sequences, one or more RNA sequences, and/or one or more proteins that regulate the levels and/or functionality of the one or more intermediary molecules. The one or more intermediary molecules regulate the subject's levels and/or functionality of the one or more biomolecules.

In some embodiments of the present disclosure, administering a therapeutic amount of the composition to a subject upregulates the production, functionality or both one or more sequences of mRNA that each encode for one or more biomolecules.

In some embodiments of the present disclosure, the composition is an RP that may be used for gene therapy. The gene therapy is useful for increasing the subject's endogenous production of one or more sequences of mRNA that encode for a target biomolecule. For example, the RP can contain one or more nucleotide sequences that cause increased production of one or more nucleotide sequences that cause an increased production of one or more mRNA sequences that encode for one biomolecule, such as TLR3-Fc, TLR9-Fc, DNAse I-Fc, NGF-Fc or insulin-Fc.

In some embodiments of the present disclosure, the delivery vehicle of the RP used for gene therapy may be a vector that comprises a virus that can be enveloped, or not (unenveloped), replication effective or not (replication ineffective), or combinations thereof. In some embodiments of the present disclosure, the vector is a virus that is not enveloped and not replication effective. In some embodiments of the present disclosure, the vector is a virus of the Parvoviridae family. In some embodiments of the present disclosure, the vector is a virus of the genus Dependoparvovirus. In some embodiments of the present disclosure, the vector is an adeno-associated virus (AAV). In some embodiments of the present disclosure, the vector is a recombinant AAV. In some embodiments of the present disclosure, the vector is a recombinant AAV6.2FF.

In some embodiments of the present disclosure, the delivery vehicle of the RP used for gene therapy may be a protein coat.

In some embodiments of the present disclosure, the delivery vehicle of the RP used for gene therapy may be a lipid vesicle.

The embodiments of the present disclosure also relate to administering a therapeutically effective amount of the composition. In some embodiments of the present disclosure, the therapeutically effective amount of the composition that is administered to a patient is between about 10 and about $1\times10^{16}$ $TCID_{50}$/kg (50% tissue culture infective dose per kilogram of the patient's body mass). In some embodiments of the present disclosure, the therapeutically effective amount of the composition that is administered to the patient is about $1\times10^{13}$ $TCID_{50}$/kg. In some embodiments of the present disclosure, the therapeutically effective amount of the composition that is administered to a patient is measured in TPC/kg (total particle count of the composition per kilogram of the patient's body mass). In some embodiments of the present disclosure, the therapeutically effective amount of the composition is between about 10 and about $1\times10^{16}$ TCP/kg.

Some embodiments of the present disclosure relate to an adeno-associated virus (AAV) genome consisting of a RP that when operable inside a target cell will cause the target cell to produce a mRNA sequence that upregulates production of a biomolecule, with examples being TLR3-Fc, TLR9-Fc, DNAse I-Fc, NGF-Fc, or insulin-Fc. The RP is comprised of AAV2 inverted terminal repeats (ITRs), a composite CASI promoter, and a human growth hormone (HGH) signal peptide followed by a mRNA expression cassette encoding for TLR3-Fc, TLR9-Fc, DNAse I-Fc, NGF-Fc, or insulin-Fc, followed by a Woodchuck Hepatitis Virus post-transcriptional regulatory element (WPRE) and a Simian virus 40 (SV40) polyadenylation (polyA) signal.

SEQ ID NO. 1 (backbone sequence No. 1):
5' TTCTAGAATAATCAACCTCTGGATTACAAAATTTGTGAAAGATTGACTGGTATTCTTA

ACTATGTTGCTCCTTTTACGCTATGTGGATACGCTGCTTTAATGCCTTTGTATCATGCTA

-continued

```
TTGCTTCCCGTATGGCTTTCATTTTCTCCTCCTTGTATAAATCCTGGTTGCTGTCTCTTT
ATGAGGAGTTGTGGCCCGTTGTCAGGCAACGTGGCGTGGTGTGCACTGTGTTTGCTGACG
CAACCCCCACTGGTTGGGGCATTGCCACCACCTGTCAGCTCCTTTCCGGGACTTTCGCTT
TCCCCCTCCCTATTGCCACGGCGGAACTCATCGCCGCCTGCCTTGCCCGCTGCTGGACAG
GGGCTCGGCTGTTGGGCACTGACAATTCCGTGGTGTTGTCGGGGAAATCATCGTCCTTTC
CTTGGCTGCTCGCCTGTGTTGCCACCTGGATTCTGCGCGGGACGTCCTTCTGCTACGTCC
CTTCGGCCCTCAATCCAGCGGACCTTCCTTCCCGCGGCCTGCTGCCGGCTCTGCGGCCTC
TTCCGCGTCTTCGCCTTCGCCCTCAGACGAGTCGGATCTCCCTTTGGGCCGCCTCCCCGC
CTAAGCTTATCGATACCGTCGAGATCTAACTTGTTTATTGCAGCTTATAATGGTTACAAA
TAAAGCAATAGCATCACAAATTTCACAAATAAAGCATTTTTTTCACTGCATTCTAGTTGT
GGTTTGTCCAAACTCATCAATGTATCTTATCATGTCTGGATCTCGACCTCGACTAGAGCA
TGGCTACGTAGATAAGTAGCATGGCGGGTTAATCATTAACTACAAGGAACCCCTAGTGAT
GGAGTTGGCCACTCCCTCTCTGCGCGCTCGCTCGCTCACTGAGGCCGGGCGACCAAAGGT
CGCCCGACGCCCGGGCTTTGCCCGGGCGGCCTCAGTGAGCGAGCGAGCGCGCCAGCTGGC
GTAATAGCGAAGAGGCCCGCACCGATCGCCCTTCCCAACAGTTGCGCAGCCTGAATGGCG
AATGGAATTCCAGACGATTGAGCGTCAAAATGTAGGTATTTCCATGAGCGTTTTTCCTGT
TGCAATGGCTGGCGGTAATATTGTTCTGGATATTACCAGCAAGGCCGATAGTTTGAGTTC
TTCTACTCAGGCAAGTGATGTTATTACTAATCAAAGAAGTATTGCGACAACGGTTAATTT
GCGTGATGGACAGACTCTTTTACTCGGTGGCCTCACTGATTATAAAAACACTTCTCAGGA
TTCTGGCGTACCGTTCCTGTCTAAAATCCCTTTAATCGGCCTCCTGTTTAGCTCCCGCTC
TGATTCTAACGAGGAAAGCACGTTATACGTGCTCGTCAAAGCAACCATAGTACGCGCCCT
GTAGCGGCGCATTAAGCGCGGCGGGTGTGGTGGTTACGCGCAGCGTGACCGCTACACTTG
CCAGCGCCCTAGCGCCCGCTCCTTTCGCTTTCTTCCCTTCCTTTCTCGCCACGTTCGCCG
GCTTTCCCCGTCAAGCTCTAAATCGGGGGCTCCCTTTAGGGTTCCGATTTAGTGCTTTAC
GGCACCTCGACCCCAAAAAACTTGATTAGGGTGATGGTTCACGTAGTGGGCCATCGCCCT
GATAGACGGTTTTTCGCCCTTTGACGTTGGAGTCCACGTTCTTTAATAGTGGACTCTTGT
TCCAAACTGGAACAACACTCAACCCTATCTCGGTCTATTCTTTTGATTTATAAGGGATTT
TGCCGATTTCGGCCTATTGGTTAAAAAATGAGCTGATTTAACAAAAATTTAACGCGAATT
TTAACAAAATATTAACGTTTACAATTTAAATATTTGCTTATACAATCTTCCTGTTTTTGG
GGCTTTTCTGATTATCAACCGGGGTACATATGATTGACATGCTAGTTTTACGATTACCGT
TCATCGATTCTCTTGTTTGCTCCAGACTCTCAGGCAATGACCTGATAGCCTTTGTAGAGA
CCTCTCAAAAATAGCTACCCTCTCCGGCATGAATTTATCAGCTAGAACGGTTGAATATCA
TATTGATGGTGATTTGACTGTCTCCGGCCTTTCTCACCCGTTTGAATCTTTACCTACACA
TTACTCAGGCATTGCATTTAAAATATATGAGGGTTCTAAAAATTTTTATCCTTGCGTTGA
AATAAAGGCTTCTCCCGCAAAAGTATTACAGGGTCATAATGTTTTTGGTACAACCGATTT
AGCTTTATGCTCTGAGGCTTTATTGCTTAATTTTGCTAATTCTTTGCCTTGCCTGTATGA
TTTATTGGATGTTGGAATTCCTGATGCGGTATTTTCTCCTTACGCATCTGTGCGGTATTT
CACACCGCATATGGTGCACTCTCAGTACAATCTGCTCTGATGCCGCATAGTTAAGCCAGC
CCCGACACCCGCCAACACCCGCTGACGCGCCCTGACGGGCTTGTCTGCTCCCGGCATCCG
CTTACAGACAAGCTGTGACCGTCTCCGGGAGCTGCATGTGTCAGAGGTTTTCACCGTCAT
```

-continued

```
CACCGAAACGCGCGAGACGAAAGGGCCTCGTGATACGCCTATTTTTATAGGTTAATGTCA
TGATAATAATGGTTTCTTAGACGTCAGGTGGCACTTTTCGGGGAAATGTGCGCGGAACCC
CTATTTGTTTATTTTTCTAAATACATTCAAATATGTATCCGCTCATGAGACAATAACCCT
GATAAATGCTTCAATAATATTGAAAAAGGAAGAGTATGAGTATTCAACATTTCCGTGTCG
CCCTTATTCCCTTTTTTGCGGCATTTTGCCTTCCTGTTTTTGCTCACCCAGAAACGCTGG
TGAAAGTAAAAGATGCTGAAGATCAGTTGGGTGCACGAGTGGGTTACATCGAACTGGATC
TCAACAGCGGTAAGATCCTTGAGAGTTTTCGCCCCGAAGAACGTTTTCCAATGATGAGCA
CTTTTAAAGTTCTGCTATGTGGCGCGGTATTATCCCGTATTGACGCCGGGCAAGAGCAAC
TCGGTCGCCGCATACACTATTCTCAGAATGACTTGGTTGAGTACTCACCAGTCACAGAAA
AGCATCTTACGGATGGCATGACAGTAAGAGAATTATGCAGTGCTGCCATAACCATGAGTG
ATAACACTGCGGCCAACTTACTTCTGACAACGATCGGAGGACCGAAGGAGCTAACCGCTT
TTTTGCACAACATGGGGGATCATGTAACTCGCCTTGATCGTTGGGAACCGGAGCTGAATG
AAGCCATACCAAACGACGAGCGTGACACCACGATGCCTGTAGCAATGGCAACAACGTTGC
GCAAACTATTAACTGGCGAACTACTTACTCTAGCTTCCCGGCAACAATTAATAGACTGGA
TGGAGGCGGATAAAGTTGCAGGACCACTTCTGCGCTCGGCCCTTCCGGCTGGCTGGTTTA
TTGCTGATAAATCTGGAGCCGGTGAGCGTGGGTCTCGCGGTATCATTGCAGCACTGGGGC
CAGATGGTAAGCCCTCCCGTATCGTAGTTATCTACACGACGGGGAGTCAGGCAACTATGG
ATGAACGAAATAGACAGATCGCTGAGATAGGTGCCTCACTGATTAAGCATTGGTAACTGT
CAGACCAAGTTTACTCATATATACTTTAGATTGATTTAAAACTTCATTTTTAATTTAAAA
GGATCTAGGTGAAGATCCTTTTTGATAATCTCATGACCAAAATCCCTTAACGTGAGTTTT
CGTTCCACTGAGCGTCAGACCCCGTAGAAAAGATCAAAGGATCTTCTTGAGATCCTTTTT
TTCTGCGCGTAATCTGCTGCTTGCAAACAAAAAAACCACCGCTACCAGCGGTGGTTTGTT
TGCCGGATCAAGAGCTACCAACTCTTTTTCCGAAGGTAACTGGCTTCAGCAGAGCGCAGA
TACCAAATACTGTCCTTCTAGTGTAGCCGTAGTTAGGCCACCACTTCAAGAACTCTGTAG
CACCGCCTACATACCTCGCTCTGCTAATCCTGTTACCAGTGGCTGCTGCCAGTGGCGATA
AGTCGTGTCTTACCGGGTTGGACTCAAGACGATAGTTACCGGATAAGGCGCAGCGGTCGG
GCTGAACGGGGGGTTCGTGCACACAGCCCAGCTTGGAGCGAACGACCTACACCGAACTGA
GATACCTACAGCGTGAGCTATGAGAAAGCGCCACGCTTCCCGAAGGGAGAAAGGCGGACA
GGTATCCGGTAAGCGGCAGGGTCGGAACAGGAGAGCGCACGAGGGAGCTTCCAGGGGGAA
ACGCCTGGTATCTTTATAGTCCTGTCGGGTTTCGCCACCTCTGACTTGAGCGTCGATTTT
TGTGATGCTCGTCAGGGGGCGGAGCCTATGGAAAAACGCCAGCAACGCGGCCTTTTTAC
GGTTCCTGGCCTTTTGCTGGCCTTTTGCTCACATGTTCTTTCCTGCGTTATCCCCTGATT
CTGTGGATAACCGTATTACCGCCTTTGAGTGAGCTGATACCGCTCGCCGCAGCCGAACGA
CCGAGCGCAGCGAGTCAGTGAGCGAGGAAGCGGAAGAGCGCCCAATACGCAAACCGCCTC
TCCCCGCGCGTTGGCCGATTCATTAATGCAGCAGCTGCGCGCTCGCTCGCTCACTGAGGC
CGCCCGGGCAAAGCCCGGGCGTCGGGCGACCTTTGGTCGCCCGGCCTCAGTGAGCGAGCG
AGCGCGCAGAGAGGGAGTGGCCAACTCCATCACTAGGGGTTCCTTGTAGTTAATGATTAA
CCCGCCATGCTACTTATCTACGTAGCCATGCTCTAGGACATTGATTATTGACTAGTGGAG
TTCCGCGTTACATAACTTACGGTAAATGGCCCGCCTGGCTGACCGCCCAACGACCCCCGC
CCATTGACGTCAATAATGACGTATGTTCCCATAGTAACGCCAATAGGGACTTTCCATTGA
CGTCAATGGGTGGAGTATTTACGGTAAACTGCCCACTTGGCAGTACATCAAGTGTATCAT
```

-continued

```
ATGCCAAGTACGCCCCCTATTGACGTCAATGACGGTAAATGGCCCGCCTGGCATTATGCC

CAGTACATGACCTTATGGGACTTTCCTACTTGGCAGTACATCTACGTATTAGTCATCGCT

ATTACCATGGTCGAGGTGAGCCCCACGTTCTGCTTCACTCTCCCCATCTCCCCCCCCTCC

CCACCCCCAATTTTGTATTTATTTATTTTTTAATTATTTTGTGCAGCGATGGGGGCGGGG

GGGGGGGGGGCGCGCGCCAGGCGGGGGGGCGGGGCGAGGGGGGGCGGGGCGAGGCGG

AGAGGTGCGGCGGCAGCCAATCAGAGCGGCGCGCTCCGAAAGTTTCCTTTTATGGCGAGG

CGGCGGCGGCGGCGGCCCTATAAAAAGCGAAGCGCGCGGCGGGCGGGAGTCGCTGCGCGC

TGCCTTCGCCCCGTGCCCCGCTCCGCCGCCGCCTCGCGCCGCCCGCCCCGGCTCTGACTG

ACCGCGTTACTAAAACAGGTAAGTCCGGCCTCCGCGCCGGGTTTTGGCGCCTCCCGCGGG

CGCCCCCCTCCTCACGGCGAGCGCTGCCACGTCAGACGAAGGGCGCAGCGAGCGTCCTGA

TCCTTCCGCCCGGACGCTCAGGACAGCGGCCCGCTGCTCATAAGACTCGGCCTTAGAACC

CCAGTATCAGCAGAAGGACATTTTAGGACGGGACTTGGGTGACTCTAGGGCACTGGTTTT

CTTTCCAGAGAGCGGAACAGGCGAGGAAAAGTAGTCCCTTCTCGGCGATTCTGCGGAGGG

ATCTCCGTGGGCGGTGAACGCCGATGATGCCTCTACTAACCATGTTCATGTTTTCTTTT

TTTTTCTACAGGTCCTGGGTGACGAACAGGGTACCGCCACC 3'

SEQ ID NO. 2 (mRNA expression cassette No. 2-DNAse I-Fc):
5' ATGAGGGGCATGAAGCTGCTGGGGGCGCTGCTGGCACTGGCGGCCCTACTGCAGGG

GGCCGTGTCCCTGAAGATCGCAGCCTTCAACATCCAGACATTTGGGGAGACCAAGATGTC

CAATGCCACCCTCGTCAGCTACATTGTGCAGATCCTGAGCCGCTATGACATCGCCCTGGT

CCAGGAGGTCAGAGACAGCCACCTGACTGCCGTGGGGAAGCTGCTGGACAACCTCAATCA

GGATGCACCAGACACCTATCACTACGTGGTCAGTGAGCCACTGGGACGGAACAGCTATAA

GGAGCGCTACCTGTTCGTGTACAGGCCTGACCAGGTGTCTGCGGTGGACAGCTACTACTA

CGATGATGGCTGCGAGCCCTGCGGAACGACACCTTCAACCGAGAGCCAGCCATTGTCAG

GTTCTTCTCCCGGTTCACAGAGGTCAGGGAGTTTGCCATTGTTCCCCTGCATGCGGCCCC

GGGGGACGCAGTAGCCGAGATCGACGCTCTCTATGACGTCTACCTGGATGTCCAAGAGAA

ATGGGGCTTGGAGGACGTCATGTTGATGGGCGACTTCAATGCGGGCTGCAGCTATGTGAG

ACCCTCCCAGTGGTCATCCATCCGCCTGTGGACAAGCCCCACCTTCCAGTGGCTGATCCC

CGACAGCGCTGACACCACAGCTACACCCACGCACTGTGCCTATGACAGGATCGTGGTTGC

AGGGATGCTGCTCCGAGGCGCCGTTGTTCCCGACTCGGCTCTTCCCTTTAACTTCCAGGC

TGCCTATGGCCTGAGTGACCAACTGGCCCAAGCCATCAGTGACCACTATCCAGTGGAGGT

GATGCTGAAGGGCGGATCAGGCGGATCACCCAAATCTTGTGACAAAACTCACACATGCCC

ACCGTGCCCAGCACCTGAACTCCTGGGGGGACCGTCAGTCTTCCTCTTCCCCCCAAAACC

CAAGGACACCCTCATGATCTCCCGGACCCCTGAGGTCACATGCGTGGTGGTGGACGTGAG

CCACGAAGACCCTGAGGTCAAGTTCAACTGGTACGTGGACGGCGTGGAGGTGCATAATGC

CAAGACAAAGCCGCGGGAGGAGCAGTACAACAGCACGTACCGTGTGGTCAGCGTCCTCAC

CGTCCTGCACCAGGACTGGCTGAATGGCAAGGAGTACAAGTGCAAGGTCTCCAACAAAGC

CCTCCCAGCCCCCATCGAGAAAACCATCTCCAAAGCCAAAGGGCAGCCCCGAGAACCACA

GGTGTACACCCTGCCCCCATCCCGGGAGGAGATGACCAAGAACCAGGTCAGCCTGACCTG

CCTGGTCAAAGGCTTCTATCCCAGCGACATCGCCGTGGAGTGGGAGAGCAATGGGCAGCC

GGAGAACAACTACAAGACCACGCCTCCCGTGCTGGACTCCGACGGCTCCTTCTTCCTCTA

CAGCAAGCTCACCGTGGACAAGAGCAGGTGGCAGCAGGGGAACGTCTTCTCATGCTCCGT
```

GATGCATGAGGCTCTGCACAACCACTACACGCAGAAGAGCCTCTCCCTGTCTCCGGGTAA

ATAG 3'

SEQ ID NO. 3 (mRNA expression cassette No. 3-TLR3-Fc):
5' GCCAGACCCTGCCGTGCATTTATTTTTGGGGCGGCCTGCTGCCGTTTGGCATGCTGTG

CGCGAGCAGCACCACCAAATGCACCGTGAGCCATGAAGTGGCGGATTGCAGCCATCTGAA

ACTGACCCAGGTGCCGGATGATCTGCCGACCAACATTACCGTGCTGAACCTGACCCATAA

CCAGCTGCGCCGCCTGCCGGCGGCGAACTTTACCCGCTATAGCCAGCTGACCAGCCTGGA

TGTGGGCTTTAACACCATTAGCAAACTGGAACCGGAACTGTGCCAGAAACTGCCGATGCT

GAAAGTGCTGAACCTGCAGCATAACGAACTGAGCCAGCTGAGCGATAAAACCTTTGCGTT

TTGCACCAACCTGACCGAACTGCATCTGATGAGCAACAGCATTCAGAAAATTAAAAACAA

CCCGTTTGTGAAACAGAAAAACCTGATTACCCTGGATCTGAGCCATAACGGCCTGAGCAG

CACCAAACTGGGCACCCAGGTGCAGCTGGAAAACCTGCAGGAACTGCTGCTGAGCAACAA

CAAAATTCAGGCGCTGAAAAGCGAAGAACTGGATATTTTTGCGAACAGCAGCCTGAAAAA

ACTGGAACTGAGCAGCAACCAGATTAAAGAATTTAGCCCGGGCTGCTTTCATGCGATTGG

CCGCCTGTTTGGCCTGTTTCTGAACAACGTGCAGCTGGGCCCGAGCCTGACCGAAAAACT

GTGCCTGGAACTGGCGAACACCAGCATTCGCAACCTGAGCCTGAGCAACAGCCAGCTGAG

CACCACCAGCAACACCACCTTTCTGGGCCTGAAATGGACCAACCTGACCATGCTGGATCT

GAGCTATAACAACCTGAACGTGGTGGGCAACGATAGCTTTGCGTGGCTGCCGCAGCTGGA

ATATTTTTTCTGGAATATAACAACATTCAGCATCTGTTTAGCCATAGCCTGCATGGCCT

GTTTAACGTGCGCTATCTGAACCTGAAACGCAGCTTTACCAAACAGAGCATTAGCCTGGC

GAGCCTGCCGAAAATTGATGATTTTAGCTTTCAGTGGCTGAAATGCCTGGAACATCTGAA

CATGGAAGATAACGATATTCCGGGCATTAAAAGCAACATGTTTACCGGCCTGATTAACCT

GAAATATCTGAGCCTGAGCAACAGCTTTACCAGCCTGCGCACCCTGACCAACGAAACCTT

TGTGAGCCTGGCGCATAGCCCGCTGCATATTCTGAACCTGACCAAAAACAAAATTAGCAA

AATTGAAAGCGATGCGTTTAGCTGGCTGGGCCATCTGGAAGTGCTGGATCTGGGCCTGAA

CGAAATTGGCCAGGAACTGACCGGCCAGGAATGGCGCGGCCTGGAAAACATTTTTGAAAT

TTATCTGAGCTATAACAAATATCTGCAGCTGACCCGCAACAGCTTTGCGCTGGTGCCGAG

CCTGCAGCGCCTGATGCTGCGCCGCGTGGCGCTGAAAAACGTGGATAGCAGCCCGAGCCC

GTTTCAGCCGCTGCGCAACCTGACCATTCTGGATCTGAGCAACAACAACATTGCGAACAT

TAACGATGATATGCTGGAAGGCCTGGAAAAACTGGAAATTCTGGATCTGCAGCATAACAA

CCTGGCGCGCCTGTGGAAACATGCGAACCCGGGCGGCCCGATTTATTTTCTGAAAGGCCT

GAGCCATCTGCATATTCTGAACCTGGAAAGCAACGGCTTTGATGAAATTCCGGTGGAAGT

GTTTAAAGATCTGTTTGAACTGAAAATTATTGATCTGGGCCTGAACAACCTGAACACCCT

GCCGGCGAGCGTGTTTAACAACCAGGTGAGCCTGAAAAGCCTGAACCTGCAGAAAAACCT

GATTACCAGCGTGGAAAAAAAAGTGTTTGGCCCGGCGTTTCGCAACCTGACCGAACTGGA

TATGCGCTTTAACCCGTTTGATTGCACCTGCGAAAGCATTGCGTGGTTTGTGAACTGGAT

TAACGAAACCCATACCAACATTCCGGAACTGAGCAGCCATTATCTGTGCAACACCCCGCC

GCATTATCATGGCTTTCCGGTGCGCCTGTTTGATACCAGCAGCTGCAAAGATAGCGCGCC

GTTTGAACTGTTTTTTATGATTAACACCAGCATTCTGCTGATTTTTATTTTTATTGTGCT

GCTGATTCATTTTGAAGGCTGGCGCATTAGCTTTTATTGGAACGTGAGCGTGCATCGCGT

GCTGGGCTTTAAAGAAATTGATCGCCAGACCGAACAGTTTGAATATGCGGCGTATATTAT

-continued

```
TCATGCGTATAAAGATAAAGATTGGGTGTGGGAACATTTTAGCAGCATGGAAAAAGAAGA

TCAGAGCCTGAAATTTTGCCTGGAAGAACGCGATTTTGAAGCGGGCGTGTTTGAACTGGA

AGCGATTGTGAACAGCATTAAACGCAGCCGCAAAATTATTTTTGTGATTACCCATCATCT

GCTGAAAGATCCGCTGTGCAAACGCTTTAAAGTGCATCATGCGGTGCAGCAGGCGATTGA

ACAGAACCTGGATAGCATTATTCTGGTGTTTCTGGAAGAAATTCCGGATTATAAACTGAA

CCATGCGCTGTGCCTGCGCCGCGGCATGTTTAAAAGCCATTGCATTCTGAACTGGCCGGT

GCAGAAAGAACGCATTGGCGCGTTTCGCCATAAACTGCAGGTGGCGCTGGGCAGCAAAAA

CAGCGTGCATGGGCGGATCAGGCGGATCACCCAAATCTTGTGACAAAACTCACACATGCC

CACCGTGCCCAGCACCTGAACTCCTGGGGGACCGTCAGTCTTCCTCTTCCCCCCAAAAC

CCAAGGACACCCTCATGATCTCCCGGACCCCTGAGGTCACATGCGTGGTGGTGGACGTGA

GCCACGAAGACCCTGAGGTCAAGTTCAACTGGTACGTGGACGGCGTGGAGGTGCATAATG

CCAAGACAAAGCCGCGGGAGGAGCAGTACAACAGCACGTACCGTGTGGTCAGCGTCCTCA

CCGTCCTGCACCAGGACTGGCTGAATGGCAAGGAGTACAAGTGCAAGGTCTCCAACAAAG

CCCTCCCAGCCCCCATCGAGAAAACCATCTCCAAAGCCAAAGGGCAGCCCCGAGAACCAC

AGGTGTACACCCTGCCCCCATCCCGGGAGGAGATGACCAAGAACCAGGTCAGCCTGACCT

GCCTGGTCAAAGGCTTCTATCCCAGCGACATCGCCGTGGAGTGGGAGAGCAATGGGCAGC

CGGAGAACAACTACAAGACCACGCCTCCCGTGCTGGACTCCGACGGCTCCTTCTTCCTCT

ACAGCAAGCTCACCGTGGACAAGAGCAGGTGGCAGCAGGGGAACGTCTTCTCATGCTCCG

TGATGCATGAGGCTCTGCACAACCACTACACGCAGAAGAGCCTCTCCCTGTCTCCGGGTA

AATAG 3'

SEQ ID NO. 4 (miRNA expression cassette No. 4-TLR9-Fc):
5' ATGAGGGGCATGAAGCTGCTGGGGGCGCTGCTGGCACTGGCGGCCCTACTGCAGGGGG

CCGTGTCCATGGGCTTTTGCCGCAGCGCGCTGCATCCGCTGAGCCTGCTGGTGCAGGCGA

TTATGCTGGCGATGACCCTGGCGCTGGGCACCCTGCCGGCGTTTCTGCCGTGCGAACTGC

AGCCGCATGGCCTGGTGAACTGCAACTGGCTGTTTCTGAAAAGCGTGCCGCATTTTAGCA

TGGCGGCGCCGCGCGGCAACGTGACCAGCCTGAGCCTGAGCAGCAACCGCATTCATCATC

TGCATGATAGCGATTTTGCGCATCTGCCGAGCCTGCGCCATCTGAACCTGAAATGGAACT

GCCCGCCGGTGGGCCTGAGCCCGATGCATTTTCCGTGCCATATGACCATTGAACCGAGCA

CCTTTCTGGCGGTGCCGACCCTGGAAGAACTGAACCTGAGCTATAACAACATTATGACCG

TGCCGGCGCTGCCGAAAAGCCTGATTAGCCTGAGCCTGAGCCATACCAACATTCTGATGC

TGGATAGCGCGAGCCTGGCGGGCCTGCATGCGCTGCGCTTTCTGTTTATGGATGGCAACT

GCTATTATAAAAACCCGTGCCGCCAGGCGCTGGAAGTGGCGCCGGGCGCGCTGCTGGGCC

TGGGCAACCTGACCCATCTGAGCCTGAAATATAACAACCTGACCGTGGTGCCGCGCAACC

TGCCGAGCAGCCTGGAATATCTGCTGCTGAGCTATAACCGCATTGTGAAACTGGCGCCGG

AAGATCTGGCGAACCTGACCGCGCTGCGCGTGCTGGATGTGGGCGGCAACTGCCGCCGCT

GCGATCATGCGCCGAACCCGTGCATGGAATGCCCGCGCCATTTTCCGCAGCTGCATCCGG

ATACCTTTAGCCATCTGAGCCGCCTGGAAGGCCTGGTGCTGAAAGATAGCAGCCTGAGCT

GGCTGAACGCGAGCTGGTTTCGCGGCCTGGGCAACCTGCGCGTGCTGGATCTGAGCGAAA

ACTTTCTGTATAAATGCATTACCAAAACCAAAGCGTTTCAGGGCCTGACCCAGCTGCGCA

AACTGAACCTGAGCTTTAACTATCAGAAACGCGTGAGCTTTGCGCATCTGAGCCTGGCGC

CGAGCTTTGGCAGCCTGGTGGCGCTGAAAGAACTGGATATGCATGGCATTTTTTTTCGCA
```

-continued

```
GCCTGGATGAAACCACCCTGCGCCCGCTGGCGCGCCTGCCGATGCTGCAGACCCTGCGCC

TGCAGATGAACTTTATTAACCAGGCGCAGCTGGGCATTTTTCGCGCGTTTCCGGGCCTGC

GCTATGTGGATCTGAGCGATAACCGCATTAGCGGCGCGAGCGAACTGACCGCGACCATGG

GCGAAGCGGATGGCGGCGAAAAAGTGTGGCTGCAGCCGGGCGATCTGGCGCCGGCGCCGG

TGGATACCCCGAGCAGCGAAGATTTTCGCCCGAACTGCAGCACCCTGAACTTTACCCTGG

ATCTGAGCCGCAACAACCTGGTGACCGTGCAGCCGGAAATGTTTGCGCAGCTGAGCCATC

TGCAGTGCCTGCGCCTGAGCCATAACTGCATTAGCCAGGCGGTGAACGGCAGCCAGTTTC

TGCCGCTGACCGGCCTGCAGGTGCTGGATCTGAGCCATAACAAACTGGATCTGTATCATG

AACATAGCTTTACCGAACTGCCGCGCCTGGAAGCGCTGGATCTGAGCTATAACAGCCAGC

CGTTTGGCATGCAGGGCGTGGGCCATAACTTTAGCTTTGTGGCGCATCTGCGCACCCTGC

GCCATCTGAGCCTGGCGCATAACAACATTCATAGCCAGGTGAGCCAGCAGCTGTGCAGCA

CCAGCCTGCGCGCGCTGGATTTTAGCGGCAACGCGCTGGGCCATATGTGGGCGGAAGGCG

ATCTGTATCTGCATTTTTTTCAGGGCCTGAGCGGCCTGATTTGGCTGGATCTGAGCCAGA

ACCGCCTGCATACCCTGCTGCCGCAGACCCTGCGCAACCTGCCGAAAAGCCTGCAGGTGC

TGCGCCTGCGCGATAACTATCTGGCGTTTTTTAAATGGTGGAGCCTGCATTTTCTGCCGA

AACTGGAAGTGCTGGATCTGGCGGGCAACCAGCTGAAAGCGCTGACCAACGGCAGCCTGC

CGGCGGGCACCCGCCTGCGCCGCCTGGATGTGAGCTGCAACAGCATTAGCTTTGTGGCGC

CGGGCTTTTTTAGCAAAGCGAAAGAACTGCGCGAACTGAACCTGAGCGCGAACGCGCTGA

AAACCGTGGATCATAGCTGGTTTGGCCCGCTGGCGAGCGCGCTGCAGATTCTGGATGTGA

GCGCGAACCCGCTGCATTGCGCGTGCGGCGCGGCGTTTATGGATTTTCTGCTGGAAGTGC

AGGCGGCGGTGCCGGGCCTGCCGAGCCGCGTGAAATGCGGCAGCCCGGGCCAGCTGCAGG

GCCTGAGCATTTTTGCGCAGGATCTGCGCCTGTGCCTGGATGAAGCGCTGAGCTGGGATT

GCTTTGCGCTGAGCCTGCTGGCGGTGGCGCTGGGCCTGGCGTGCCGATGCTGCATCATC

TGTGCGGCTGGGATCTGTGGTATTGCTTTCATCTGTGCCTGGCGTGGCTGCCGTGGCGCG

GCCGCCAGAGCGGCCGCGATGAAGATGCGCTGCCGTATGATGCGTTTGTGGTGTTTGATA

AAACCCAGAGCGCGGTGGCGGATTGGGTGTATAACGAACTGCGCGGCCAGCTGGAAGAAT

GCCGCGGCCGCTGGGCGCTGCGCCTGTGCCTGGAAGAACGCGATTGGCTGCCGGGCAAAA

CCCTGTTTGAAAACCTGTGGGCGAGCGTGTATGGCAGCCGCAAAACCCTGTTTGTGCTGG

CGCATACCGATCGCGTGAGCGGCCTGCTGCGCGCGAGCTTTCTGCTGGCGCAGCAGCGCC

TGCTGGAAGATCGCAAAGATGTGGTGGTGCTGGTGATTCTGAGCCCGGATGGCCGCCGCA

GCCGCTATGTGCGCCTGCGCCAGCGCCTGTGCCGCCAGAGCGTGCTGCTGTGGCCGCATC

AGCCGAGCGGCCAGCGCAGCTTTTGGGCGCAGCTGGGCATGGCGCTGACCCGCGATAACC

ATCATTTTATAACCGCAACTTTTGCCAGGGCCCGACCGCGGAAGGGCGGATCAGGCGGA

TCACCCAAATCTTGTGACAAAACTCACACATGCCCACCGTGCCCAGCACCTGAACTCCTG

GGGGGACCGTCAGTCTTCCTCTTCCCCCCAAAACCCAAGGACACCCTCATGATCTCCCGG

ACCCCTGAGGTCACATGCGTGGTGGTGGACGTGAGCCACGAAGACCCTGAGGTCAAGTTC

AACTGGTACGTGGACGGCGTGGAGGTGCATAATGCCAAGACAAAGCCGCGGGAGGAGCAG

TACAACAGCACGTACCGTGTGGTCAGCGTCCTCACCGTCCTGCACCAGGACTGGCTGAAT

GGCAAGGAGTACAAGTGCAAGGTCTCCAACAAAGCCCTCCCAGCCCCCATCGAGAAAACC

ATCTCCAAAGCCAAAGGGCAGCCCCGAGAACCACAGGTGTACACCCTGCCCCCATCCCGG
```

-continued

GAGGAGATGACCAAGAACCAGGTCAGCCTGACCTGCCTGGTCAAAGGCTTCTATCCCAGC

GACATCGCCGTGGAGTGGGAGAGCAATGGGCAGCCGGAGAACAACTACAAGACCACGCCT

CCCGTGCTGGACTCCGACGGCTCCTTCTTCCTCTACAGCAAGCTCACCGTGGACAAGAGC

AGGTGGCAGCAGGGGAACGTCTTCTCATGCTCCGTGATGCATGAGGCTCTGCACAACCAC

TACACGCAGAAGAGCCTCTCCCTGTCTCCGGGTAAATAG 3'

SEQ ID NO. 5 (mRNA expression cassette No. 5-NGF-Fc):
5' ATGAGGGGCATGAAGCTGCTGGGGGCGCTGCTGGCACTGGCGGCCCTACTGCAGGGGG

CCGTGTCCATGAGCATGCTGTTTTATACCCTGATTACCGCGTTTCTGATTGGCATTCAGG

CGGAACCGCATAGCGAAAGCAACGTGCCGGCGGGCCATACCATTCCGCAGGCGCATTGGA

CCAAACTGCAGCATAGCCTGGATACCGCGCTGCGCCGCGCGCAGCGCGCCGGCGGCGG

CGATTGCGGCGCGCGTGGCGGGCCAGACCCGCAACATTACCGTGGATCCGCGCCTGTTTA

AAAAACGCCGCCTGCGCAGCCCGCGCGTGCTGTTTAGCACCCAGCCGCCGCGCGAAGCGG

CGGATACCCAGGATCTGGATTTTGAAGTGGGCGGCGCGGCGCCGTTTAACCGCACCCATC

GCAGCAAACGCAGCAGCAGCCATCCGATTTTTCATCGCGGCGAATTTAGCGTGTGCGATA

GCGTGAGCGTGTGGGTGGGCGATAAAACCACCGCGACCGATATTAAAGGCAAAGAAGTGA

TGGTGCTGGGCGAAGTGAACATTAACAACAGCGTGTTTAAACAGTATTTTTTTGAAACCA

AATGCCGCGATCCGAACCCGGTGGATAGCGGCTGCCGCGGCATTGATAGCAAACATTGGA

ACAGCTATTGCACCACCACCCATACCTTTGTGAAAGCGCTGACCATGGATGGCAAACAGG

CGGCGTGGCGCTTTATTCGCATTGATACCGCGTGCGTGTGCGTGCTGAGCCGCAAAGCGG

TGCGCCGCGCGGGCGGATCAGGCGGATCACCCAAATCTTGTGACAAAACTCACACATGCC

CACCGTGCCCAGCACCTGAACTCCTGGGGGGACCGTCAGTCTTCCTCTTCCCCCCAAAAC

CCAAGGACACCCTCATGATCTCCCGGACCCCTGAGGTCACATGCGTGGTGGTGGACGTGA

GCCACGAAGACCCTGAGGTCAAGTTCAACTGGTACGTGGACGGCGTGGAGGTGCATAATG

CCAAGACAAAGCCGCGGGAGGAGCAGTACAACAGCACGTACCGTGTGGTCAGCGTCCTCA

CCGTCCTGCACCAGGACTGGCTGAATGGCAAGGAGTACAAGTGCAAGGTCTCCAACAAAG

CCCTCCCAGCCCCCATCGAGAAAACCATCTCCAAAGCCAAAGGGCAGCCCCGAGAACCAC

AGGTGTACACCCTGCCCCCATCCCGGGAGGAGATGACCAAGAACCAGGTCAGCCTGACCT

GCCTGGTCAAAGGCTTCTATCCCAGCGACATCGCCGTGGAGTGGGAGAGCAATGGGCAGC

CGGAGAACAACTACAAGACCACGCCTCCCGTGCTGGACTCCGACGGCTCCTTCTTCCTCT

ACAGCAAGCTCACCGTGGACAAGAGCAGGTGGCAGCAGGGGAACGTCTTCTCATGCTCCG

TGATGCATGAGGCTCTGCACAACCACTACACGCAGAAGAGCCTCTCCCTGTCTCCGGGTA

AATAG 3'

SEQ ID NO. 6 (mRNA expression cassette No. 6-insulin-Fc):
5' ATGAGGGGCATGAAGCTGCTGGGGGCGCTGCTGGCACTGGCGGCCCTACTGCAGGGGG

CCGTGTCCATGGCGCTGTGGATGCGCCTGCTGCCGCTGCTGGCGCTGCTGGCGCTGTGGG

GCCCGGATCCGGCGGCGGCGTTTGTGAACCAGCATCTGTGCGGCAGCCATCTGGTGGAAG

CGCTGTATCTGGTGTGCGGCGAACGCGGCTTTTTTTATACCCCGAAAACCCGCCGCGAAG

CGGAAGATCTGCAGGTGGGCCAGGTGGAACTGGGCGGCGGCCCGGGCGCGGGCAGCCTGC

AGCCGCTGGCGCTGGAAGGCAGCCTGCAGAAACGCGGCATTGTGGAACAGTGCTGCACCA

GCATTTGCAGCCTGTATCAGCTGGAAAACTATTGCAACGGCGGATCAGGCGGATCACCC

AAATCTTGTGACAAAACTCACACATGCCCACCGTGCCCAGCACCTGAACTCCTGGGGGGA

CCGTCAGTCTTCCTCTTCCCCCCAAAACCCAAGGACACCCTCATGATCTCCCGGACCCCT

-continued

```
GAGGTCACATGCGTGGTGGTGGACGTGAGCCACGAAGACCCTGAGGTCAAGTTCAACTGG

TACGTGGACGGCGTGGAGGTGCATAATGCCAAGACAAAGCCGCGGGAGGAGCAGTACAAC

AGCACGTACCGTGTGGTCAGCGTCCTCACCGTCCTGCACCAGGACTGGCTGAATGGCAAG

GAGTACAAGTGCAAGGTCTCCAACAAAGCCCTCCCAGCCCCCATCGAGAAAACCATCTCC

AAAGCCAAAGGGCAGCCCCGAGAACCACAGGTGTACACCCTGCCCCCATCCCGGGAGGAG

ATGACCAAGAACCAGGTCAGCCTGACCTGCCTGGTCAAAGGCTTCTATCCCAGCGACATC

GCCGTGGAGTGGGAGAGCAATGGGCAGCCGGAGAACAACTACAAGACCACGCCTCCCGTG

CTGGACTCCGACGGCTCCTTCTTCCTCTACAGCAAGCTCACCGTGGACAAGAGCAGGTGG

CAGCAGGGGAACGTCTTCTCATGCTCCGTGATGCATGAGGCTCTGCACAACCACTACACG

CAGAAGAGCCTCTCCCTGTCTCCGGGTAAATAG 3'

SEQ ID NO: 7 = SEQ ID NO: 1 + SEQ ID NO: 2
5' TTCTAGAATAATCAACCTCTGGATTACAAAATTTGTGAAAGATTGACTGGTATTCTTA

ACTATGTTGCTCCTTTTACGCTATGTGGATACGCTGCTTTAATGCCTTTGTATCATGCTA

TTGCTTCCCGTATGGCTTTCATTTTCTCCTCCTTGTATAAATCCTGGTTGCTGTCTCTTT

ATGAGGAGTTGTGGCCCGTTGTCAGGCAACGTGGCGTGGTGTGCACTGTGTTTGCTGACG

CAACCCCCACTGGTTGGGGCATTGCCACCACCTGTCAGCTCCTTTCCGGGACTTTCGCTT

TCCCCCTCCCTATTGCCACGGCGGAACTCATCGCCGCCTGCCTTGCCCGCTGCTGGACAG

GGGCTCGGCTGTTGGGCACTGACAATTCCGTGGTGTTGTCGGGGAAATCATCGTCCTTTC

CTTGGCTGCTCGCCTGTGTTGCCACCTGGATTCTGCGCGGGACGTCCTTCTGCTACGTCC

CTTCGGCCCTCAATCCAGCGGACCTTCCTTCCCGCGGCCTGCTGCCGGCTCTGCGGCCTC

TTCCGCGTCTTCGCCTTCGCCCTCAGACGAGTCGGATCTCCCTTTGGGCCGCCTCCCCGC

CTAAGCTTATCGATACCGTCGAGATCTAACTTGTTTATTGCAGCTTATAATGGTTACAAA

TAAAGCAATAGCATCACAAATTTCACAAATAAAGCATTTTTTTCACTGCATTCTAGTTGT

GGTTTGTCCAAACTCATCAATGTATCTTATCATGTCTGGATCTCGACCTCGACTAGAGCA

TGGCTACGTAGATAAGTAGCATGGCGGGTTAATCATTAACTACAAGGAACCCCTAGTGAT

GGAGTTGGCCACTCCCTCTCTGCGCGCTCGCTCGCTCACTGAGGCCGGGCGACCAAAGGT

CGCCCGACGCCCGGGCTTTGCCCGGGCGGCCTCAGTGAGCGAGCGAGCGCGCCAGCTGGC

GTAATAGCGAAGAGGCCCGCACCGATCGCCCTTCCCAACAGTTGCGCAGCCTGAATGGCG

AATGGAATTCCAGACGATTGAGCGTCAAAATGTAGGTATTTCCATGAGCGTTTTTCCTGT

TGCAATGGCTGGCGGTAATATTGTTCTGGATATTACCAGCAAGGCCGATAGTTTGAGTTC

TTCTACTCAGGCAAGTGATGTTATTACTAATCAAAGAAGTATTGCGACAACGGTTAATTT

GCGTGATGGACAGACTCTTTTACTCGGTGGCCTCACTGATTATAAAAACACTTCTCAGGA

TTCTGGCGTACCGTTCCTGTCTAAAATCCCTTTAATCGGCCTCCTGTTTAGCTCCCGCTC

TGATTCTAACGAGGAAAGCACGTTATACGTGCTCGTCAAAGCAACCATAGTACGCGCCCT

GTAGCGGCGCATTAAGCGCGGCGGGTGTGGTGGTTACGCGCAGCGTGACCGCTACACTTG

CCAGCGCCCTAGCGCCCGCTCCTTTCGCTTTCTTCCCTTCCTTTCTCGCCACGTTCGCCG

GCTTTCCCCGTCAAGCTCTAAATCGGGGGCTCCCTTTAGGGTTCCGATTTAGTGCTTTAC

GGCACCTCGACCCCAAAAAACTTGATTAGGGTGATGGTTCACGTAGTGGGCCATCGCCCT

GATAGACGGTTTTTCGCCCTTTGACGTTGGAGTCCACGTTCTTTAATAGTGGACTCTTGT

TCCAAACTGGAACAACACTCAACCCTATCTCGGTCTATTCTTTTGATTTATAAGGGATTT

TGCCGATTTCGGCCTATTGGTTAAAAAATGAGCTGATTTAACAAAAATTTAACGCGAATT
```

```
-continued
TTAACAAAATATTAACGTTTACAATTTAAATATTTGCTTATACAATCTTCCTGTTTTTGG

GGCTTTTCTGATTATCAACCGGGGTACATATGATTGACATGCTAGTTTTACGATTACCGT

TCATCGATTCTCTTGTTTGCTCCAGACTCTCAGGCAATGACCTGATAGCCTTTGTAGAGA

CCTCTCAAAAATAGCTACCCTCTCCGGCATGAATTTATCAGCTAGAACGGTTGAATATCA

TATTGATGGTGATTTGACTGTCTCCGGCCTTTCTCACCCGTTTGAATCTTTACCTACACA

TTACTCAGGCATTGCATTTAAAATATATGAGGGTTCTAAAAATTTTTATCCTTGCGTTGA

AATAAAGGCTTCTCCCGCAAAAGTATTACAGGGTCATAATGTTTTTGGTACAACCGATTT

AGCTTTATGCTCTGAGGCTTTATTGCTTAATTTTGCTAATTCTTTGCCTTGCCTGTATGA

TTTATTGGATGTTGGAATTCCTGATGCGGTATTTTCTCCTTACGCATCTGTGCGGTATTT

CACACCGCATATGGTGCACTCTCAGTACAATCTGCTCTGATGCCGCATAGTTAAGCCAGC

CCCGACACCCGCCAACACCCGCTGACGCGCCCTGACGGGCTTGTCTGCTCCCGGCATCCG

CTTACAGACAAGCTGTGACCGTCTCCGGGAGCTGCATGTGTCAGAGGTTTTCACCGTCAT

CACCGAAACGCGCGAGACGAAAGGGCCTCGTGATACGCCTATTTTTATAGGTTAATGTCA

TGATAATAATGGTTTCTTAGACGTCAGGTGGCACTTTTCGGGGAAATGTGCGCGGAACCC

CTATTTGTTTATTTTTCTAAATACATTCAAATATGTATCCGCTCATGAGACAATAACCCT

GATAAATGCTTCAATAATATTGAAAAAGGAAGAGTATGAGTATTCAACATTTCCGTGTCG

CCCTTATTCCCTTTTTTGCGGCATTTTGCCTTCCTGTTTTTGCTCACCCAGAAACGCTGG

TGAAAGTAAAAGATGCTGAAGATCAGTTGGGTGCACGAGTGGGTTACATCGAACTGGATC

TCAACAGCGGTAAGATCCTTGAGAGTTTTCGCCCCGAAGAACGTTTTCCAATGATGAGCA

CTTTTAAAGTTCTGCTATGTGGCGCGGTATTATCCCGTATTGACGCCGGGCAAGAGCAAC

TCGGTCGCCGCATACACTATTCTCAGAATGACTTGGTTGAGTACTCACCAGTCACAGAAA

AGCATCTTACGGATGGCATGACAGTAAGAGAATTATGCAGTGCTGCCATAACCATGAGTG

ATAACACTGCGGCCAACTTACTTCTGACAACGATCGGAGGACCGAAGGAGCTAACCGCTT

TTTTGCACAACATGGGGGATCATGTAACTCGCCTTGATCGTTGGGAACCGGAGCTGAATG

AAGCCATACCAAACGACGAGCGTGACACCACGATGCCTGTAGCAATGGCAACAACGTTGC

GCAAACTATTAACTGGCGAACTACTTACTCTAGCTTCCCGGCAACAATTAATAGACTGGA

TGGAGGCGGATAAAGTTGCAGGACCACTTCTGCGCTCGGCCCTTCCGGCTGGCTGGTTTA

TTGCTGATAAATCTGGAGCCGGTGAGCGTGGGTCTCGCGGTATCATTGCAGCACTGGGGC

CAGATGGTAAGCCCTCCCGTATCGTAGTTATCTACACGACGGGGAGTCAGGCAACTATGG

ATGAACGAAATAGACAGATCGCTGAGATAGGTGCCTCACTGATTAAGCATTGGTAACTGT

CAGACCAAGTTTACTCATATATACTTTAGATTGATTTAAAACTTCATTTTTAATTTAAAA

GGATCTAGGTGAAGATCCTTTTTGATAATCTCATGACCAAAATCCCTTAACGTGAGTTTT

CGTTCCACTGAGCGTCAGACCCCGTAGAAAAGATCAAAGGATCTTCTTGAGATCCTTTTT

TTCTGCGCGTAATCTGCTGCTTGCAAACAAAAAAACCACCGCTACCAGCGGTGGTTTGTT

TGCCGGATCAAGAGCTACCAACTCTTTTTCCGAAGGTAACTGGCTTCAGCAGAGCGCAGA

TACCAAATACTGTCCTTCTAGTGTAGCCGTAGTTAGGCCACCACTTCAAGAACTCTGTAG

CACCGCCTACATACCTCGCTCTGCTAATCCTGTTACCAGTGGCTGCTGCCAGTGGCGATA

AGTCGTGTCTTACCGGGTTGGACTCAAGACGATAGTTACCGGATAAGGCGCAGCGGTCGG

GCTGAACGGGGGGTTCGTGCACACAGCCCAGCTTGGAGCGAACGACCTACACCGAACTGA

GATACCTACAGCGTGAGCTATGAGAAAGCGCCACGCTTCCCGAAGGGAGAAAGGCGGACA
```

-continued

```
GGTATCCGGTAAGCGGCAGGGTCGGAACAGGAGAGCGCACGAGGGAGCTTCCAGGGGGAA

ACGCCTGGTATCTTTATAGTCCTGTCGGGTTTCGCCACCTCTGACTTGAGCGTCGATTTT

TGTGATGCTCGTCAGGGGGGCGGAGCCTATGGAAAAACGCCAGCAACGCGGCCTTTTTAC

GGTTCCTGGCCTTTTGCTGGCCTTTTGCTCACATGTTCTTTCCTGCGTTATCCCCTGATT

CTGTGGATAACCGTATTACCGCCTTTGAGTGAGCTGATACCGCTCGCCGCAGCCGAACGA

CCGAGCGCAGCGAGTCAGTGAGCGAGGAAGCGGAAGAGCGCCCAATACGCAAACCGCCTC

TCCCCGCGCGTTGGCCGATTCATTAATGCAGCAGCTGCGCGCTCGCTCGCTCACTGAGGC

CGCCCGGGCAAAGCCCGGGCGTCGGGCGACCTTTGGTCGCCCGGCCTCAGTGAGCGAGCG

AGCGCGCAGAGAGGGAGTGGCCAACTCCATCACTAGGGGTTCCTTGTAGTTAATGATTAA

CCCGCCATGCTACTTATCTACGTAGCCATGCTCTAGGACATTGATTATTGACTAGTGGAG

TTCCGCGTTACATAACTTACGGTAAATGGCCCGCCTGGCTGACCGCCCAACGACCCCCGC

CCATTGACGTCAATAATGACGTATGTTCCCATAGTAACGCCAATAGGGACTTTCCATTGA

CGTCAATGGGTGGAGTATTTACGGTAAACTGCCCACTTGGCAGTACATCAAGTGTATCAT

ATGCCAAGTACGCCCCCTATTGACGTCAATGACGGTAAATGGCCCGCCTGGCATTATGCC

CAGTACATGACCTTATGGGACTTTCCTACTTGGCAGTACATCTACGTATTAGTCATCGCT

ATTACCATGGTCGAGGTGAGCCCCACGTTCTGCTTCACTCTCCCCATCTCCCCCCCCTCC

CCACCCCCAATTTTGTATTTATTTATTTTTAATTATTTTGTGCAGCGATGGGGGCGGGG

GGGGGGGGGGCGCGCGCCAGGCGGGGGGGGGGGGCGAGGGGCGGGGCGGGGCGAGGCG

GAGAGGTGCGGCGGCAGCCAATCAGAGCGGCGCGCTCCGAAAGTTTCCTTTTATGGCGAG

GCGGCGGCGGCGGCCCTATAAAAAGCGAAGCGCGCGGCGGGCGGGAGTCGCTGCGCG

CTGCCTTCGCCCCGTGCCCCGCTCCGCCGCCGCCTCGCGCCGCCCGCCCCGGCTCTGACT

GACCGCGTTACTAAAACAGGTAAGTCCGGCCTCCGCGCCGGGTTTTGGCGCCTCCCGCGG

GCGCCCCCCTCCTCACGGCGAGCGCTGCCACGTCAGACGAAGGGCGCAGCGAGCGTCCTG

ATCCTTCCGCCCGGACGCTCAGGACAGCGGCCCGCTGCTCATAAGACTCGGCCTTAGAAC

CCCAGTATCAGCAGAAGGACATTTTAGGACGGGACTTGGGTGACTCTAGGGCACTGGTTT

TCTTTCCAGAGAGCGGAACAGGCGAGGAAAAGTAGTCCCTTCTCGGCGATTCTGCGGAGG

GATCTCCGTGGGCGGTGAACGCCGATGATGCCTCTACTAACCATGTTCATGTTTTCTTT

TTTTTTCTACAGGTCCTGGGTGACGAACAGGGTACCGCCACCATGAGGGGCATGAAGCTG

CTGGGGCGCTGCTGGCACTGGCGGCCCTACTGCAGGGGCCGTGTCCCTGAAGATCGCA

GCCTTCAACATCCAGACATTTGGGGAGACCAAGATGTCCAATGCCACCCTCGTCAGCTAC

ATTGTGCAGATCCTGAGCCGCTATGACATCGCCCTGGTCCAGGAGGTCAGAGACAGCCAC

CTGACTGCCGTGGGGAAGCTGCTGGACAACCTCAATCAGGATGCACCAGACACCTATCAC

TACGTGGTCAGTGAGCCACTGGGACGGAACAGCTATAAGGAGCGCTACCTGTTCGTGTAC

AGGCCTGACCAGGTGTCTGCGGTGGACAGCTACTACTACGATGATGGCTGCGAGCCCTGC

GGGAACGACACCTTCAACCGAGAGCCAGCCATTGTCAGGTTCTTCTCCCGGTTCACAGAG

GTCAGGGAGTTTGCCATTGTTCCCCTGCATGCGGCCCCGGGGACGCAGTAGCCGAGATC

GACGCTCTCTATGACGTCTACCTGGATGTCCAAGAGAAATGGGGCTTGGAGGACGTCATG

TTGATGGGCGACTTCAATGCGGGCTGCAGCTATGTGAGACCCTCCCAGTGGTCATCCATC

CGCCTGTGGACAAGCCCCACCTTCCAGTGGCTGATCCCCGACAGCGCTGACACCACAGCT

ACACCCACGCACTGTGCCTATGACAGGATCGTGGTTGCAGGGATGCTGCTCCGAGGCGCC

GTTGTTCCCGACTCGGCTCTTCCCTTTAACTTCCAGGCTGCCTATGGCCTGAGTGACCAA
```

-continued

```
CTGGCCCAAGCCATCAGTGACCACTATCCAGTGGAGGTGATGCTGAAGGGCGGATCAGGC

GGATCACCCAAATCTTGTGACAAAACTCACACATGCCCACCGTGCCCAGCACCTGAACTC

CTGGGGGGACCGTCAGTCTTCCTCTTCCCCCCAAAACCCAAGGACACCCTCATGATCTCC

CGGACCCCTGAGGTCACATGCGTGGTGGTGGACGTGAGCCACGAAGACCCTGAGGTCAAG

TTCAACTGGTACGTGGACGGCGTGGAGGTGCATAATGCCAAGACAAAGCCGCGGGAGGAG

CAGTACAACAGCACGTACCGTGTGGTCAGCGTCCTCACCGTCCTGCACCAGGACTGGCTG

AATGGCAAGGAGTACAAGTGCAAGGTCTCCAACAAAGCCCTCCCAGCCCCCATCGAGAAA

ACCATCTCCAAAGCCAAAGGGCAGCCCCGAGAACCACAGGTGTACACCCTGCCCCCATCC

CGGGAGGAGATGACCAAGAACCAGGTCAGCCTGACCTGCCTGGTCAAAGGCTTCTATCCC

AGCGACATCGCCGTGGAGTGGGAGAGCAATGGGCAGCCGGAGAACAACTACAAGACCACG

CCTCCCGTGCTGGACTCCGACGGCTCCTTCTTCCTCTACAGCAAGCTCACCGTGGACAAG

AGCAGGTGGCAGCAGGGGAACGTCTTCTCATGCTCCGTGATGCATGAGGCTCTGCACAAC

CACTACACGCAGAAGAGCCTCTCCCTGTCTCCGGGTAAATAG 3'

SEQ ID NO: 8 = SEQ ID NO: 1 + SEQ ID NO: 3
5' TTCTAGAATAATCAACCTCTGGATTACAAAATTTGTGAAAGATTGACTGGTATTCTTA

ACTATGTTGCTCCTTTTACGCTATGTGGATACGCTGCTTTAATGCCTTTGTATCATGCTA

TTGCTTCCCGTATGGCTTTCATTTTCTCCTCCTTGTATAAATCCTGGTTGCTGTCTCTTT

ATGAGGAGTTGTGGCCCGTTGTCAGGCAACGTGGCGTGGTGTGCACTGTGTTTGCTGACG

CAACCCCCACTGGTTGGGGCATTGCCACCACCTGTCAGCTCCTTTCCGGGACTTTCGCTT

TCCCCCTCCCTATTGCCACGGCGGAACTCATCGCCGCCTGCCTTGCCCGCTGCTGGACAG

GGGCTCGGCTGTTGGGCACTGACAATTCCGTGGTGTTGTCGGGGAAATCATCGTCCTTTC

CTTGGCTGCTCGCCTGTGTTGCCACCTGGATTCTGCGCGGGACGTCCTTCTGCTACGTCC

CTTCGGCCCTCAATCCAGCGGACCTTCCTTCCCGCGGCCTGCTGCCGGCTCTGCGGCCTC

TTCCGCGTCTTCGCCTTCGCCCTCAGACGAGTCGGATCTCCCTTTGGGCCGCCTCCCCGC

CTAAGCTTATCGATACCGTCGAGATCTAACTTGTTTATTGCAGCTTATAATGGTTACAAA

TAAAGCAATAGCATCACAAATTTCACAAATAAAGCATTTTTTCACTGCATTCTAGTTGT

GGTTTGTCCAAACTCATCAATGTATCTTATCATGTCTGGATCTCGACCTCGACTAGAGCA

TGGCTACGTAGATAAGTAGCATGGCGGGTTAATCATTAACTACAAGGAACCCCTAGTGAT

GGAGTTGGCCACTCCCTCTCTGCGCGCTCGCTCGCTCACTGAGGCCGGGCGACCAAAGGT

CGCCCGACGCCCGGGCTTTGCCCGGGCGGCCTCAGTGAGCGAGCGAGCGCGCCAGCTGGC

GTAATAGCGAAGAGGCCCGCACCGATCGCCCTTCCCAACAGTTGCGCAGCCTGAATGGCG

AATGGAATTCCAGACGATTGAGCGTCAAAATGTAGGTATTTCCATGAGCGTTTTTCCTGT

TGCAATGGCTGGCGGTAATATTGTTCTGGATATTACCAGCAAGGCCGATAGTTTGAGTTC

TTCTACTCAGGCAAGTGATGTTATTACTAATCAAAGAAGTATTGCGACAACGGTTAATTT

GCGTGATGGACAGACTCTTTTACTCGGTGGCCTCACTGATTATAAAAACACTTCTCAGGA

TTCTGGCGTACCGTTCCTGTCTAAAATCCCTTTAATCGGCCTCCTGTTTAGCTCCCGCTC

TGATTCTAACGAGGAAAGCACGTTATACGTGCTCGTCAAAGCAACCATAGTACGCGCCCT

GTAGCGGCGCATTAAGCGCGGCGGGTGTGGTGGTTACGCGCAGCGTGACCGCTACACTTG

CCAGCGCCCTAGCGCCCGCTCCTTTCGCTTTCTTCCCTTCCTTTCTCGCCACGTTCGCCG

GCTTTCCCCGTCAAGCTCTAAATCGGGGGCTCCCTTTAGGGTTCCGATTTAGTGCTTTAC

GGCACCTCGACCCCAAAAAACTTGATTAGGGTGATGGTTCACGTAGTGGGCCATCGCCCT
```

```
GATAGACGGTTTTTCGCCCTTTGACGTTGGAGTCCACGTTCTTTAATAGTGGACTCTTGT

TCCAAACTGGAACAACACTCAACCCTATCTCGGTCTATTCTTTTGATTTATAAGGGATTT

TGCCGATTTCGGCCTATTGGTTAAAAAATGAGCTGATTTAACAAAAATTTAACGCGAATT

TTAACAAAATATTAACGTTTACAATTTAAATATTTGCTTATACAATCTTCCTGTTTTTGG

GGCTTTTCTGATTATCAACCGGGGTACATATGATTGACATGCTAGTTTTACGATTACCGT

TCATCGATTCTCTTGTTTGCTCCAGACTCTCAGGCAATGACCTGATAGCCTTTGTAGAGA

CCTCTCAAAAATAGCTACCCTCTCCGGCATGAATTTATCAGCTAGAACGGTTGAATATCA

TATTGATGGTGATTTGACTGTCTCCGGCCTTTCTCACCCGTTTGAATCTTTACCTACACA

TTACTCAGGCATTGCATTTAAAATATATGAGGGTTCTAAAAATTTTTATCCTTGCGTTGA

AATAAAGGCTTCTCCCGCAAAAGTATTACAGGGTCATAATGTTTTTGGTACAACCGATTT

AGCTTTATGCTCTGAGGCTTTATTGCTTAATTTTGCTAATTCTTTGCCTTGCCTGTATGA

TTTATTGGATGTTGGAATTCCTGATGCGGTATTTTCTCCTTACGCATCTGTGCGGTATTT

CACACCGCATATGGTGCACTCTCAGTACAATCTGCTCTGATGCCGCATAGTTAAGCCAGC

CCCGACACCCGCCAACACCCGCTGACGCGCCCTGACGGGCTTGTCTGCTCCCGGCATCCG

CTTACAGACAAGCTGTGACCGTCTCCGGGAGCTGCATGTGTCAGAGGTTTTCACCGTCAT

CACCGAAACGCGCGAGACGAAAGGGCCTCGTGATACGCCTATTTTTATAGGTTAATGTCA

TGATAATAATGGTTTCTTAGACGTCAGGTGGCACTTTTCGGGGAAATGTGCGCGGAACCC

CTATTTGTTTATTTTTCTAAATACATTCAAATATGTATCCGCTCATGAGACAATAACCCT

GATAAATGCTTCAATAATATTGAAAAAGGAAGAGTATGAGTATTCAACATTTCCGTGTCG

CCCTTATTCCCTTTTTTGCGGCATTTTGCCTTCCTGTTTTTGCTCACCCAGAAACGCTGG

TGAAAGTAAAAGATGCTGAAGATCAGTTGGGTGCACGAGTGGGTTACATCGAACTGGATC

TCAACAGCGGTAAGATCCTTGAGAGTTTTCGCCCCGAAGAACGTTTTCCAATGATGAGCA

CTTTTAAAGTTCTGCTATGTGGCGCGGTATTATCCCGTATTGACGCCGGGCAAGAGCAAC

TCGGTCGCCGCATACACTATTCTCAGAATGACTTGGTTGAGTACTCACCAGTCACAGAAA

AGCATCTTACGGATGGCATGACAGTAAGAGAATTATGCAGTGCTGCCATAACCATGAGTG

ATAACACTGCGGCCAACTTACTTCTGACAACGATCGGAGGACCGAAGGAGCTAACCGCTT

TTTTGCACAACATGGGGGATCATGTAACTCGCCTTGATCGTTGGGAACCGGAGCTGAATG

AAGCCATACCAAACGACGAGCGTGACACCACGATGCCTGTAGCAATGGCAACAACGTTGC

GCAAACTATTAACTGGCGAACTACTTACTCTAGCTTCCCGGCAACAATTAATAGACTGGA

TGGAGGCGGATAAAGTTGCAGGACCACTTCTGCGCTCGGCCCTTCCGGCTGGCTGGTTTA

TTGCTGATAAATCTGGAGCCGGTGAGCGTGGGTCTCGCGGTATCATTGCAGCACTGGGGC

CAGATGGTAAGCCCTCCCGTATCGTAGTTATCTACACGACGGGGAGTCAGGCAACTATGG

ATGAACGAAATAGACAGATCGCTGAGATAGGTGCCTCACTGATTAAGCATTGGTAACTGT

CAGACCAAGTTTACTCATATATACTTTAGATTGATTTAAAACTTCATTTTTAATTTAAAA

GGATCTAGGTGAAGATCCTTTTTGATAATCTCATGACCAAAATCCCTTAACGTGAGTTTT

CGTTCCACTGAGCGTCAGACCCCGTAGAAAAGATCAAAGGATCTTCTTGAGATCCTTTTT

TTCTGCGCGTAATCTGCTGCTTGCAAACAAAAAAACCACCGCTACCAGCGGTGGTTTGTT

TGCCGGATCAAGAGCTACCAACTCTTTTTCCGAAGGTAACTGGCTTCAGCAGAGCGCAGA

TACCAAATACTGTCCTTCTAGTGTAGCCGTAGTTAGGCCACCACTTCAAGAACTCTGTAG

CACCGCCTACATACCTCGCTCTGCTAATCCTGTTACCAGTGGCTGCTGCCAGTGGCGATA
```

-continued

```
AGTCGTGTCTTACCGGGTTGGACTCAAGACGATAGTTACCGGATAAGGCGCAGCGGTCGG
GCTGAACGGGGGGTTCGTGCACACAGCCCAGCTTGGAGCGAACGACCTACACCGAACTGA
GATACCTACAGCGTGAGCTATGAGAAAGCGCCACGCTTCCCGAAGGGAGAAAGGCGGACA
GGTATCCGGTAAGCGGCAGGGTCGGAACAGGAGAGCGCACGAGGGAGCTTCCAGGGGGAA
ACGCCTGGTATCTTTATAGTCCTGTCGGGTTTCGCCACCTCTGACTTGAGCGTCGATTTT
TGTGATGCTCGTCAGGGGGCGGAGCCTATGGAAAAACGCCAGCAACGCGGCCTTTTTAC
GGTTCCTGGCCTTTTGCTGGCCTTTTGCTCACATGTTCTTTCCTGCGTTATCCCCTGATT
CTGTGGATAACCGTATTACCGCCTTTGAGTGAGCTGATACCGCTCGCCGCAGCCGAACGA
CCGAGCGCAGCGAGTCAGTGAGCGAGGAAGCGGAAGAGCGCCCAATACGCAAACCGCCTC
TCCCCGCGCGTTGGCCGATTCATTAATGCAGCAGCTGCGCGCTCGCTCGCTCACTGAGGC
CGCCCGGGCAAAGCCCGGGCGTCGGGCGACCTTTGGTCGCCCGGCCTCAGTGAGCGAGCG
AGCGCGCAGAGAGGGAGTGGCCAACTCCATCACTAGGGGTTCCTTGTAGTTAATGATTAA
CCCGCCATGCTACTTATCTACGTAGCCATGCTCTAGGACATTGATTATTGACTAGTGGAG
TTCCGCGTTACATAACTTACGGTAAATGGCCCGCCTGGCTGACCGCCCAACGACCCCCGC
CCATTGACGTCAATAATGACGTATGTTCCCATAGTAACGCCAATAGGGACTTTCCATTGA
CGTCAATGGGTGGAGTATTTACGGTAAACTGCCCACTTGGCAGTACATCAAGTGTATCAT
ATGCCAAGTACGCCCCCTATTGACGTCAATGACGGTAAATGGCCCGCCTGGCATTATGCC
CAGTACATGACCTTATGGGACTTTCCTACTTGGCAGTACATCTACGTATTAGTCATCGCT
ATTACCATGGTCGAGGTGAGCCCCACGTTCTGCTTCACTCTCCCCATCTCCCCCCCTCC
CCACCCCCAATTTTGTATTTATTTATTTTTTAATTATTTTGTGCAGCGATGGGGGCGGGG
GGGGGGGGGGCGCGCGCCAGGCGGGGGGGGGGGGCGAGGGGCGGGCGGGGCGAGGCG
GAGAGGTGCGGCGGCAGCCAATCAGAGCGGCGCGCTCCGAAAGTTTCCTTTTATGGCGAG
GCGGCGGCGGCGGCCCTATAAAAAGCGAAGCGCGCGGCGGGCGGGAGTCGCTGCGCG
CTGCCTTCGCCCCGTGCCCCGCTCCGCCGCCGCCTCGCGCCGCCCGCCCCGGCTCTGACT
GACCGCGTTACTAAAACAGGTAAGTCCGGCCTCCGCGCCGGGTTTTGGCGCCTCCCGCGG
GCGCCCCCTCCTCACGGCGAGCGCTGCCACGTCAGACGAAGGGCGCAGCGAGCGTCCTG
ATCCTTCCGCCCGGACGCTCAGGACAGCGGCCCGCTGCTCATAAGACTCGGCCTTAGAAC
CCCAGTATCAGCAGAAGGACATTTTAGGACGGGACTTGGGTGACTCTAGGGCACTGGTTT
TCTTTCCAGAGAGCGGAACAGGCGAGGAAAAGTAGTCCCTTCTCGGCGATTCTGCGGAGG
GATCTCCGTGGGCGGTGAACGCCGATGATGCCTCTACTAACCATGTTCATGTTTTCTTT
TTTTTTCTACAGGTCCTGGGTGACGAACAGGGTACCGCCACCGCCAGACCCTGCCGTGCA
TTTATTTTTGGGGCGGCCTGCTGCCGTTTGGCATGCTGTGCGCGAGCAGCACCACCAAAT
GCACCGTGAGCCATGAAGTGGCGGATTGCAGCCATCTGAAACTGACCCAGGTGCCGGATG
ATCTGCCGACCAACATTACCGTGCTGAACCTGACCCATAACCAGCTGCGCCGCCTGCCGG
CGGCGAACTTTACCCGCTATAGCCAGCTGACCAGCCTGGATGTGGGCTTTAACACCATTA
GCAAACTGGAACCGGAACTGTGCCAGAAACTGCCGATGCTGAAAGTGCTGAACCTGCAGC
ATAACGAACTGAGCCAGCTGAGCGATAAAACCTTTGCGTTTTGCACCAACCTGACCGAAC
TGCATCTGATGAGCAACAGCATTCAGAAAATTAAAAACAACCCGTTTGTGAAACAGAAAA
ACCTGATTACCCTGGATCTGAGCCATAACGGCCTGAGCAGCACCAAACTGGGCACCCAGG
TGCAGCTGGAAAACCTGCAGGAACTGCTGCTGAGCAACAACAAAATTCAGGCGCTGAAAA
GCGAAGAACTGGATATTTTTGCGAACAGCAGCCTGAAAAAACTGGAACTGAGCAGCAACC
```

```
-continued
AGATTAAAGAATTTAGCCCGGGCTGCTTTCATGCGATTGGCCGCCTGTTTGGCCTGTTTC

TGAACAACGTGCAGCTGGGCCCGAGCCTGACCGAAAAACTGTGCCTGGAACTGGCGAACA

CCAGCATTCGCAACCTGAGCCTGAGCAACAGCCAGCTGAGCACCACCAGCAACACCACCT

TTCTGGGCCTGAAATGGACCAACCTGACCATGCTGGATCTGAGCTATAACAACCTGAACG

TGGTGGGCAACGATAGCTTTGCGTGGCTGCCGCAGCTGGAATATTTTTTCTGGAATATA

ACAACATTCAGCATCTGTTTAGCCATAGCCTGCATGGCCTGTTTAACGTGCGCTATCTGA

ACCTGAAACGCAGCTTTACCAAACAGAGCATTAGCCTGGCGAGCCTGCCGAAAATTGATG

ATTTTAGCTTTCAGTGGCTGAAATGCCTGGAACATCTGAACATGGAAGATAACGATATTC

CGGGCATTAAAAGCAACATGTTTACCGGCCTGATTAACCTGAAATATCTGAGCCTGAGCA

ACAGCTTTACCAGCCTGCGCACCCTGACCAACGAAACCTTTGTGAGCCTGGCGCATAGCC

CGCTGCATATTCTGAACCTGACCAAAAACAAAATTAGCAAAATTGAAAGCGATGCGTTTA

GCTGGCTGGGCCATCTGGAAGTGCTGGATCTGGGCCTGAACGAAATTGGCCAGGAACTGA

CCGGCCAGGAATGGCGCGGCCTGGAAAACATTTTTGAAATTTATCTGAGCTATAACAAAT

ATCTGCAGCTGACCCGCAACAGCTTTGCGCTGGTGCCGAGCCTGCAGCGCCTGATGCTGC

GCCGCGTGGCGCTGAAAAACGTGGATAGCAGCCCGAGCCCGTTTCAGCCGCTGCGCAACC

TGACCATTCTGGATCTGAGCAACAACAACATTGCGAACATTAACGATGATATGCTGGAAG

GCCTGGAAAAACTGGAAATTCTGGATCTGCAGCATAACAACCTGGCGCGCCTGTGGAAAC

ATGCGAACCCGGGCGGCCCGATTTATTTTCTGAAAGGCCTGAGCCATCTGCATATTCTGA

ACCTGGAAAGCAACGGCTTTGATGAAATTCCGGTGGAAGTGTTTAAAGATCTGTTTGAAC

TGAAAATTATTGATCTGGGCCTGAACAACCTGAACACCCTGCCGGCGAGCGTGTTTAACA

ACCAGGTGAGCCTGAAAAGCCTGAACCTGCAGAAAAACCTGATTACCAGCGTGGAAAAAA

AAGTGTTTGGCCCGGCGTTTCGCAACCTGACCGAACTGGATATGCGCTTTAACCCGTTTG

ATTGCACCTGCGAAAGCATTGCGTGGTTTGTGAACTGGATTAACGAAACCCATACCAACA

TTCCGGAACTGAGCAGCCATTATCTGTGCAACACCCCGCCGCATTATCATGGCTTTCCGG

TGCGCCTGTTTGATACCAGCAGCTGCAAAGATAGCGCGCCGTTTGAACTGTTTTTTATGA

TTAACACCAGCATTCTGCTGATTTTTATTTTATTGTGCTGCTGATTCATTTTGAAGGCT

GGCGCATTAGCTTTTATTGGAACGTGAGCGTGCATCGCGTGCTGGGCTTTAAAGAAATTG

ATCGCCAGACCGAACAGTTTGAATATGCGGCGTATATTATTCATGCGTATAAAGATAAAG

ATTGGGTGTGGGAACATTTTAGCAGCATGGAAAAAGAAGATCAGAGCCTGAAATTTTGCC

TGGAAGAACGCGATTTTGAAGCGGGCGTGTTTGAACTGGAAGCGATTGTGAACAGCATTA

AACGCAGCCGCAAAATTATTTTTGTGATTACCCATCATCTGCTGAAAGATCCGCTGTGCA

AACGCTTTAAAGTGCATCATGCGGTGCAGCAGGCGATTGAACAGAACCTGGATAGCATTA

TTCTGGTGTTTCTGGAAGAAATTCCGGATTATAAACTGAACCATGCGCTGTGCCTGCGCC

GCGGCATGTTTAAAAGCCATTGCATTCTGAACTGGCCGGTGCAGAAAGAACGCATTGGCG

CGTTTCGCCATAAACTGCAGGTGGCGCTGGGCAGCAAAAACAGCGTGCATGGGCGGATCA

GGCGGATCACCCAAATCTTGTGACAAAACTCACACATGCCCACCGTGCCCAGCACCTGAA

CTCCTGGGGGGACCGTCAGTCTTCCTCTTCCCCCCAAAACCCAAGGACACCCTCATGATC

TCCCGGACCCCTGAGGTCACATGCGTGGTGGTGGACGTGAGCCACGAAGACCCTGAGGTC

AAGTTCAACTGGTACGTGGACGGCGTGGAGGTGCATAATGCCAAGACAAAGCCGCGGGAG

GAGCAGTACAACAGCACGTACCGTGTGGTCAGCGTCCTCACCGTCCTGCACCAGGACTGG
```

-continued

```
CTGAATGGCAAGGAGTACAAGTGCAAGGTCTCCAACAAAGCCCTCCCAGCCCCCATCGAG

AAAACCATCTCCAAAGCCAAAGGGCAGCCCCGAGAACCACAGGTGTACACCCTGCCCCCA

TCCCGGGAGGAGATGACCAAGAACCAGGTCAGCCTGACCTGCCTGGTCAAAGGCTTCTAT

CCCAGCGACATCGCCGTGGAGTGGGAGAGCAATGGGCAGCCGGAGAACAACTACAAGACC

ACGCCTCCCGTGCTGGACTCCGACGGCTCCTTCTTCCTCTACAGCAAGCTCACCGTGGAC

AAGAGCAGGTGGCAGCAGGGGAACGTCTTCTCATGCTCCGTGATGCATGAGGCTCTGCAC

AACCACTACACGCAGAAGAGCCTCTCCCTGTCTCCGGGTAAATAG 3'
```

SEQ ID NO: 9 = SEQ ID NO: 1 + SEQ ID NO: 4

```
5' TTCTAGAATAATCAACCTCTGGATTACAAAATTTGTGAAAGATTGACTGGTATTCTTA

ACTATGTTGCTCCTTTTACGCTATGTGGATACGCTGCTTTAATGCCTTTGTATCATGCTA

TTGCTTCCCGTATGGCTTTCATTTTCTCCTCCTTGTATAAATCCTGGTTGCTGTCTCTTT

ATGAGGAGTTGTGGCCCGTTGTCAGGCAACGTGGCGTGGTGTGCACTGTGTTTGCTGACG

CAACCCCCACTGGTTGGGGCATTGCCACCACCTGTCAGCTCCTTTCCGGGACTTTCGCTT

TCCCCCTCCCTATTGCCACGGCGGAACTCATCGCCGCCTGCCTTGCCCGCTGCTGGACAG

GGGCTCGGCTGTTGGGCACTGACAATTCCGTGGTGTTGTCGGGGAAATCATCGTCCTTTC

CTTGGCTGCTCGCCTGTGTTGCCACCTGGATTCTGCGCGGGACGTCCTTCTGCTACGTCC

CTTCGGCCCTCAATCCAGCGGACCTTCCTTCCCGCGGCCTGCTGCCGGCTCTGCGGCCTC

TTCCGCGTCTTCGCCTTCGCCCTCAGACGAGTCGGATCTCCCTTTGGGCCGCCTCCCCGC

CTAAGCTTATCGATACCGTCGAGATCTAACTTGTTTATTGCAGCTTATAATGGTTACAAA

TAAAGCAATAGCATCACAAATTTCACAAATAAAGCATTTTTTTCACTGCATTCTAGTTGT

GGTTTGTCCAAACTCATCAATGTATCTTATCATGTCTGGATCTCGACCTCGACTAGAGCA

TGGCTACGTAGATAAGTAGCATGGCGGGTTAATCATTAACTACAAGGAACCCCTAGTGAT

GGAGTTGGCCACTCCCTCTCTGCGCGCTCGCTCGCTCACTGAGGCCGGGCGACCAAAGGT

CGCCCGACGCCCGGGCTTTGCCCGGGCGGCCTCAGTGAGCGAGCGAGCGCGCCAGCTGGC

GTAATAGCGAAGAGGCCCGCACCGATCGCCCTTCCCAACAGTTGCGCAGCCTGAATGGCG

AATGGAATTCCAGACGATTGAGCGTCAAAATGTAGGTATTTCCATGAGCGTTTTTCCTGT

TGCAATGGCTGGCGGTAATATTGTTCTGGATATTACCAGCAAGGCCGATAGTTTGAGTTC

TTCTACTCAGGCAAGTGATGTTATTACTAATCAAAGAAGTATTGCGACAACGGTTAATTT

GCGTGATGGACAGACTCTTTTACTCGGTGGCCTCACTGATTATAAAAACACTTCTCAGGA

TTCTGGCGTACCGTTCCTGTCTAAAATCCCTTTAATCGGCCTCCTGTTTAGCTCCCGCTC

TGATTCTAACGAGGAAAGCACGTTATACGTGCTCGTCAAAGCAACCATAGTACGCGCCCT

GTAGCGGCGCATTAAGCGCGGCGGGTGTGGTGGTTACGCGCAGCGTGACCGCTACACTTG

CCAGCGCCCTAGCGCCCGCTCCTTTCGCTTTCTTCCCTTCCTTTCTCGCCACGTTCGCCG

GCTTTCCCCGTCAAGCTCTAAATCGGGGGCTCCCTTTAGGGTTCCGATTTAGTGCTTTAC

GGCACCTCGACCCCAAAAAACTTGATTAGGGTGATGGTTCACGTAGTGGGCCATCGCCCT

GATAGACGGTTTTTCGCCCTTTGACGTTGGAGTCCACGTTCTTTAATAGTGGACTCTTGT

TCCAAACTGGAACAACACTCAACCCTATCTCGGTCTATTCTTTTGATTTATAAGGGATTT

TGCCGATTTCGGCCTATTGGTTAAAAAATGAGCTGATTTAACAAAAATTTAACGCGAATT

TTAACAAAATATTAACGTTTACAATTTAAATATTTGCTTATACAATCTTCCTGTTTTTGG

GGCTTTTCTGATTATCAACGGGGTACATATGATTGACATGCTAGTTTTACGATTACCGT

TCATCGATTCTCTTGTTTGCTCCAGACTCTCAGGCAATGACCTGATAGCCTTTGTAGAGA
```

-continued

```
CCTCTCAAAAATAGCTACCCTCTCCGGCATGAATTTATCAGCTAGAACGGTTGAATATCA
TATTGATGGTGATTTGACTGTCTCCGGCCTTTCTCACCCGTTTGAATCTTTACCTACACA
TTACTCAGGCATTGCATTTAAAATATATGAGGGTTCTAAAAATTTTTATCCTTGCGTTGA
AATAAAGGCTTCTCCCGCAAAAGTATTACAGGGTCATAATGTTTTTGGTACAACCGATTT
AGCTTTATGCTCTGAGGCTTTATTGCTTAATTTTGCTAATTCTTTGCCTTGCCTGTATGA
TTTATTGGATGTTGGAATTCCTGATGCGGTATTTTCTCCTTACGCATCTGTGCGGTATTT
CACACCGCATATGGTGCACTCTCAGTACAATCTGCTCTGATGCCGCATAGTTAAGCCAGC
CCCGACACCCGCCAACACCCGCTGACGCGCCCTGACGGGCTTGTCTGCTCCCGGCATCCG
CTTACAGACAAGCTGTGACCGTCTCCGGGAGCTGCATGTGTCAGAGGTTTTCACCGTCAT
CACCGAAACGCGCGAGACGAAAGGGCCTCGTGATACGCCTATTTTTATAGGTTAATGTCA
TGATAATAATGGTTTCTTAGACGTCAGGTGGCACTTTTCGGGGAAATGTGCGCGGAACCC
CTATTTGTTTATTTTTCTAAATACATTCAAATATGTATCCGCTCATGAGACAATAACCCT
GATAAATGCTTCAATAATATTGAAAAAGGAAGAGTATGAGTATTCAACATTTCCGTGTCG
CCCTTATTCCCTTTTTTGCGGCATTTTGCCTTCCTGTTTTTGCTCACCCAGAAACGCTGG
TGAAAGTAAAAGATGCTGAAGATCAGTTGGGTGCACGAGTGGGTTACATCGAACTGGATC
TCAACAGCGGTAAGATCCTTGAGAGTTTTCGCCCCGAAGAACGTTTTCCAATGATGAGCA
CTTTTAAAGTTCTGCTATGTGGCGCGGTATTATCCCGTATTGACGCCGGGCAAGAGCAAC
TCGGTCGCCGCATACACTATTCTCAGAATGACTTGGTTGAGTACTCACCAGTCACAGAAA
AGCATCTTACGGATGGCATGACAGTAAGAGAATTATGCAGTGCTGCCATAACCATGAGTG
ATAACACTGCGGCCAACTTACTTCTGACAACGATCGGAGGACCGAAGGAGCTAACCGCTT
TTTTGCACAACATGGGGGATCATGTAACTCGCCTTGATCGTTGGGAACCGGAGCTGAATG
AAGCCATACCAAACGACGAGCGTGACACCACGATGCCTGTAGCAATGGCAACAACGTTGC
GCAAACTATTAACTGGCGAACTACTTACTCTAGCTTCCCGGCAACAATTAATAGACTGGA
TGGAGGCGGATAAAGTTGCAGGACCACTTCTGCGCTCGGCCCTTCCGGCTGGCTGGTTTA
TTGCTGATAAATCTGGAGCCGGTGAGCGTGGGTCTCGCGGTATCATTGCAGCACTGGGGC
CAGATGGTAAGCCCTCCCGTATCGTAGTTATCTACACGACGGGGAGTCAGGCAACTATGG
ATGAACGAAATAGACAGATCGCTGAGATAGGTGCCTCACTGATTAAGCATTGGTAACTGT
CAGACCAAGTTTACTCATATATACTTTAGATTGATTTAAAACTTCATTTTTAATTTAAAA
GGATCTAGGTGAAGATCCTTTTTGATAATCTCATGACCAAAATCCCTTAACGTGAGTTTT
CGTTCCACTGAGCGTCAGACCCCGTAGAAAAGATCAAAGGATCTTCTTGAGATCCTTTTT
TTCTGCGCGTAATCTGCTGCTTGCAAACAAAAAAACCACCGCTACCAGCGGTGGTTTGTT
TGCCGGATCAAGAGCTACCAACTCTTTTTCCGAAGGTAACTGGCTTCAGCAGAGCGCAGA
TACCAAATACTGTCCTTCTAGTGTAGCCGTAGTTAGGCCACCACTTCAAGAACTCTGTAG
CACCGCCTACATACCTCGCTCTGCTAATCCTGTTACCAGTGGCTGCTGCCAGTGGCGATA
AGTCGTGTCTTACCGGGTTGGACTCAAGACGATAGTTACCGGATAAGGCGCAGCGGTCGG
GCTGAACGGGGGGTTCGTGCACACAGCCCAGCTTGGAGCGAACGACCTACACCGAACTGA
GATACCTACAGCGTGAGCTATGAGAAAGCGCCACGCTTCCCGAAGGGAGAAAGGCGGACA
GGTATCCGGTAAGCGGCAGGGTCGGAACAGGAGAGCGCACGAGGGAGCTTCCAGGGGGAA
ACGCCTGGTATCTTTATAGTCCTGTCGGGTTTCGCCACCTCTGACTTGAGCGTCGATTTT
TGTGATGCTCGTCAGGGGGCGGAGCCTATGGAAAAACGCCAGCAACGCGGCCTTTTTAC
GGTTCCTGGCCTTTTGCTGGCCTTTTGCTCACATGTTCTTTCCTGCGTTATCCCCTGATT
```

```
CTGTGGATAACCGTATTACCGCCTTTGAGTGAGCTGATACCGCTCGCCGCAGCCGAACGA

CCGAGCGCAGCGAGTCAGTGAGCGAGGAAGCGGAAGAGCGCCCAATACGCAAACCGCCTC

TCCCCGCGCGTTGGCCGATTCATTAATGCAGCAGCTGCGCGCTCGCTCGCTCACTGAGGC

CGCCCGGGCAAAGCCCGGGCGTCGGGCGACCTTTGGTCGCCCGGCCTCAGTGAGCGAGCG

AGCGCGCAGAGAGGGAGTGGCCAACTCCATCACTAGGGGTTCCTTGTAGTTAATGATTAA

CCCGCCATGCTACTTATCTACGTAGCCATGCTCTAGGACATTGATTATTGACTAGTGGAG

TTCCGCGTTACATAACTTACGGTAAATGGCCCGCCTGGCTGACCGCCCAACGACCCCCGC

CCATTGACGTCAATAATGACGTATGTTCCCATAGTAACGCCAATAGGGACTTTCCATTGA

CGTCAATGGGTGGAGTATTTACGGTAAACTGCCCACTTGGCAGTACATCAAGTGTATCAT

ATGCCAAGTACGCCCCCTATTGACGTCAATGACGGTAAATGGCCCGCCTGGCATTATGCC

CAGTACATGACCTTATGGGACTTTCCTACTTGGCAGTACATCTACGTATTAGTCATCGCT

ATTACCATGGTCGAGGTGAGCCCCACGTTCTGCTTCACTCTCCCCATCTCCCCCCCCTCC

CCACCCCCAATTTTGTATTTATTTATTTTTAATTATTTTGTGCAGCGATGGGGGCGGGG

GGGGGGGGGGCGCGCGCCAGGCGGGGCGGGGGGGGCGAGGGGCGGGGCGGGGCGAGGC

GGAGAGGTGCGGCGGCAGCCAATCAGAGCGGCGCGCTCCGAAAGTTTCCTTTTATGGCGA

GGCGGCGGCGGCGGCCCTATAAAAAGCGAAGCGCGCGGCGGGCGGGAGTCGCTGCGC

GCTGCCTTCGCCCCGTGCCCCGCTCCGCCGCCGCCTCGCGCCGCCCGCCCCGGCTCTGAC

TGACCGCGTTACTAAAACAGGTAAGTCCGGCCTCCGCGCCGGGTTTTGGCGCCTCCCGCG

GGCGCCCCCCTCCTCACGGCGAGCGCTGCCACGTCAGACGAAGGGCGCAGCGAGCGTCCT

GATCCTTCCGCCCGGACGCTCAGGACAGCGGCCCGCTGCTCATAAGACTCGGCCTTAGAA

CCCCAGTATCAGCAGAAGGACATTTTAGGACGGGACTTGGGTGACTCTAGGGCACTGGTT

TTCTTTCCAGAGAGCGGAACAGGCGAGGAAAAGTAGTCCCTTCTCGGCGATTCTGCGGAG

GGATCTCCGTGGGCGGTGAACGCCGATGATGCCTCTACTAACCATGTTCATGTTTTCTT

TTTTTTTCTACAGGTCCTGGGTGACGAACAGGGTACCGCCACCATGAGGGGCATGAAGCT

GCTGGGGGCGCTGCTGGCACTGGCGGCCCTACTGCAGGGGGCCGTGTCCATGGGCTTTTG

CCGCAGCGCGCTGCATCCGCTGAGCCTGCTGGTGCAGGCGATTATGCTGGCGATGACCCT

GGCGCTGGGCACCCTGCCGGCGTTTCTGCCGTGCGAACTGCAGCCGCATGGCCTGGTGAA

CTGCAACTGGCTGTTTCTGAAAAGCGTGCCGCATTTTAGCATGGCGGCGCCGCGCGGCAA

CGTGACCAGCCTGAGCCTGAGCAGCAACCGCATTCATCATCTGCATGATAGCGATTTTGC

GCATCTGCCGAGCCTGCGCCATCTGAACCTGAAATGGAACTGCCCGCCGGTGGGCCTGAG

CCCGATGCATTTTCCGTGCCATATGACCATTGAACCGAGCACCTTTCTGGCGGTGCCGAC

CCTGGAAGAACTGAACCTGAGCTATAACAACATTATGACCGTGCCGGCGCTGCCGAAAAG

CCTGATTAGCCTGAGCCTGAGCCATACCAACATTCTGATGCTGGATAGCGCGAGCCTGGC

GGGCCTGCATGCGCTGCGCTTTCTGTTTATGGATGGCAACTGCTATTATAAAAACCCGTG

CCGCCAGGCGCTGGAAGTGGCGCCGGGCGCGCTGCTGGGCCTGGCAACCTGACCCATCT

GAGCCTGAAATATAACAACCTGACCGTGGTGCCGCGCAACCTGCCGAGCAGCCTGGAATA

TCTGCTGCTGAGCTATAACCGCATTGTGAAACTGGCGCCGGAAGATCTGGCGAACCTGAC

CGCGCTGCGCGTGCTGGATGTGGGCGGCAACTGCCGCCGCTGCGATCATGCGCCGAACCC

GTGCATGGAATGCCCGCGCCATTTTCCGCAGCTGCATCCGGATACCTTTAGCCATCTGAG

CCGCCTGGAAGGCCTGGTGCTGAAAGATAGCAGCCTGAGCTGGCTGAACGCGAGCTGGTT
```

-continued

```
TCGCGGCCTGGGCAACCTGCGCGTGCTGGATCTGAGCGAAAACTTTCTGTATAAATGCAT

TACCAAAACCAAAGCGTTTCAGGGCCTGACCCAGCTGCGCAAACTGAACCTGAGCTTTAA

CTATCAGAAACGCGTGAGCTTTGCGCATCTGAGCCTGGCGCCGAGCTTTGGCAGCCTGGT

GGCGCTGAAAGAACTGGATATGCATGGCATTTTTTTTCGCAGCCTGGATGAAACCACCCT

GCGCCCGCTGGCGCGCCTGCCGATGCTGCAGACCCTGCGCCTGCAGATGAACTTTATTAA

CCAGGCGCAGCTGGGCATTTTTCGCGCGTTTCCGGGCCTGCGCTATGTGGATCTGAGCGA

TAACCGCATTAGCGGCGCGAGCGAACTGACCGCGACCATGGGCGAAGCGGATGGCGGCGA

AAAAGTGTGGCTGCAGCCGGGCGATCTGGCGCCGGCGCCGGTGGATACCCCGAGCAGCGA

AGATTTTCGCCCGAACTGCAGCACCCTGAACTTTACCCTGGATCTGAGCCGCAACAACCT

GGTGACCGTGCAGCCGGAAATGTTTGCGCAGCTGAGCCATCTGCAGTGCCTGCGCCTGAG

CCATAACTGCATTAGCCAGGCGGTGAACGGCAGCCAGTTTCTGCCGCTGACCGGCCTGCA

GGTGCTGGATCTGAGCCATAACAAACTGGATCTGTATCATGAACATAGCTTTACCGAACT

GCCGCGCCTGGAAGCGCTGGATCTGAGCTATAACAGCCAGCCGTTTGGCATGCAGGGCGT

GGGCCATAACTTTAGCTTTGTGGCGCATCTGCGCACCCTGCGCCATCTGAGCCTGGCGCA

TAACAACATTCATAGCCAGGTGAGCCAGCAGCTGTGCAGCACCAGCCTGCGCGCGCTGGA

TTTTAGCGGCAACGCGCTGGGCCATATGTGGGCGGAAGGCGATCTGTATCTGCATTTTTT

TCAGGGCCTGAGCGGCCTGATTTGGCTGGATCTGAGCCAGAACCGCCTGCATACCCTGCT

GCCGCAGACCCTGCGCAACCTGCCGAAAAGCCTGCAGGTGCTGCGCCTGCGCGATAACTA

TCTGGCGTTTTTTAAATGGTGGAGCCTGCATTTTCTGCCGAAACTGGAAGTGCTGGATCT

GGCGGGCAACCAGCTGAAAGCGCTGACCAACGGCAGCCTGCCGGCGGGCACCCGCCTGCG

CCGCCTGGATGTGAGCTGCAACAGCATTAGCTTTGTGGCGCCGGGCTTTTTTAGCAAAGC

GAAAGAACTGCGCGAACTGAACCTGAGCGCGAACGCGCTGAAAACCGTGGATCATAGCTG

GTTTGGCCCGCTGGCGAGCGCGCTGCAGATTCTGGATGTGAGCGCGAACCCGCTGCATTG

CGCGTGCGGCGCGGCGTTTATGGATTTTCTGCTGGAAGTGCAGGCGGCGGTGCCGGGCCT

GCCGAGCCGCGTGAAATGCGGCAGCCCGGGCCAGCTGCAGGGCCTGAGCATTTTTGCGCA

GGATCTGCGCCTGTGCCTGGATGAAGCGCTGAGCTGGGATTGCTTTGCGCTGAGCCTGCT

GGCGGTGGCGCTGGGCCTGGGCGTGCCGATGCTGCATCATCTGTGCGGCTGGGATCTGTG

GTATTGCTTTCATCTGTGCCTGGCGTGGCTGCCGTGGCGCGGCCGCCAGAGCGGCCGCGA

TGAAGATGCGCTGCCGTATGATGCGTTTGTGGTGTTTGATAAAACCCAGAGCGCGGTGGC

GGATTGGGTGTATAACGAACTGCGCGGCCAGCTGGAAGAATGCCGCGGCCGCTGGGCGCT

GCGCCTGTGCCTGGAAGAACGCGATTGGCTGCCGGGCAAAACCCTGTTTGAAAACCTGTG

GGCGAGCGTGTATGGCAGCCGCAAAACCCTGTTTGTGCTGGCGCATACCGATCGCGTGAG

CGGCCTGCTGCGCGCGAGCTTTCTGCTGGCGCAGCAGCGCCTGCTGGAAGATCGCAAAGA

TGTGGTGGTGCTGGTGATTCTGAGCCCGGATGGCCGCCGCAGCCGCTATGTGCGCCTGCG

CCAGCGCCTGTGCCGCCAGAGCGTGCTGCTGTGGCCGCATCAGCCGAGCGGCCAGCGCAG

CTTTTGGGCGCAGCTGGGCATGGCGCTGACCCGCGATAACCATCATTTTTATAACCGCAA

CTTTTGCCAGGGCCCGACCGCGGAAGGGCGGATCAGGCGGATCACCCAAATCTTGTGACA

AAACTCACACATGCCCACCGTGCCCAGCACCTGAACTCCTGGGGGGACCGTCAGTCTTCC

TCTTCCCCCCAAAACCCAAGGACACCCTCATGATCTCCCGGACCCCTGAGGTCACATGCG

TGGTGGTGGACGTGAGCCACGAAGACCCTGAGGTCAAGTTCAACTGGTACGTGGACGGCG

TGGAGGTGCATAATGCCAAGACAAAGCCGCGGGAGGAGCAGTACAACAGCACGTACCGTG
```

-continued

```
TGGTCAGCGTCCTCACCGTCCTGCACCAGGACTGGCTGAATGGCAAGGAGTACAAGTGCA

AGGTCTCCAACAAAGCCCTCCCAGCCCCCATCGAGAAAACCATCTCCAAAGCCAAAGGGC

AGCCCCGAGAACCACAGGTGTACACCCTGCCCCCATCCCGGGAGGAGATGACCAAGAACC

AGGTCAGCCTGACCTGCCTGGTCAAAGGCTTCTATCCCAGCGACATCGCCGTGGAGTGGG

AGAGCAATGGGCAGCCGGAGAACAACTACAAGACCACGCCTCCCGTGCTGGACTCCGACG

GCTCCTTCTTCCTCTACAGCAAGCTCACCGTGGACAAGAGCAGGTGGCAGCAGGGGAACG

TCTTCTCATGCTCCGTGATGCATGAGGCTCTGCACAACCACTACACGCAGAAGAGCCTCT

CCCTGTCTCCGGGTAAATAG 3'
```

SEQ ID NO: 10 = SEQ ID NO: 1 + SEQ ID NO: 5
```
5' TTCTAGAATAATCAACCTCTGGATTACAAAATTTGTGAAAGATTGACTGGTATTCTTA

ACTATGTTGCTCCTTTTACGCTATGTGGATACGCTGCTTTAATGCCTTTGTATCATGCTA

TTGCTTCCCGTATGGCTTTCATTTTCTCCTCCTTGTATAAATCCTGGTTGCTGTCTCTTT

ATGAGGAGTTGTGGCCCGTTGTCAGGCAACGTGGCGTGGTGTGCACTGTGTTTGCTGACG

CAACCCCCACTGGTTGGGGCATTGCCACCACCTGTCAGCTCCTTTCCGGGACTTTCGCTT

TCCCCCTCCCTATTGCCACGGCGGAACTCATCGCCGCCTGCCTTGCCCGCTGCTGGACAG

GGGCTCGGCTGTTGGGCACTGACAATTCCGTGGTGTTGTCGGGGAAATCATCGTCCTTTC

CTTGGCTGCTCGCCTGTGTTGCCACCTGGATTCTGCGCGGGACGTCCTTCTGCTACGTCC

CTTCGGCCCTCAATCCAGCGGACCTTCCTTCCCGCGGCCTGCTGCCGGCTCTGCGGCCTC

TTCCGCGTCTTCGCCTTCGCCCTCAGACGAGTCGGATCTCCCTTTGGGCCGCCTCCCCGC

CTAAGCTTATCGATACCGTCGAGATCTAACTTGTTTATTGCAGCTTATAATGGTTACAAA

TAAAGCAATAGCATCACAAATTTCACAAATAAAGCATTTTTTTCACTGCATTCTAGTTGT

GGTTTGTCCAAACTCATCAATGTATCTTATCATGTCTGGATCTCGACCTCGACTAGAGCA

TGGCTACGTAGATAAGTAGCATGGCGGGTTAATCATTAACTACAAGGAACCCCTAGTGAT

GGAGTTGGCCACTCCCTCTCTGCGCGCTCGCTCGCTCACTGAGGCCGGGCGACCAAAGGT

CGCCCGACGCCCGGGCTTTGCCCGGGCGGCCTCAGTGAGCGAGCGAGCGCGCCAGCTGGC

GTAATAGCGAAGAGGCCCGCACCGATCGCCCTTCCCAACAGTTGCGCAGCCTGAATGGCG

AATGGAATTCCAGACGATTGAGCGTCAAAATGTAGGTATTTCCATGAGCGTTTTTCCTGT

TGCAATGGCTGGCGGTAATATTGTTCTGGATATTACCAGCAAGGCCGATAGTTTGAGTTC

TTCTACTCAGGCAAGTGATGTTATTACTAATCAAAGAAGTATTGCGACAACGGTTAATTT

GCGTGATGGACAGACTCTTTTACTCGGTGGCCTCACTGATTATAAAAACACTTCTCAGGA

TTCTGGCGTACCGTTCCTGTCTAAAATCCCTTTAATCGGCCTCCTGTTTAGCTCCCGCTC

TGATTCTAACGAGGAAAGCACGTTATACGTGCTCGTCAAAGCAACCATAGTACGCGCCCT

GTAGCGGCGCATTAAGCGCGGCGGGTGTGGTGGTTACGCGCAGCGTGACCGCTACACTTG

CCAGCGCCCTAGCGCCCGCTCCTTTCGCTTTCTTCCCTTCCTTTCTCGCCACGTTCGCCG

GCTTTCCCCGTCAAGCTCTAAATCGGGGGCTCCCTTTAGGGTTCCGATTTAGTGCTTTAC

GGCACCTCGACCCCAAAAAACTTGATTAGGGTGATGGTTCACGTAGTGGGCCATCGCCCT

GATAGACGGTTTTTCGCCCTTTGACGTTGGAGTCCACGTTCTTTAATAGTGGACTCTTGT

TCCAAACTGGAACAACACTCAACCCTATCTCGGTCTATTCTTTTGATTTATAAGGGATTT

TGCCGATTTCGGCCTATTGGTTAAAAAATGAGCTGATTTAACAAAAATTTAACGCGAATT

TTAACAAAATATTAACGTTTACAATTTAAATATTTGCTTATACAATCTTCCTGTTTTTGG

GGCTTTTCTGATTATCAACCGGGGTACATATGATTGACATGCTAGTTTTACGATTACCGT
```

-continued

```
TCATCGATTCTCTTGTTTGCTCCAGACTCTCAGGCAATGACCTGATAGCCTTTGTAGAGA

CCTCTCAAAAATAGCTACCCTCTCCGGCATGAATTTATCAGCTAGAACGGTTGAATATCA

TATTGATGGTGATTTGACTGTCTCCGGCCTTTCTCACCCGTTTGAATCTTTACCTACACA

TTACTCAGGCATTGCATTTAAAATATATGAGGGTTCTAAAAATTTTTATCCTTGCGTTGA

AATAAAGGCTTCTCCCGCAAAAGTATTACAGGGTCATAATGTTTTTGGTACAACCGATTT

AGCTTTATGCTCTGAGGCTTTATTGCTTAATTTTGCTAATTCTTTGCCTTGCCTGTATGA

TTTATTGGATGTTGGAATTCCTGATGCGGTATTTTCTCCTTACGCATCTGTGCGGTATTT

CACACCGCATATGGTGCACTCTCAGTACAATCTGCTCTGATGCCGCATAGTTAAGCCAGC

CCCGACACCCGCCAACACCCGCTGACGCGCCCTGACGGGCTTGTCTGCTCCCGGCATCCG

CTTACAGACAAGCTGTGACCGTCTCCGGGAGCTGCATGTGTCAGAGGTTTTCACCGTCAT

CACCGAAACGCGCGAGACGAAAGGGCCTCGTGATACGCCTATTTTTATAGGTTAATGTCA

TGATAATAATGGTTTCTTAGACGTCAGGTGGCACTTTTCGGGGAAATGTGCGCGGAACCC

CTATTTGTTTATTTTTCTAAATACATTCAAATATGTATCCGCTCATGAGACAATAACCCT

GATAAATGCTTCAATAATATTGAAAAAGGAAGAGTATGAGTATTCAACATTTCCGTGTCG

CCCTTATTCCCTTTTTTGCGGCATTTTGCCTTCCTGTTTTTGCTCACCCAGAAACGCTGG

TGAAAGTAAAAGATGCTGAAGATCAGTTGGGTGCACGAGTGGGTTACATCGAACTGGATC

TCAACAGCGGTAAGATCCTTGAGAGTTTTCGCCCCGAAGAACGTTTTCCAATGATGAGCA

CTTTTAAAGTTCTGCTATGTGGCGCGGTATTATCCCGTATTGACGCCGGGCAAGAGCAAC

TCGGTCGCCGCATACACTATTCTCAGAATGACTTGGTTGAGTACTCACCAGTCACAGAAA

AGCATCTTACGGATGGCATGACAGTAAGAGAATTATGCAGTGCTGCCATAACCATGAGTG

ATAACACTGCGGCCAACTTACTTCTGACAACGATCGGAGGACCGAAGGAGCTAACCGCTT

TTTTGCACAACATGGGGGATCATGTAACTCGCCTTGATCGTTGGGAACCGGAGCTGAATG

AAGCCATACCAAACGACGAGCGTGACACCACGATGCCTGTAGCAATGGCAACAACGTTGC

GCAAACTATTAACTGGCGAACTACTTACTCTAGCTTCCCGGCAACAATTAATAGACTGGA

TGGAGGCGGATAAAGTTGCAGGACCACTTCTGCGCTCGGCCCTTCCGGCTGGCTGGTTTA

TTGCTGATAAATCTGGAGCCGGTGAGCGTGGGTCTCGCGGTATCATTGCAGCACTGGGGC

CAGATGGTAAGCCCTCCCGTATCGTAGTTATCTACACGACGGGGAGTCAGGCAACTATGG

ATGAACGAAATAGACAGATCGCTGAGATAGGTGCCTCACTGATTAAGCATTGGTAACTGT

CAGACCAAGTTTACTCATATATACTTTAGATTGATTTAAAACTTCATTTTTAATTTAAAA

GGATCTAGGTGAAGATCCTTTTTGATAATCTCATGACCAAAATCCCTTAACGTGAGTTTT

CGTTCCACTGAGCGTCAGACCCCGTAGAAAAGATCAAAGGATCTTCTTGAGATCCTTTTT

TTCTGCGCGTAATCTGCTGCTTGCAAACAAAAAAACCACCGCTACCAGCGGTGGTTTGTT

TGCCGGATCAAGAGCTACCAACTCTTTTTCCGAAGGTAACTGGCTTCAGCAGAGCGCAGA

TACCAAATACTGTCCTTCTAGTGTAGCCGTAGTTAGGCCACCACTTCAAGAACTCTGTAG

CACCGCCTACATACCTCGCTCTGCTAATCCTGTTACCAGTGGCTGCTGCCAGTGGCGATA

AGTCGTGTCTTACCGGGTTGGACTCAAGACGATAGTTACCGGATAAGGCGCAGCGGTCGG

GCTGAACGGGGGGTTCGTGCACACAGCCCAGCTTGGAGCGAACGACCTACACCGAACTGA

GATACCTACAGCGTGAGCTATGAGAAAGCGCCACGCTTCCCGAAGGGAGAAAGGCGGACA

GGTATCCGGTAAGCGGCAGGGTCGGAACAGGAGAGCGCACGAGGGAGCTTCCAGGGGGAA

ACGCCTGGTATCTTTATAGTCCTGTCGGGTTTCGCCACCTCTGACTTGAGCGTCGATTTT
```

-continued

```
TGTGATGCTCGTCAGGGGGGCGGAGCCTATGGAAAAACGCCAGCAACGCGGCCTTTTTAC

GGTTCCTGGCCTTTTGCTGGCCTTTTGCTCACATGTTCTTTCCTGCGTTATCCCCTGATT

CTGTGGATAACCGTATTACCGCCTTTGAGTGAGCTGATACCGCTCGCCGCAGCCGAACGA

CCGAGCGCAGCGAGTCAGTGAGCGAGGAAGCGGAAGAGCGCCCAATACGCAAACCGCCTC

TCCCCGCGCGTTGGCCGATTCATTAATGCAGCAGCTGCGCGCTCGCTCGCTCACTGAGGC

CGCCCGGGCAAAGCCCGGGCGTCGGGCGACCTTTGGTCGCCCGGCCTCAGTGAGCGAGCG

AGCGCGCAGAGAGGGAGTGGCCAACTCCATCACTAGGGGTTCCTTGTAGTTAATGATTAA

CCCGCCATGCTACTTATCTACGTAGCCATGCTCTAGGACATTGATTATTGACTAGTGGAG

TTCCGCGTTACATAACTTACGGTAAATGGCCCGCCTGGCTGACCGCCCAACGACCCCCGC

CCATTGACGTCAATAATGACGTATGTTCCCATAGTAACGCCAATAGGGACTTTCCATTGA

CGTCAATGGGTGGAGTATTTACGGTAAACTGCCCACTTGGCAGTACATCAAGTGTATCAT

ATGCCAAGTACGCCCCCTATTGACGTCAATGACGGTAAATGGCCCGCCTGGCATTATGCC

CAGTACATGACCTTATGGGACTTTCCTACTTGGCAGTACATCTACGTATTAGTCATCGCT

ATTACCATGGTCGAGGTGAGCCCCACGTTCTGCTTCACTCTCCCCATCTCCCCCCCCTCC

CCACCCCCAATTTTGTATTTATTTATTTTTTAATTATTTTGTGCAGCGATGGGGGGGGGG

GGGGGGGGGCGCGCGCCAGGCGGGGCGGGGGGGGCGAGGGGCGGGGCGGGGCGAGGCG

GAGAGGTGCGGCGGCAGCCAATCAGAGCGGCGCGCTCCGAAAGTTTCCTTTTATGGCGAG

GCGGCGGCGGCGGCCCTATAAAAAGCGAAGCGCGCGGCGGGCGGGAGTCGCTGCGCG

CTGCCTTCGCCCCGTGCCCCGCTCCGCCGCCGCCTCGCGCCGCCCGCCCCGGCTCTGACT

GACCGCGTTACTAAAACAGGTAAGTCCGGCCTCCGCGCCGGGTTTTGGCGCCTCCCGCGG

GCGCCCCCCTCCTCACGGCGAGCGCTGCCACGTCAGACGAAGGGCGCAGCGAGCGTCCTG

ATCCTTCCGCCCGGACGCTCAGGACAGCGGCCCGCTGCTCATAAGACTCGGCCTTAGAAC

CCCAGTATCAGCAGAAGGACATTTTAGGACGGGACTTGGGTGACTCTAGGGCACTGGTTT

TCTTTCCAGAGAGCGGAACAGGCGAGGAAAAGTAGTCCCTTCTCGGCGATTCTGCGGAGG

GATCTCCGTGGGGCGGTGAACGCCGATGATGCCTCTACTAACCATGTTCATGTTTTCTTT

TTTTTTCTACAGGTCCTGGGTGACGAACAGGGTACCGCCACCATGAGGGGCATGAAGCTG

CTGGGGCGCTGCTGGCACTGGCGGCCCTACTGCAGGGGCCGTGTCCATGAGCATGCTG

TTTTATACCCTGATTACCGCGTTTCTGATTGGCATTCAGGCGGAACCGCATAGCGAAAGC

AACGTGCCGGCGGGCCATACCATTCCGCAGGCGCATTGGACCAAACTGCAGCATAGCCTG

GATACCGCGCTGCGCCGCGCGCGCAGCGCGCCGGCGGCGGCGATTGCGGCGCGCGTGGCG

GGCCAGACCCGCAACATTACCGTGGATCCGCGCCTGTTTAAAAAACGCCGCCTGCGCAGC

CCGCGCGTGCTGTTTAGCACCCAGCCGCCGCGCGAAGCGGCGGATACCCAGGATCTGGAT

TTTGAAGTGGGCGGCGCGGCGCCGTTTAACCGCACCCATCGCAGCAAACGCAGCAGCAGC

CATCCGATTTTTCATCGCGGCGAATTTAGCGTGTGCGATAGCGTGAGCGTGTGGGTGGGC

GATAAAACCACCGCGACCGATATTAAAGGCAAAGAAGTGATGGTGCTGGGCGAAGTGAAC

ATTAACAACAGCGTGTTTAAACAGTATTTTTTTGAAACCAAATGCCGCGATCCGAACCCG

GTGGATAGCGGCTGCCGCGGCATTGATAGCAAACATTGGAACAGCTATTGCACCACCACC

CATACCTTTGTGAAAGCGCTGACCATGGATGGCAAACAGGCGGCGTGGCGCTTTATTCGC

ATTGATACCGCGTGCGTGTGCGTGCTGAGCCGCAAAGCGGTGCGCCGCGCGGGCGGATCA

GGCGGATCACCCAAATCTTGTGACAAAACTCACACATGCCCACCGTGCCCAGCACCTGAA

CTCCTGGGGGGACCGTCAGTCTTCCTCTTCCCCCCAAAACCCAAGGACACCCTCATGATC
```

-continued

```
TCCCGGACCCCTGAGGTCACATGCGTGGTGGTGGACGTGAGCCACGAAGACCCTGAGGTC

AAGTTCAACTGGTACGTGGACGGCGTGGAGGTGCATAATGCCAAGACAAAGCCGCGGGAG

GAGCAGTACAACAGCACGTACCGTGTGGTCAGCGTCCTCACCGTCCTGCACCAGGACTGG

CTGAATGGCAAGGAGTACAAGTGCAAGGTCTCCAACAAAGCCCTCCCAGCCCCCATCGAG

AAAACCATCTCCAAAGCCAAAGGGCAGCCCCGAGAACCACAGGTGTACACCCTGCCCCCA

TCCCGGGAGGAGATGACCAAGAACCAGGTCAGCCTGACCTGCCTGGTCAAAGGCTTCTAT

CCCAGCGACATCGCCGTGGAGTGGGAGAGCAATGGGCAGCCGGAGAACAACTACAAGACC

ACGCCTCCCGTGCTGGACTCCGACGGCTCCTTCTTCCTCTACAGCAAGCTCACCGTGGAC

AAGAGCAGGTGGCAGCAGGGGAACGTCTTCTCATGCTCCGTGATGCATGAGGCTCTGCAC

AACCACTACACGCAGAAGAGCCTCTCCCTGTCTCCGGGTAAATAG 3'

SEQ ID NO: 11 = SEQ ID NO: 1 + SEQ ID NO: 6
5' TTCTAGAATAATCAACCTCTGGATTACAAAATTTGTGAAAGATTGACTGGTATTCTTA

ACTATGTTGCTCCTTTTACGCTATGTGGATACGCTGCTTTAATGCCTTTGTATCATGCTA

TTGCTTCCCGTATGGCTTTCATTTTCTCCTCCTTGTATAAATCCTGGTTGCTGTCTCTTT

ATGAGGAGTTGTGGCCCGTTGTCAGGCAACGTGGCGTGGTGTGCACTGTGTTTGCTGACG

CAACCCCCACTGGTTGGGGCATTGCCACCACCTGTCAGCTCCTTTCCGGGACTTTCGCTT

TCCCCCTCCCTATTGCCACGGCGGAACTCATCGCCGCCTGCCTTGCCCGCTGCTGGACAG

GGGCTCGGCTGTTGGGCACTGACAATTCCGTGGTGTTGTCGGGGAAATCATCGTCCTTTC

CTTGGCTGCTCGCCTGTGTTGCCACCTGGATTCTGCGCGGGACGTCCTTCTGCTACGTCC

CTTCGGCCCTCAATCCAGCGGACCTTCCTTCCCGCGGCCTGCTGCCGGCTCTGCGGCCTC

TTCCGCGTCTTCGCCTTCGCCCTCAGACGAGTCGGATCTCCCTTTGGGCCGCCTCCCCGC

CTAAGCTTATCGATACCGTCGAGATCTAACTTGTTTATTGCAGCTTATAATGGTTACAAA

TAAAGCAATAGCATCACAAATTTCACAAATAAAGCATTTTTTTCACTGCATTCTAGTTGT

GGTTTGTCCAAACTCATCAATGTATCTTATCATGTCTGGATCTCGACCTCGACTAGAGCA

TGGCTACGTAGATAAGTAGCATGGCGGGTTAATCATTAACTACAAGGAACCCCTAGTGAT

GGAGTTGGCCACTCCCTCTCTGCGCGCTCGCTCGCTCACTGAGGCCGGGCGACCAAAGGT

CGCCCGACGCCCGGGCTTTGCCCGGGCGGCCTCAGTGAGCGAGCGAGCGCGCCAGCTGGC

GTAATAGCGAAGAGGCCCGCACCGATCGCCCTTCCCAACAGTTGCGCAGCCTGAATGGCG

AATGGAATTCCAGACGATTGAGCGTCAAAATGTAGGTATTTCCATGAGCGTTTTTCCTGT

TGCAATGGCTGGCGGTAATATTGTTCTGGATATTACCAGCAAGGCCGATAGTTTGAGTTC

TTCTACTCAGGCAAGTGATGTTATTACTAATCAAAGAAGTATTGCGACAACGGTTAATTT

GCGTGATGGACAGACTCTTTTACTCGGTGGCCTCACTGATTATAAAAACACTTCTCAGGA

TTCTGGCGTACCGTTCCTGTCTAAAATCCCTTTAATCGGCCTCCTGTTTAGCTCCCGCTC

TGATTCTAACGAGGAAAGCACGTTATACGTGCTCGTCAAAGCAACCATAGTACGCGCCCT

GTAGCGGCGCATTAAGCGCGGCGGGTGTGGTGGTTACGCGCAGCGTGACCGCTACACTTG

CCAGCGCCCTAGCGCCCGCTCCTTTCGCTTTCTTCCCTTCCTTTCTCGCCACGTTCGCCG

GCTTTCCCCGTCAAGCTCTAAATCGGGGGCTCCCTTTAGGGTTCCGATTTAGTGCTTTAC

GGCACCTCGACCCCAAAAAACTTGATTAGGGTGATGGTTCACGTAGTGGGCCATCGCCCT

GATAGACGGTTTTTCGCCCTTTGACGTTGGAGTCCACGTTCTTTAATAGTGGACTCTTGT

TCCAAACTGGAACAACACTCAACCCTATCTCGGTCTATTCTTTTGATTTATAAGGGATTT

TGCCGATTTCGGCCTATTGGTTAAAAAATGAGCTGATTTAACAAAAATTTAACGCGAATT
```

-continued

```
TTAACAAAATATTAACGTTTACAATTTAAATATTTGCTTATACAATCTTCCTGTTTTTGG

GGCTTTTCTGATTATCAACCGGGGTACATATGATTGACATGCTAGTTTTACGATTACCGT

TCATCGATTCTCTTGTTTGCTCCAGACTCTCAGGCAATGACCTGATAGCCTTTGTAGAGA

CCTCTCAAAAATAGCTACCCTCTCCGGCATGAATTTATCAGCTAGAACGGTTGAATATCA

TATTGATGGTGATTTGACTGTCTCCGGCCTTTCTCACCCGTTTGAATCTTTACCTACACA

TTACTCAGGCATTGCATTTAAAATATATGAGGGTTCTAAAAATTTTTATCCTTGCGTTGA

AATAAAGGCTTCTCCCGCAAAAGTATTACAGGGTCATAATGTTTTTGGTACAACCGATTT

AGCTTTATGCTCTGAGGCTTTATTGCTTAATTTTGCTAATTCTTTGCCTTGCCTGTATGA

TTTATTGGATGTTGGAATTCCTGATGCGGTATTTTCTCCTTACGCATCTGTGCGGTATTT

CACACCGCATATGGTGCACTCTCAGTACAATCTGCTCTGATGCCGCATAGTTAAGCCAGC

CCCGACACCCGCCAACACCCGCTGACGCGCCCTGACGGGCTTGTCTGCTCCCGGCATCCG

CTTACAGACAAGCTGTGACCGTCTCCGGGAGCTGCATGTGTCAGAGGTTTTCACCGTCAT

CACCGAAACGCGCGAGACGAAAGGGCCTCGTGATACGCCTATTTTTATAGGTTAATGTCA

TGATAATAATGGTTTCTTAGACGTCAGGTGGCACTTTTCGGGGAAATGTGCGCGGAACCC

CTATTTGTTTATTTTTCTAAATACATTCAAATATGTATCCGCTCATGAGACAATAACCCT

GATAAATGCTTCAATAATATTGAAAAAGGAAGAGTATGAGTATTCAACATTTCCGTGTCG

CCCTTATTCCCTTTTTTGCGGCATTTTGCCTTCCTGTTTTTGCTCACCCAGAAACGCTGG

TGAAAGTAAAAGATGCTGAAGATCAGTTGGGTGCACGAGTGGGTTACATCGAACTGGATC

TCAACAGCGGTAAGATCCTTGAGAGTTTTCGCCCCGAAGAACGTTTTCCAATGATGAGCA

CTTTTAAAGTTCTGCTATGTGGCGCGGTATTATCCCGTATTGACGCCGGGCAAGAGCAAC

TCGGTCGCCGCATACACTATTCTCAGAATGACTTGGTTGAGTACTCACCAGTCACAGAAA

AGCATCTTACGGATGGCATGACAGTAAGAGAATTATGCAGTGCTGCCATAACCATGAGTG

ATAACACTGCGGCCAACTTACTTCTGACAACGATCGGAGGACCGAAGGAGCTAACCGCTT

TTTTGCACAACATGGGGGATCATGTAACTCGCCTTGATCGTTGGGAACCGGAGCTGAATG

AAGCCATACCAAACGACGAGCGTGACACCACGATGCCTGTAGCAATGGCAACAACGTTGC

GCAAACTATTAACTGGCGAACTACTTACTCTAGCTTCCCGGCAACAATTAATAGACTGGA

TGGAGGCGGATAAAGTTGCAGGACCACTTCTGCGCTCGGCCCTTCCGGCTGGCTGGTTTA

TTGCTGATAAATCTGGAGCCGGTGAGCGTGGGTCTCGCGGTATCATTGCAGCACTGGGGC

CAGATGGTAAGCCCTCCCGTATCGTAGTTATCTACACGACGGGGAGTCAGGCAACTATGG

ATGAACGAAATAGACAGATCGCTGAGATAGGTGCCTCACTGATTAAGCATTGGTAACTGT

CAGACCAAGTTTACTCATATATACTTTAGATTGATTTAAAACTTCATTTTTAATTTAAAA

GGATCTAGGTGAAGATCCTTTTTGATAATCTCATGACCAAAATCCCTTAACGTGAGTTTT

CGTTCCACTGAGCGTCAGACCCCGTAGAAAAGATCAAAGGATCTTCTTGAGATCCTTTTT

TTCTGCGCGTAATCTGCTGCTTGCAAACAAAAAAACCACCGCTACCAGCGGTGGTTTGTT

TGCCGGATCAAGAGCTACCAACTCTTTTTCCGAAGGTAACTGGCTTCAGCAGAGCGCAGA

TACCAAATACTGTCCTTCTAGTGTAGCCGTAGTTAGGCCACCACTTCAAGAACTCTGTAG

CACCGCCTACATACCTCGCTCTGCTAATCCTGTTACCAGTGGCTGCTGCCAGTGGCGATA

AGTCGTGTCTTACCGGGTTGGACTCAAGACGATAGTTACCGGATAAGGCGCAGCGGTCGG

GCTGAACGGGGGGTTCGTGCACACAGCCCAGCTTGGAGCGAACGACCTACACCGAACTGA

GATACCTACAGCGTGAGCTATGAGAAAGCGCCACGCTTCCCGAAGGGAGAAAGGCGGACA
```

-continued

```
GGTATCCGGTAAGCGGCAGGGTCGGAACAGGAGAGCGCACGAGGGAGCTTCCAGGGGGAA

ACGCCTGGTATCTTTATAGTCCTGTCGGGTTTCGCCACCTCTGACTTGAGCGTCGATTTT

TGTGATGCTCGTCAGGGGGCGGAGCCTATGGAAAAACGCCAGCAACGCGGCCTTTTTAC

GGTTCCTGGCCTTTTGCTGGCCTTTTGCTCACATGTTCTTTCCTGCGTTATCCCCTGATT

CTGTGGATAACCGTATTACCGCCTTTGAGTGAGCTGATACCGCTCGCCGCAGCCGAACGA

CCGAGCGCAGCGAGTCAGTGAGCGAGGAAGCGGAAGAGCGCCCAATACGCAAACCGCCTC

TCCCCGCGCGTTGGCCGATTCATTAATGCAGCAGCTGCGCGCTCGCTCGCTCACTGAGGC

CGCCCGGGCAAAGCCCGGGCGTCGGGCGACCTTTGGTCGCCCGGCCTCAGTGAGCGAGCG

AGCGCGCAGAGAGGGAGTGGCCAACTCCATCACTAGGGGTTCCTTGTAGTTAATGATTAA

CCCGCCATGCTACTTATCTACGTAGCCATGCTCTAGGACATTGATTATTGACTAGTGGAG

TTCCGCGTTACATAACTTACGGTAAATGGCCCGCCTGGCTGACCGCCCAACGACCCCCGC

CCATTGACGTCAATAATGACGTATGTTCCCATAGTAACGCCAATAGGGACTTTCCATTGA

CGTCAATGGGTGGAGTATTTACGGTAAACTGCCCACTTGGCAGTACATCAAGTGTATCAT

ATGCCAAGTACGCCCCCTATTGACGTCAATGACGGTAAATGGCCCGCCTGGCATTATGCC

CAGTACATGACCTTATGGGACTTTCCTACTTGGCAGTACATCTACGTATTAGTCATCGCT

ATTACCATGGTCGAGGTGAGCCCCACGTTCTGCTTCACTCTCCCCATCTCCCCCCCCTCC

CCACCCCCAATTTTGTATTTATTTATTTTTAATTATTTTGTGCAGCGATGGGGGCGGGG

GGGGGGGGGGCGCGCGCCAGGCGGGGGGGGGGGCGAGGGGCGGGGCGGGGCGAGGCG

GAGAGGTGCGGCGGCAGCCAATCAGAGCGGCGCGCTCCGAAAGTTTCCTTTTATGGCGAG

GCGGCGGCGGCGGCCCTATAAAAAGCGAAGCGCGCGGCGGGCGGGAGTCGCTGCGCG

CTGCCTTCGCCCCGTGCCCCGCTCCGCCGCCGCCTCGCGCCGCCCGCCCCGGCTCTGACT

GACCGCGTTACTAAAACAGGTAAGTCCGGCCTCCGCGCCGGGTTTTGGCGCCTCCCGCGG

GCGCCCCCTCCTCACGGCGAGCGCTGCCACGTCAGACGAAGGGCGCAGCGAGCGTCCTG

ATCCTTCCGCCCGGACGCTCAGGACAGCGGCCCGCTGCTCATAAGACTCGGCCTTAGAAC

CCCAGTATCAGCAGAAGGACATTTTAGGACGGGACTTGGGTGACTCTAGGGCACTGGTTT

TCTTTCCAGAGAGCGGAACAGGCGAGGAAAAGTAGTCCCTTCTCGGCGATTCTGCGGAGG

GATCTCCGTGGGGCGGTGAACGCCGATGATGCCTCTACTAACCATGTTCATGTTTTCTTT

TTTTTTCTACAGGTCCTGGGTGACGAACAGGGTACCGCCACCATGAGGGGCATGAAGCTG

CTGGGGGCGCTGCTGGCACTGGCGGCCCTACTGCAGGGGCCGTGTCCATGGCGCTGTGG

ATGCGCCTGCTGCCGCTGCTGGCGCTGCTGGCGCTGTGGGGCCCGGATCCGGCGGCGGCG

TTTGTGAACCAGCATCTGTGCGGCAGCCATCTGGTGGAAGCGCTGTATCTGGTGTGCGGC

GAACGCGGCTTTTTTTATACCCCGAAAACCCGCCGCGAAGCGGAAGATCTGCAGGTGGGC

CAGGTGGAACTGGGCGGCGGCCCGGGCGCGGGCAGCCTGCAGCCGCTGGCGCTGGAAGGC

AGCCTGCAGAAACGCGGCATTGTGGAACAGTGCTGCACCAGCATTTGCAGCCTGTATCAG

CTGGAAAACTATTGCAACGGGCGGATCAGGCGGATCACCCAAATCTTGTGACAAAACTCA

CACATGCCCACCGTGCCCAGCACCTGAACTCCTGGGGGGACCGTCAGTCTTCCTCTTCCC

CCCAAAACCCAAGGACACCCTCATGATCTCCCGGACCCCTGAGGTCACATGCGTGGTGGT

GGACGTGAGCCACGAAGACCCTGAGGTCAAGTTCAACTGGTACGTGGACGGCGTGGAGGT

GCATAATGCCAAGACAAAGCCGCGGGAGGAGCAGTACAACAGCACGTACCGTGTGGTCAG

CGTCCTCACCGTCCTGCACCAGGACTGGCTGAATGGCAAGGAGTACAAGTGCAAGGTCTC

CAACAAAGCCCTCCCAGCCCCCATCGAGAAAACCATCTCCAAAGCCAAAGGGCAGCCCCG
```

```
AGAACCACAGGTGTACACCCTGCCCCCATCCCGGGAGGAGATGACCAAGAACCAGGTCAG

CCTGACCTGCCTGGTCAAAGGCTTCTATCCCAGCGACATCGCCGTGGAGTGGGAGAGCAA

TGGGCAGCCGGAGAACAACTACAAGACCACGCCTCCCGTGCTGGACTCCGACGGCTCCTT

CTTCCTCTACAGCAAGCTCACCGTGGACAAGAGCAGGTGGCAGCAGGGGAACGTCTTCTC

ATGCTCCGTGATGCATGAGGCTCTGCACAACCACTACACGCAGAAGAGCCTCTCCCTGTC

TCCGGGTAAATAG 3'
```

As will be appreciated by those skilled in the art, because the recombinant plasmid is a circular vector, the one or more sequences of the mRNA expression cassettes may be connected at the 3' end of SEQ ID NO. 1, as shown in SEQ ID NO. 7-11 or at the 5' end of SEQ ID NO. 1.

As will be appreciated by those skilled in the art, a perfect match of nucleotides with each of the miRNA expression cassette sequences is not necessary in order to have the desired result of increased bioavailability of the target biomolecule as a result of the target cell producing the miRNA sequence that will bind to and degrade the mRNA of the target biomolecule. In some embodiments of the present disclosure, about 80% to about 100% nucleotide sequence matching with each of the mRNA expression cassettes causes the desired result. In some embodiments of the present disclosure, about 85% to about 100% nucleotide sequence matching with each of the mRNA expression cassettes causes the desired result. In some embodiments of the present disclosure, about 90% to about 100% nucleotide sequence matching with each of the mRNA expression cassettes causes the desired result. In some embodiments of the present disclosure, about 95% to about 100% nucleotide sequence matching with each of the mRNA expression cassettes causes the desired result.

Example 1—Expression Cassette

Expression cassettes for expressing mRNA were synthesized. The synthesized miRNA expression cassettes were cloned into the pAVA-00200 plasmid backbone containing the CASI promoter, multiple cloning site (MCS), Woodchuck Hepatitis Virus post-transcriptional regulatory element (WPRE), and Simian virus 40 (SV40) polyadenylation (polyA) sequence, all flanked by the AAV2 inverted terminal repeats (ITR). pAVA-00200 was cut with the restriction enzymes KpnI and XbaI in the MCS and separated on a 1% agarose gel. The band of interest was excised and purified using a gel extraction kit. Each mRNA expression cassette was amplified by polymerase chain reaction (PCR) using Taq polymerase and the PCR products were gel purified and the bands on interest were also excised and purified using a gel extraction kit. These PCR products contained the mRNA expression cassettes in addition to 15 base pair 5' and 3' overhangs that aligned with the ends of the linearized pAVA-00200 backbone. Using in-fusion cloning, the amplified mRNA expression cassettes are integrated with the pAVA-00200 backbone via homologous recombination. The resulting RP contained the following: 5' ITR, CASI promoter, miRNA expression cassette, WPRE, SV40 polyA and ITR 3'.

The invention claimed is:

1. An isolated plasmid comprising the nucleic acid sequence of SEQ ID NO: 5 encoding a messenger ribonucleic acid (mRNA) encoding a fusion protein comprising at least one domain of a neural growth factor (NGF) protein and an Fc domain.

2. The isolated plasmid of claim 1, further comprising one or more pharmaceutically acceptable carriers.

3. An isolated plasmid comprising the nucleic acid sequence of SEQ ID NO: 10 encoding a messenger ribonucleic acid (mRNA) encoding a fusion protein comprising at least one domain of a neural growth factor (NGF) protein and an Fc domain.

* * * * *

SEQUENCE LISTING

```
Sequence total quantity: 11
SEQ ID NO: 1          moltype = DNA  length = 5861
FEATURE               Location/Qualifiers
source                1..5861
                      mol_type = other DNA
                      organism = synthetic construct
SEQUENCE: 1
ttctagaata atcaacctct ggattacaaa atttgtgaaa gattgactgg tattcttaac   60
tatgttgctc cttttacgct atgtggatac gctgctttaa tgcctttgta tcatgctatt  120
gcttcccgta tggctttcat tttctcctcc ttgtataaat cctggttgct gtctctttat  180
gaggagttgt ggcccgttgt caggcaacgt ggcgtggtgt gcactgtgtt tgctgacgca  240
accccactg gttggggcat tgccaccacc tgtcagctcc tttccgggac tttcgctttc  300
cccctcccta ttgccacggc ggaactcatc gccgcctgcc ttgcccgctg ctggacaggg  360
gctcggctgt tgggcactga caattccgtg gtgttgtcgg ggaaatcatc gtcctttcct  420
tggctgctcg cctgtgttgc cacctggatt ctgcgcggga cgtccttctg ctacgtccct  480
tcggccctca atccagcgga ccttccttcc gcggcctgc tgccggctct gcggcctctt  540
ccgcgtcttc gccttcgccc tcagacgagt cggatctccc tttgggccgc ctccccgcct  600
aagcttatcg ataccgtcga gatctaactt gtttattgca gcttataatg gttacaaata  660
aagcaatagc atcacaaatt tcacaaataa agcatttttt tcactgcatt ctagttgtgg  720
tttgtccaaa ctcatcaatg tatcttatca tgtctggatc tgacctcga ctagagcatg  780
gctacgtaga taagtagcat ggcgggttaa tcattaacta caaggaaccc ctagtgatgg  840
agttggccac tccctctctg cgcgctcgct cgctcactga ggccgggcga ccaaaggtcg  900
cccgacgccc gggctttgcc cggcggcct cagtgagcga gcgagcgcgc cagctggcgt  960
aatagcgaag aggcccgcac cgatcgccct tcccaacagt tgcgcagcct gaatggcgaa 1020
tggaattcca gacgattgag cgtcaaaatg taggtatttc catgagcgtt tttcctgttg 1080
caatggctgg cggtaatatt gttctggata ttaccagcaa ggccgatagt ttgagttctt 1140
ctactcaggc aagtgatgtt attactaatc aaagaagtat tgcgacaacg gttaatttgc 1200
gtgatggaca gactctttta ctcggtgcc tcactgatta taaaaacact tctcaggatt 1260
ctggcgtacc gttcctgtct aaaatcccct taatcggcct cctgtttagc tcccgctctg 1320
attctaacga ggaaagcacg ttatacgtgc tcgtcaaagc aaccatagta cgcgcccgt 1380
agcggcgcat taagcgcggc gggtgtggtg gttacggcgca gcgtgaccgc tacacttgcc 1440
```

```
agcgccctag cgcccgctcc tttcgctttc ttcccttcct ttctcgccac gttcgccggc  1500
tttcccgtc  aagctctaaa tcggggctc  cctttagggt tccgatttag tgctttacgg  1560
cacctcgacc ccaaaaaact tgattagggt gatggttcac gtagtgggcc atcgccctga  1620
tagacgtttt ttcgcccttt gacgttggag tccacgttct ttaatagtgg actcttgttc  1680
caaactggaa caacactcaa ccctatctcg gtctattctt ttgatttata agggattttg  1740
ccgatttcgg cctattggtt aaaaaatgag ctgatttaac aaaaatttaa cgcgaatttt  1800
aacaaaatat taacgtttac aatttaaata tttgcttata caatcttcct gttttttgggg 1860
cttttctgat tatcaaccgg ggtacatatg attgacatgc tagttttacg attaccgttc  1920
atcgattctc ttgtttgctc cagactctca ggcaatgacc tgatagcctt tgtagagacc  1980
tctcaaaaat agctaccctc tccggcatga atttatcagc tagaacggtt gaatatcata  2040
ttgatggtga tttgactgtc tccggccttt ctcacccgtt tgaatcttta cctacacatt  2100
actcaggcat tgcatttaaa atatatgagg gttctaaaaa ttttatcct  tgcgttgaaa  2160
taaaggcttc tcccgcaaaa gtattacagg gtcataatgt ttttggtaca accgatttag  2220
ctttatgctc tgaggcttta ttgcttaatt ttgctaattc tttgccttgc ctgtatgatt  2280
tattggatgt tggaattcct gatgcggtat tttctcctta cgcatctgtg cggtatttca  2340
caccgcatat ggtgcactct cagtacaatc tgctctgatg ccgcatagtt aagccagccc  2400
cgacacccgc caacacccgc tgacgcgccc tgacgggctt gtctgctccc ggcatccgct  2460
tacagacaag ctgtgaccgt ctccgggagc tgcatgtgtc agaggttttc accgtcatca  2520
ccgaaacgcg cgagacgaaa gggcctcgtg atacgcctat ttttataggt taatgtcatg  2580
ataataatgg tttcttagac gtcaggtggc acttttcggg gaaatgtgcg cggaacccct  2640
atttgtttat ttttctaaat acattcaaat atgtatccgc tcatgagaca ataaccctga  2700
taaatgcttc aataaattg aaaaaggaag agtatgagta ttcaacattt ccgtgtcgcc  2760
cttattccct tttttgcggc attttgcctt cctgtttttg ctcacccaga aacgctggtg  2820
aaagtaaaag atgctgaaga tcagttgggg gcacgagtgg gttacatcga actggatctc  2880
aacagcggta agatcttga  gagttttcgc cccgaagaac gttttccaat gatgagcact  2940
tttaaagttc tgctatgtgg cgcggtatta tcccgtattg acgccgggca agagcaactc  3000
ggtcgccgca tacactattc tcagaatgac ttggttgagt actcaccagt cacagaaaag  3060
catcttacgg atggcatgac agtaagagaa ttatgcagtg ctgccataac catgagtgat  3120
aacactgcgg ccaacttact tctgacaacg atcgaggac  cgaaggagct aaccgctttt  3180
ttgcacaaca tgggggatca tgtaactcgc cttgatcgtt gggaaccgga gctgaatgaa  3240
gccataccaa acgacgagcg tgacaccacg atgcctgtag caatggcaac aacgttgcgc  3300
aaactattaa ctggcgaact acttactcta gcttcccggc aacaattaat agactggatg  3360
gaggcggata aagttgcagg accacttctg cgctcggccc ttccggctgg ctggtttatt  3420
gctgataaat ctggagccgg tgagcgtggg tctcgcggta tcattgcagc actggggcca  3480
gatggtaagc cctcccgtat cgtagttatc tacacgacgg ggagtcagc  aactatggat  3540
gaacgaaata gacagatcgc tgagataggt gcctcactga ttaagcattg gtaactgtca  3600
gaccaagttt actcatatat actttagatt gatttaaaac ttcatttta atttaaaagg  3660
atctaggtga agatcctttt tgataatctc atgaccaaaa tcccttaacg tgagttttcg  3720
ttccactgag cgtcagaccc cgtagaaaag atcaaaggat cttcttgaga tcctttttttc 3780
ctgcgcgtaa tctgctgctt gcaaacaaaa aaaccaccgc taccagcggt ggtttgtttg  3840
ccggatcaag agctaccaac tcttttccg  aaggtaactg gcttcagcag agcgcagata  3900
ccaaatactg tccttctagt gtagccgtag ttaggccacc acttcaagaa ctctgtagca  3960
ccgcctacat acctcgctct gctaatcctg ttaccagtgg ctgccgccag tggcgataag  4020
tcgtgtctta ccgggttgga ctcaagacga tagttaccgg ataaggcgca gcggtcgggc  4080
tgaacggggg gttcgtgcac acagcccagc ttggagcgaa cgacctacac cgaactgaga  4140
tacctacagc gtgagctatg agaaagcgcc acgcttcccg aagggagaaa ggcggacagg  4200
tatccggtaa gcggcagggt cggaacagga gagcgcacga ggggagcttcc aggggggaaac 4260
gcctggtatc tttatagtcc tgtcgggttt cgccacctct gacttgagcg tcgatttttg  4320
tgatgctcgt caggggggcg gagcctatgg aaaaacgcca gcaacgcggc cttttttacgg  4380
ttcctggcct tttgctggcc ttttgctcac atgttctttc ctgcgttatc ccctgattct  4440
gtggataacc gtattaccgc cttttgagtga gctgataccg ctcgccgcag ccgaacgacc  4500
gagcgcagcg agtcagtgag cgaggaagcg gaagagcgcc caatacgcaa accgcctctc  4560
cccgcgcgtt ggccgattca ttaatgcagc agctgcgcgc tcgctcgctc actgaggccg  4620
cccgggcaaa gcccgggcgt cgggcgacct ttggtcgccc ggcctcagtg agcgagcgag  4680
cgcgcagaga gggagtggcc aactccatca ctaggggttc cttgtagtta atgattaacc  4740
cgccatgcta cttatctacg tagccatgct ctaggacatt gattattgac tagtggagtt  4800
ccgcgttaca taacttacgg taaatggccc gcctggctga ccgcccaacg acccccgccc  4860
attgacgtca ataatgacgt atgttccat  agtaacgcca tagggacttt tccattgacg  4920
tcaatgggtg gagtatttac ggtaaactgc ccacttggca gtacatcaag tgtatcatat  4980
gccaagtacg cccccctattg acgtcaatga cggtaaatgg cccgcctggc attatgccca  5040
gtacatgacc ttatgggact ttcctacttg gcagtacatc tacgtattag tcatcgctat  5100
taccatggtc gaggtgagcc ccacgttctg cttcactctc cccatctccc ccccctcccc  5160
acccccaatt ttgtatttat ttattttta  attattttgt gcagcgatgg ggggcggggg  5220
ggggggggc  gcgcgccagg cggggcgggg cggggcgcgg ggcgaggcgg  5280
agaggtgcgg cggcagccaa tcagagcggc gcgctccgaa agtttccttt tatggcgagg  5340
cggcggcggc ggcggcccta taaaagcga  agcgcgcggc gggcgggagt cgctgcgcgc  5400
tgccttcgcc ccgtgcccg  ctccgccgcc gcctcgcgcc gcccgcccg  gctctgactg  5460
accgcgttac taaacaggt  aagtccgcc  tccgcgccgg gtttggcgc  ctccgcggg   5520
cgccccctc  ctcacggcga gcgctgccac gtcagacgaa gggcgcagcg agcgtcctga  5580
tccttccgcc cggacgctca ggacagcggc ccgctgctca taagactcgg ccttagaacc  5640
ccagtatcag cagaaggaca ttttaggacg ggacttgggt gactctaggg cactggtttt  5700
ctttccagag agcggaacag gcgaggaaaa gtagtccctt ctcggcgatt ctgcggaggg  5760
atctccgtgg ggcggtgaac gccgatgatg cctctactaa ccatgttcat gttttctttt  5820
tttttctaca ggtcctgggt gacgaacagg gtaccgccac c                      5861

SEQ ID NO: 2         moltype = DNA   length = 1560
FEATURE              Location/Qualifiers
source               1..1560
                     mol_type = other DNA
```

```
                    organism = synthetic construct
SEQUENCE: 2
atgaggggca tgaagctgct gggggcgctg ctggcactgg cggccctact gcaggggcc    60
gtgtccctga agatcgcagc cttcaacatc cagacatttg gggagaccaa gatgtccaat   120
gccaccctcg tcagctacat tgtgcagatc ctgagcgct atgacatcgc cctggtccag   180
gaggtcagag acagccacct gactgccgtg gggaagctgc tggacaacct caatcaggat   240
gcaccagaca cctatcacta cgtggtcagt gagccactgg acggaacag ctataaggag    300
cgctacctgt tcgtgtacag gcctgaccag gtgtctgcgg tggacagcta ctactacgat   360
gatggctgcg agcctgcgg gaacgacacc ttcaaccgag agccagccat tgtcaggttc    420
ttctcccggt tcacagaggt cagggagttt gccattgttc ccctgcatgc ggccccgggg   480
gacgcagtag ccgagatcga cgctctctat gacgtctacc tggatgtcca agagaaatgg   540
ggcttggagg acgtcatgtt gatgggcgac ttcaatgcgg gctgcagcta tgtgagaccc   600
tcccagtggt catccatccg cctgtggaca gccccacct tccagtggct gatccccgac     660
agcgctgaca ccacagctac acccacgcac tgtgcctatg acaggatcgt ggttgcaggg   720
atgctgctcc gaggcgccgt tgttcccgac tcggctcttc cctttaactt ccaggctgcc   780
tatggcctga gtgaccaact ggcccaagcc atcagtgacc actatccagt ggaggtgatg   840
ctgaagggcg gatcaggcgg atcacccaaa tcttgtgaca aaactcacac atgcccaccg   900
tgcccagcac ctgaactcct gggggaccg tcagtcttcc tcttccccc aaaacccaag     960
gacacccctca tgatctcccg gacccctgag gtcacatgc tggtggtgga cgtgagccac   1020
gaagaccctg aggtcaagtt caactggtac gtggacggcg tggaggtgca taatgccaag   1080
acaaagccgg gggaggagca gtacaacagc acgtaccgtg tggtcagcgt cctcaccgtc   1140
ctgcaccagg actggctgaa tggcaaggag tacaagtgca aggtctccaa caaagccctc   1200
ccagccccca tcgagaaaac catctccaaa gccaaaggc agccccgaga accacaggtg    1260
tacaccctgc cccatcccg ggaggagatg accaagaacc aggtcagcct gacctgcctg    1320
gtcaaaggct tctatcccag cgacatcgcc gtggagtggg agagcaatgg gcagccggag   1380
aacaactaca agaccacgcc tcccgtgctg gactccgacg gctccttctt cctctacagc   1440
aagctcaccg tggacaagag caggtggcag caggggaacg tcttctcatg ctccgtgatg   1500
catgaggctc tgcacaacca ctacacgcag aagagcctct ccctgtctcc gggtaaatag   1560

SEQ ID NO: 3           moltype = DNA  length = 3423
FEATURE                Location/Qualifiers
source                 1..3423
                       mol_type = other DNA
                       organism = synthetic construct
SEQUENCE: 3
gccagaccct gccgtgcatt tatttttggg gcggcctgct gccgtttggc atgctgtgcg    60
cgagcagcac caccaaatgc accgtgagcc atgaagtggc ggattgcagc catctgaaac   120
tgacccaggt gccggatgat ctgccgacca acattaccgt gctgaacctg acccataacc   180
agctgccgcg cctgccggcg gcgaacttta cccgctatag ccagctgacc agcctggatg   240
tgggctttaa caccattagc aaactggaac cggaactgtg ccagaaactg ccgatgctga   300
aagtgctgaa cctgcagcat aacgaactga gccagctgag cgataaaacc tttgcgtttt   360
gcaccaacct gaccgaactg catctgatga gcaacagcat tcagaaaatt aaaaacaacc   420
cgtttgtgaa acagaaaaac ctgattaccc tggatctgag ccataacagc ctgagcagca   480
ccaaactggg cacccaggtg cagctggaaa acctgcagga actgctgctg agcaacaaca   540
aaattcaggc gctgaaaagc gaagaactgg atatttttgc gaacagcagc ctgaaaaaac   600
tggaactgag cagcaaccag attaaagaat ttagcccggg ctgctttcat gcgattggcc   660
gcctgtttgg cctgtttctg aacaacgtgc agctgggcc cagctgctgc gaaaaactgt   720
gcctggaact ggcgaacacc agcattcgca acctgagcct gagcaacagc cagctgagca   780
ccaccagcaa caccaccttt ctgggcctga atggaccaa cctgaccatg ctggatctga   840
gctataacaa cctgaacgtg gtgggcaacg atagctttgc gtggctgccg cagctggaat   900
attttttctc ggaatataac aacattcagc atctgtttta ccatagcctg catggcctgt   960
taacgtgcg ctatctgaac ctgaaacgca gctttaccaa acagagcatt agcctggcga   1020
gcctgccgaa aattgatgat tttagctttc agtggctgaa atgcctggaa catctggaaca   1080
tggaagataa cgatattccg ggcattaaaa gcaacatgtt taccggcctg attaacctga   1140
aatatctgag cctgagcaac agctttacca gcctgcgcaa cctgaccaac gaaacctttg   1200
tgagcctggc gcatagcccg ctgcatattc tgaacctgac caaaaacaaa attagcaaaa   1260
ttgaaagcga tgcgtttagc tggctgggc atctggaagt gctggatctg ggcctgaacg   1320
aaattggcca ggaactgacc ggccaggaat ggcgcgcct ggaaaacatt tttgaaattt    1380
atctgagcta taacaaatat ctgcagctga cccgcaacag ctttgcgctg gtgccggcc   1440
tgcagcgcct gatgctgcgc gcgtggcgc tgaaaaacgt ggatagcagc ccgagccgt    1500
ttcagccgct cgcgcaacctg accattctgg atctgagcaa caacaacatt gcgaacatta   1560
acgatgatat gctggaaggc ctgaaaaac tggaaattct ggatctgcag cataacaacc   1620
tggcgcgcct gtggaaacat gcgaacccgg gcggccgat ttattttctg aaaggcctga   1680
gccatctgca tattctgaac ctggaaagca acggctttga tgaaattccg tggaagtgt   1740
ttaaagatct gtttgaactg aaaattattg atctgggcct gaacaacctg aacaccctgc   1800
cggcgagcgt gtttaacaac caggtgagcc tgaaagcct gaacctgcag aaaacctga   1860
ttaccagcgt ggaaaaaaa gtgtttgcc cggcgtttcg caacctgacc gaactggata   1920
tgcgctttaa cccgtttgat tgcacctgcg aaagcattgc gtggtttgtg aactggatta   1980
acgaaaccca taccaacatt ccggaactga gcagccatta tctgtgcaac acccccgccg   2040
attatcatgg ctttccggtg cgcctgtttt ataccagcag ctgcaaagat agcgcgccgt   2100
ttgaactgtt ttttatgatt aacaccagca ttctgctgat ttttatttt attgtgctgc   2160
tgattcattt tgaaggctgg cgcattagct tttattgaa cgtgagcgtg catcgcgtgc   2220
tgggctttaa agaaattgat cgccagaccg aacagtttga atatgcggcg tatattattc   2280
atgcgtataa agataaagat tgggtgtgga acattttag cacatggaa aaagaagatc   2340
agagcctgaa attttgcctg gaagaacgcg attttgaagc gggcgtgttt gaactggaag   2400
cgattgtgaa cagcattaaa cgcagccgca aaattatttt tgtgattacc catcatctgc   2460
tgaaagatcc gctgtgcaaa cgctttaaag tgcatcatgc ggtgcagcag gcgattgaac   2520
agaacctgga tagcattatt ctggtgtttc tggaagaaat tccggattat aaactgaacc   2580
atgcgctgtg cctgcgccgc ggcatgttta aaagccattg cattctgaac tggccggtgc   2640
```

```
agaaagaacg cattggcgcg tttcgccata aactgcaggt ggcgctgggc agcaaaaaca 2700
gcgtgcatgg gcggatcagg cggatccacc aaatcttgtg acaaaactca cacatgccca 2760
ccgtgcccag cacctgaact cctgggggga ccgtcagtct tcctcttccc cccaaaaccc 2820
aaggacaccc tcatgatctc ccggacccct gaggtcacat gcgtggtggt ggacgtgagc 2880
cacgaagacc ctgaggtcaa gttcaactgg tacgtggacg gcgtggaggt gcataatgcc 2940
aagacaaagc cgcgggagga gcagtacaac agcacgtacc gtgtggtcag cgtcctcacc 3000
gtcctgcacc aggactggct gaatggcaag gagtacaagt gcaaggtctc caacaaagcc 3060
ctcccagccc ccatcgagaa aaccatctcc aaagccaaag gcagccccg agaaccacag 3120
gtgtacaccc tgcccccatc ccgggaggag atgaccaaga accaggtcag cctgacctgc 3180
ctggtcaaag gcttctatcc cagcgacatc gccgtggagt gggagagcaa tgggcagccg 3240
gagaacaact acaagaccac gcctcccgtg ctggactccg acggctcctt cttcctctac 3300
agcaagctca ccgtggacaa gagcaggtgg cagcagggga acgtcttctc atgctccgtg 3360
atgcatgagg ctctgcacaa ccactacacg cagaagagcc tctccctgtc tccgggtaaa 3420
tag                                                                3423

SEQ ID NO: 4           moltype = DNA   length = 3877
FEATURE                Location/Qualifiers
source                 1..3877
                       mol_type = other DNA
                       organism = synthetic construct SEQUENCE: 4
atgagggca tgaagctgct gggggcgctg ctggcactgg cggccctact gcaggggcc 60
gtgtccatgg gcttttgccg cagcgcgctg catccgctga gcctgctggt gcaggcgatt 120
atgctggcga tgaccctggc gctgggcacc ctgccggcgt ttctgccgtg cgaactgcag 180
ccgcatggcc tggtgaactg caactggctg tttctgaaaa gcgtgccgca ttttagcatg 240
gcggcgccga gcggcaacgt gaccagcctg agcctggcga gcaaccgcat tcatcatctg 300
catgatagcg attttgcgca tctgccgagc ctgcgccatc tgaacctgaa atggaactgc 360
ccgccggtgg gcctgagccc gatgcatttt ccgtgccata tgaccattga accgagcacc 420
tttctgcgcg tgccgaccct ggaagaactg aacctgagct ataacaacat tatgaccgtg 480
ccggcgctgc cgaaaagcct gattagcctg agcctgaaca tactcaacat tctgatgctg 540
gatagcgcga gcctggcggg cctgcatgcg ctgcgctttc tgtttatgga tggcaactgc 600
tattataaaa accgtgccg ccaggcgctg aagtggcgc cgggcgcgct gctgggcctg 660
ggcaacctga cccatctgag cctgaaatat aacaacctga ccgtggtgcc gcgcaacctg 720
ccgagcgcc tggaatatct gctgctgagc tataaccgca ttgtgaaact ggcgccgaaa 780
gatctggcga acctgaccgc gctgcgcgt ctggatgtgg gcggcaactg ccgccgccaa 840
gatcatgcgc cgaacccgtg catgaatgcc ccgcgccatt ttccgcagct gcatccggat 900
acctttagcc atctgagccg cctggaaggc ctggtgctga agatagcag cctgagctgg 960
ctgaacgcga gctggtttcg cggcctgggc aacctgcgcg tgctggatct gagcgaaaac 1020
tttctgtata aatgcattac caaaaccaaa gcgtttcagg gcctgaccca gctgcgcaaa 1080
ctgaacctga gctttaacta tcagaaacgc gtgagctttg cgcatctgag cctggcgccg 1140
agctttggca gcctggtggc gctgaaagaa ctggatatgc atggcatttt ttttcgcagc 1200
ctggatgaaa ccaccctgcg cccgctggcg cgcctgcga tgctgcagac cctgcgcctg 1260
cagatgaact ttattaacca ggcgcagctg ggcattttc gcgcgttttc gggcctgcgc 1320
tatgtggatc tgagcgataa ccgcattagc ggcgcgagcg aactgaccgc gaccatgggc 1380
gaagcggatg gcgcgaaaa agtgtggctg cagccgggcg atctggcgcc ggcgccggtg 1440
gatacccga gcagcgaaga ttttcgcccg aactgcagca ccctgaactt taccctggat 1500
ctgagccgca caaacctggt gaccgcgcag ccggaaatgt ttgcgcagct gagccattcg 1560
cagtgcctgc gcctgagcca taactgcatt agccaggcgg tgaacggcag ccagtttctg 1620
ccgctgaccg gcctgcaggt gctggatctg agccataaca aactggatct gtatcatgaa 1680
catagcttta ccgaactgcc gcgcctgaaa gcgctggatc tgagctataa cagccagccg 1740
tttggcatgc agggcgtggg ccataacttt agctttggg cgcatctgcg cacccgtgcg 1800
catctgagcc tggcgcataa caacattcat agccaggtga gccagcagct gtgcagcacc 1860
agcctgcgcg cgctggattt tagcggcaac gcgctgggcc atatgtgggc ggaaggcgat 1920
ctgtatctgc atttttttca gggcctgagc ggcctgattt ggctggatct gagccagaac 1980
cgcctgcata cccctgctgcc gcagaccctg cgcaacctgc cgaaaagcct gcaggtgctg 2040
cgcctgcgcg ataactatct ggcgtttttt aaatggtgga gcctgcattt tctgccgaaa 2100
ctggaagtgc tggatctggc gggcaaccag ctgaaagcgc tgaccaacgg cagcctgccg 2160
gcgggcaccc gcctgcgccg cctggatgtg agctgcaaca gcattagctt tgtggcgccg 2220
ggcttttttta gcaaagcgaa agaactgcgc gaactgaacc tgagcgcgaa cgcgctgaaa 2280
accgtggatc atagctggtt tggcccgctg gcgagcgcgc tgcagattct ggatgtgagc 2340
gcgaacccgc tgcattcgc gtgcggcgcg cgtttatgg attttctgct ggaagtgcag 2400
gcggcggtgc cgggcctgcc gagccgcgtg aaatgcggca gcccgggcca gctgcagggc 2460
ctgagcattt ttgcgcagga tctgcgcctg tgcctgatg aagcgctgag ctgggattgc 2520
tttgcgctga gcctgctgc ggtggcctg ggcctggtgc gcgatgctg gcatcatctg 2580
tgcggctggg atctgtggta ttgctttcat ctgtgcctgg cgtggctgcc gtggcgcggc 2640
cgccagagcg gccgcgatga agatgcgctg ccgtatgatg cgtttgtggt gtttgataaa 2700
acccagagcc cggtggcgga ttgggtgtat aacgaactgc gcggccagct ggaagaatgc 2760
cgcggccgct gggcgctgcg cctgtgcctg gaagaacgca ttggctgcc gggcaaaacc 2820
ctgtttgaaa acctgtgggc gagcgtgtat ggcagccgca aaacctgtt tgtgctggcg 2880
cataccgatc gcgtgagcgg cctgctgcgc gcgagctttc tgctggcgca gcagcgcctg 2940
ctggaagatc gcaaagatgt ggtggtgctg gtgattctga gccgcatgg ccgccgcagc 3000
cgctatgtgc gcctgcgcca gcgcctgtgc cgccagagcg tgctgctgtg gccgcatcag 3060
ccgagcggcc agcgcagctt tgggcgcag ctggcatgg cgctcacccg cgataaccat 3120
catttttata accgcaactt tgccagggc ccgaccgggc aaggcggat caggcggatc 3180
acccaaatct tgtgacaaaa ctcacacatg cccaccgtgc ccagcacctg aactcctggg 3240
ggaccgtca gtcttcctct tccccccaaa acccaaggac accctcatga tctcccggac 3300
ccctgaggtc acatgcgtgg tggtggacgt gagccacgaa gaccctgagg tcaagttcaa 3360
ctggtacgtg gacggcgtgg aggtgcataa tgccaagaca aagccgcggg aggagcagta 3420
caacagcacg taccgtgtgg tcagcgtcct caccgtcctg caccaggact ggctgaatgg 3480
```

```
caaggagtac aagtgcaagg tctccaacaa agccctccca gccccatcg agaaaaccat   3540
ctccaaagcc aaagggcagc cccgagaacc acaggtgtac accctgcccc catcccggga   3600
ggagatgacc aagaaccagg tcagcctgac ctgcctggtc aaaggcttct atcccagcga   3660
catcgccgtg gagtgggaga gcaatgggca gccggagaac aactacaaga ccacgcctcc   3720
cgtgctggac tccgacggct ccttcttcct ctacagcaag ctcaccgtgg acaagagcag   3780
gtggcagcag gggaacgtct tctcatgctc cgtgatgcat gaggctctgc acaaccacta   3840
cacgcagaag agcctctccc tgtctccggg taaatag                           3877

SEQ ID NO: 5           moltype = DNA  length = 1503
FEATURE                Location/Qualifiers
source                 1..1503
                       mol_type = other DNA
                       organism = synthetic construct
SEQUENCE: 5
atgaggggca tgaagctgct ggggcgctg ctggcactgg cggccctact gcaggggcc    60
gtgtccatga gcatgctgtt ttataccctg attaccgcgt ttctgattgg cattcaggcg   120
gaaccgcata gcgaaagcaa cgtgccggcg ggccatacca ttccgcaggc gcattggacc   180
aaactgcagc atagcctgga taccgcgctg cgccgcggcg gcggcggccc gcgaaaccg   240
attgcggcgc gcgtggcggg ccagacccgc aacattaccg tggatccgcg cctgtttaaa   300
aaacgccgcc tgcgcagccc gcgcgtgctg tttagcaccc agccgccgcg cgaagcgggg   360
gatacccagg atctggattt tgaagtgggc ggcgcggcgc cgtttaaccg caccccatcgc  420
agcaaacgca gcagcagcca tccgattttt catcgccgcg aatttagcgt gtgcgatagc   480
gtgagcgtgt gggtgggcga taaaaccacc gcgaccgata ttaaaggcaa agaagtgatg   540
gtgctgggcg aagtgaacat taacaacagc gtgtttaaac agtatttttt tgaaaccaaa   600
tgccgcgatc cgaacccggt ggatagcggc tgccgcggca ttgatagcaa acattggaac   660
agctattgca ccaccaccca tacctttgtg aaagcgctaa ccatggatgg caaacaggcg   720
gcgtggcgct ttattcgcat tgataccgcg tgcgtgtgcg tgctgagccg caaagcggtg   780
cgccgcgcgg gcgatcagg cggatcaccc aaatcttgtg acaaaactca cacatgccca   840
ccgtgcccag cacctgaact cctgggggga ccgtcagtct tcctcttccc cccaaaaccc   900
aaggacaccc tcatgatctc ccggacccct gaggtcacat gcgtggtggt ggacgtgagc   960
cacgaagacc ctgaggtcaa gttcaactgg tacgtggacg gcgtggaggt gcataatgcc  1020
aagacaaagc cgcgggagga gcagtacaac agcacgtacc gtgtggtcag cgtcctcacc  1080
gtcctgcacc aggactggct gaatggcaag gagtacaagt gcaaggtctc caacaaagcc  1140
ctcccagccc ccatcgagaa aaccatctcc aaagccaaag ggcagcccg agaaccacag  1200
gtgtacaccc tgcccccatc ccgggaggag atgaccaaga accaggtcag cctgacctgc  1260
ctggtcaaag gcttctatcc cagcgacatc gccgtggagt gggagagcaa tgggcagccg  1320
gagaacaact acaagaccac gcctcccgtg ctggactccg acggctcctt cttcctctac  1380
agcaagctca ccgtggacaa gagcaggtgg cagcaggga acgtcttctc atgctccgtg  1440
atgcatgagg ctctgcacaa ccactacacg cagaagagcc tctccctgtc tccgggtaaa  1500
tag                                                                1503

SEQ ID NO: 6           moltype = DNA  length = 1111
FEATURE                Location/Qualifiers
source                 1..1111
                       mol_type = other DNA
                       organism = synthetic construct
SEQUENCE: 6
atgaggggca tgaagctgct ggggcgctg ctggcactgg cggccctact gcaggggcc    60
gtgtccatgg cgctgtggat gcgcctgctg ccgctgctgg cgctgctggc gctgtgggc   120
ccggatccgc cggcggcgtt tgtgaaccag catctgtgcg gcagccatct ggtggaagcg   180
ctgtatctgg tgtgcggcga acgcggcttt ttttataccc cgaaaacccg ccgcgaagcg   240
gaagatctgc aggtgggcca ggtggaactg ggcggcggcc cgggcgcggg cagcctgcag   300
ccgctggcgc tggaaggcag cctgcagaaa cgcggcattg tgaacagtg ctgcaccagc   360
atttgcagcc tgtatcagct ggaaaactat tgcaacgggc ggatcaggcg gatcacccaa   420
atcttgtgac aaaactcaca catgcccacc gtgcccagca cctgaactcc tgggggaccc   480
gtcagtcttc ctcttccccc caaaacccaa ggacaccctc atgatctccc ggacccctga   540
ggtcacatgc gtggtggtgg acgtgagcca cgaagaccct gaggtcaagt tcaactggta   600
cgtggacggc gtggaggtgc ataatgccaa gacaaagccg cgggaggagc agtacaacag   660
cacgtaccgt gtggtcagcg tcctcaccgt cctgcaccag gactggctga atggcaagga   720
gtacaagtgc aaggtctcca acaaagccct cccagccccc atcgagaaaa ccatctccaa   780
agccaaaggg cagccccgag aaccacaggt gtacaccctg cccccatccc gggaggagat   840
gaccaagaac caggtcagcc tgacctgcct ggtcaaaggc ttctatccca gcgacatcgc   900
cgtggagtgg gagagcaatg gcagccgga gaacaactac aagaccacgc tcccgtgct   960
ggactccgac ggctccttct cctctacag caagctcacc gtggacaaga gcaggtggca  1020
gcagggaac gtcttctcat gctccgtgat gcatgaggct ctgcacaacc actacacgca  1080
gaagagcctc tccctgtctc cgggtaaata g                                1111

SEQ ID NO: 7           moltype = DNA  length = 7421
FEATURE                Location/Qualifiers
source                 1..7421
                       mol_type = other DNA
                       organism = synthetic construct
SEQUENCE: 7
ttctagaata atcaacctct ggattacaaa atttgtgaaa gattgactgg tattcttaac   60
tatgttgctc cttttacgct atgtggatac gctgctttaa tgcctttgta tcatgctatt   120
gcttcccgta tggctttcat tttctcctcc ttgtataaat cctggttgct gtctctttat   180
gaggagttgt ggcccgttgt caggcaacgt ggcgtggtgt gcactgtgtt tgctgacgca   240
accccactgg ttgggcat tgccaccacc tgtcagctcc tttccgggac tttcgctttc   300
cccctcccta ttgccacggc ggaactcatc gccgcctgcc ttgcccgctg ctggacaggg   360
```

```
gctcggctgt tgggcactga caattccgtg gtgttgtcgg ggaaatcatc gtcctttcct    420
tggctgctcg cctgtgttgc cacctggatt ctgcgcggga cgtccttctg ctacgtccct    480
tcggccctca atccagcgga ccttccttcc cgcggcctgc tgccggctct gcggcctctt    540
ccgcgtcttc gccttcgccc tcagacgagt cggatctccc tttgggccgc ctccccgcct    600
aagcttatcg ataccgtcga gatctaactt gtttattgca gcttataatg gttacaaata    660
aagcaatagc atcacaaatt tcacaaataa agcattttt tcactgcatt ctagttgtgg    720
tttgtccaaa ctcatcaatg tatcttatca tgtctggatc tcgacctcga ctagagcatg    780
gctacgtaga taagtagcat ggcgggttaa tcattaacta caaggaaccc ctagtgatgg    840
agttggccac tccctctctg cgcgctcgct cgctcactga ggccgggcga ccaaaggtcg    900
cccgacgccc gggctttgcc cgggcggcct cagtgagcga gcgagcgcgc cagctggcgt    960
aatagcgaag aggcccgcac cgatcgccct cccaacagt tgcgcagcct gaatggcgaa   1020
tggaattcca gacgattgag cgtcaaaatg taggtatttc catgagcgtt tttcctgttg   1080
caatggctgg cggtaatatt gttctggata ttaccagcaa ggccgatagt ttgagttctt   1140
ctactcaggc aagtgatgtt attactaatc aaagaagtat tgcgacaacg gttaatttgc   1200
gtgatggaca gactctttta ctcggtggcc tcactgatta taaaaacact tctcaggatt   1260
ctggcgtacc gttcctgtct aaaatccctt taatcggcct cctgtttagc tcccgctctg   1320
attctaacga ggaaagcacg ttatacgtgc tcgtcaaagc aaccatagta cgcgccctgt   1380
agcggcgcat taagcgcggc gggtgtggtg gttacgcgca gcgtgaccgc tacacttgcc   1440
agcgccctag cgcccgctcc tttcgctttc ttccctttcct ttctcgccac gttcgccggc   1500
tttccccgtc aagctctaaa tcgggggctc cctttagggt tccgatttag tgctttacgg   1560
cacctcgacc ccaaaaaact tgattagggt gatggttcac gtagtgggcc atcgccctga   1620
tagacggttt ttcgcccttt gacgttggag tccacgttct ttaatagtgg actcttgttc   1680
caaactggaa caacactcaa ccctatctcg gtctattctt ttgatttata agggattttg   1740
ccgatttcgg cctattggtt aaaaaatgag ctgatttaac aaaaatttaa cgcgaatttt   1800
aacaaaatat taacgtttac aatttaaata tttgcttata caatcttcct gtttttgggg   1860
cttttctgat tatcaaccgg ggtacatatg attgacatgc tagttttacg attaccgttc   1920
atcgattctc ttgttgtgctc cagactctca ggcaatgacc tgatagcctt tgtagagacc   1980
tctcaaaaat agctaccctc tccggcatga atttatcagc tagaacggtt gaatatcata   2040
ttgatggtga tttgactgtc tccggccttt ctcacccgtt tgaatcttta cctacacatt   2100
actcaggcat tgcatttaaa atatatgagg gttctaaaaa tttttatcct tgcgttgaaa   2160
taaaggcttc tcccgcaaaa gtattacagg gtcataatgt ttttggtaca accgatttag   2220
ctttatgctc tgaggcttta ttgcttaatt ttgctaattc tttgccttgc ctgtatgatt   2280
tattggatgt tggaattcct gatgcggtat tttctcctta cgcatctgtg cggtatttca   2340
caccgcatat ggtgcactct cagtacaatc tgctctgatg ccgcatagtt aagccagcc   2400
cgacacccgc caacacccgc tgacgcgccc tgacgggctt gtctgctccc ggcatccgct   2460
tacagacaag ctgtgaccgt ctccgggagc tgcatgtgtc agaggttttc accgtcatca   2520
ccgaaacgcg cgagacgaaa gggcctcgtg atacgcctat ttttataggt taatgtcatg   2580
ataataatgg tttcttagac gtcaggtggc acttttcggg gaaatgtgcg cggaaccccct   2640
atttgtttat ttttctaaat acattcaaat atgtatccgc tcatgagaca ataaccctga   2700
taaatgcttc aataatattg aaaaaggaag agtatgagta ttcaacattt ccgtgtcgcc   2760
cttattccct tttttgcggc attttgcctt cctgtttttg ctcacccaga aacgctggtg   2820
aaagtaaaag atgctgaaga tcagttgggt gcacgagtgg gttacatcga actggatctc   2880
aacagcggta agatcttga gagtttcgc cccgaagaac gttttccaat gatgagcact   2940
tttaaagttc tgctatgtgg cgcggtatta tcccgtattg acgccgggca agagcaactc   3000
ggtcgccgca tacactattc tcagaatgac ttggttgagt actcaccagt cacagaaaag   3060
catcttacgg atggcatgac agtaagagaa ttatgcagtg ctgccataac catgagtgat   3120
aacactgcgg ccaacttact tctgacaacg atcggaggac cgaaggagct aaccgctttt   3180
ttgcacaaca tgggggatca tgtaactcgc cttgatcgtt gggaaccgga gctgaatgaa   3240
gccataccaa acgacgagcg tgacaccacg atgcctgtag caatggcaac aacgttgcgc   3300
aaactattaa ctggcgaact acttactcta gcttcccggc aacaattaat agactggatg   3360
gaggcggata aagttgcagg accacttctg cgctcggccc ttccggctgg ctggtttatt   3420
gctgataaat ctggagccgg tgagcgtggg tctcgcggta tcattgcagc actggggcca   3480
gatggtaagc cctcccgtat cgtagttatc tacacgacgg ggagtcaggc aactatggat   3540
gaacgaaata gacagatcgc tgagataggt gcctcactga ttaagcattg gtaactgtca   3600
gaccaagttt actcatatat actttagatt gatttaaaac ttcatttttta atttaaaagg   3660
atctaggtga agatcctttt tgataatctc atgaccaaaa tcccttaacg tgagttttcg   3720
ttccactgag cgtcagaccc cgtagaaaag atcaaaggat cttcttgaga tccttttttt   3780
ctgcgcgtaa tctgctgctt gcaaacaaaa aaaccaccgc taccagcggt ggtttgtttg   3840
ccggatcaag agctaccaac tctttttccg aaggtaactg gcttcagcag agcgcagata   3900
ccaaatactg tccttctagt gtagccgtag ttaggccacc acttcaagaa ctctgtagca   3960
ccgcctacat acctcgctct gctaatcctg ttaccagtgg ctgctgccag tggcgataag   4020
tcgtgtctta ccgggttgga ctcaagacga tagttaccgg ataaggcgca gcggtcgggc   4080
tgaacggggg gttcgtgcac acagcccagc ttggagcgaa cgacctacac cgaactgaga   4140
tacctacagc gtgagctatg agaaagcgcc acgcttcccg aagggagaaa ggcggacagg   4200
tatccggtaa gcggcagggt cggaacagga gagcgcacga gggagcttcc agggggaaac   4260
gcctggtatc tttatagtcc tgtcgggttt cgccacctct gacttgagcg tcgatttttg   4320
tgatgctcgt caggggggcg gagcctatgg aaaaacgcca gcaacgcggc ctttttacgg   4380
ttcctggcct tttgctggcc ttttgctcac atgttcttc ctgcgttatc ccctgattct   4440
gtggataacc gtattaccgc ctttgagtga gctgataccg ctcgccgcag ccgaacgacc   4500
gagcgcagcg agtcagtgag cgaggaagcg gaagagcgcc caatacgcaa accgcctctc   4560
cccgcgcgtt ggccgattca ttaatgcagc agctgcgcgc tcgctcgctc actgaggccg   4620
cccgggcaaa gccgggcgt cgggcgacct ttggtcgccc ggcctcagtg agcgagcgag   4680
cgcgcagaga gggagtggcc aactccatca ctaggggttc cttgtagtta atgattaacc   4740
cgctgcta cttatctacg tagccatgct ctaggacatt gattattgac tagtggagtt   4800
ccgcgttaca taacttacgg taaatggccc gcctggctga ccgcccaacg acccccgccc   4860
attgacgtca ataatgacgt atgttcccat agtaacgcca atagggactt tccattgacg   4920
tcaatgggtg gagtatttac ggtaaactgc ccacttggca gtacatcaag tgtatcatat   4980
gccaagtacg cccctattg acgtcaatga cggtaaatgg cccgcctggc attatgccca   5040
gtacatgacc ttatgggact ttcctacttg gcagtacatc tacgtattag tcatcgctat   5100
```

-continued

```
taccatggtc gaggtgagcc ccacgttctg cttcactctc ccatctccc cccctcccc      5160
accccaatt  ttgtatttat ttatttttta attattttgt gcagcgatgg gggcgggggg    5220
ggggggggc  gcgcgccagg cggggcgggg cgggcgagg  ggcggggcgg ggcgaggcgg    5280
agaggtgcgg cggcagccaa tcagagcggc gcgctccgaa agtttccttt tatggcgagg    5340
cggcggcggc ggcggcccta taaaaagcga agcgcgcggc gctgcgcgc                5400
tgccttcgcc ccgtgccccg ctccgccgcc gcctcgcgcc gcccgcccg  gctctgactg    5460
accgcgttac taaaacaggt aagtccggcc tccgcgccgg gttttggcgc ctcccgcggg    5520
cgccccctc  ctcacggcga gcgctgccac gtcagacgaa gggcgcagcg agcgtcctga    5580
tccttccgcc cggacgctca ggacagcggc ccgctgctca taagactcgg ccttagaacc    5640
ccagtatcag cagaaggaca ttttaggacg ggacttgggt gactctaggg cactggtttt    5700
ctttccagag agcggaacag gcgaggaaaa gtagtcccctt ctcggcgatt ctgcggaggg    5760
atctccgtgg ggcggtgaac gccgatgatg cctctactaa ccatgttcat gttttctttt    5820
tttttctaca ggtcctgggt gacgaacagg gtaccgccac catgagggc  atgaagctgc    5880
tggggcggct gctggcactg gcggccctac tgcagggggc cgtgtccctg aagatcgcag    5940
ccttcaacat ccagacattt ggggagacca agatgtccaa tgccaccctc gtcagctaca    6000
ttgtgcagat cctgagccgc tatgacatcg ccctggtcca ggaggtcaga gacagccacc    6060
tgactgccgt ggggaagctg ctggacaacc tcaatcagga tgcaccagac acctatcact    6120
acgtgtcag  tgagccactg ggacggaaca gctataagga gcgctacctg ttcgtgtaca    6180
ggcctgacca ggtgtctgcg gtggacagct actactacga tgatggctgc gagccctgcg    6240
ggaacgacac cttcaaccga gagccagcca ttgtcaggtt cttctcccgg ttcacagagg    6300
tcagggagtt tgccattgtt ccctgcatg  cggcccggg  ggacgcagta gccgagatcg    6360
acgctctcta tgacgtctac ctggatgtcc aagagaaatg gagctcatgt                6420
tgatgggcga cttcaatgcg ggctgcagct atgtgagacc ctcccagtgg tcatccatcc    6480
gcctgtggac aagccccacc ttccagtggc tgatccccga cagcgctgac accacagcta    6540
cacccacgca ctgtgcctat gacaggatcg tggttgcagg gatgctgctc cgaggcgccc    6600
ttgttcccga ctcggctctt cccttaact  tccaggctgc ctatgcctg  agtgaccaac    6660
tggcccaagc catcagtgac cactatccag tggaggtgat gctgaagggc ggatcaggcc    6720
gatcacccaa atcttgtgac aaaactcaca catgcccacc gtgcccagca cctgaactcc    6780
tgggggacc  gtcagtcttc ctcttccccc caaaacccaa ggacaccctc atgatctccc    6840
ggacccctga ggtcacatgc gtggtggtgg acgtgagcca cgaagaccct gaggtcaagt    6900
tcaactggta cgtggacggc gtggaggtgc ataatgccaa gacaaagccg cgggaggagc    6960
agtacaacag cacgtaccgt gtggtcagcg tcctcaccgt cctgcaccag gactggctga    7020
atggcaagga gtacaagtgc aaggtctcca acaaagccct cccagccccc atcgagaaaa    7080
ccatctccaa agccaaaggg cagccccgag aaccacaggt gtacaccctg cccccatccc    7140
gggaggagat gaccaagaac caggtcagcc tgacctgcct ggtcaaaggc ttctatccca    7200
gcgacatcgc cgtggagtgg gagagcaatg ggcagccgga gaacaactac aagaccacgc    7260
ctcccgtgct ggactccgac ggctccttct tcctctacag caagctcacc gtggacaaga    7320
gcaggtggca gcagggaaac gtcttctcat gctccgtgat gcatgaggct ctgcacaacc    7380
actacacgca gaagagcctc tccctgtctc cgggtaaata g                        7421
```

SEQ ID NO: 8          moltype = DNA   length = 9284
FEATURE               Location/Qualifiers
source                1..9284
                      mol_type = other DNA
                      organism = synthetic construct
SEQUENCE: 8
```
ttctagaata atcaacctct ggattacaaa atttgtgaaa gattgactgg tattcttaac     60
tatgttgctc cttttacgct atgtggatac gctgctttaa tgcctttgta tcatgctatt    120
gcttcccgta tggctttcat tttctcctcc ttgtataaat cctggttgct gtctctttat    180
gaggagttgg ggcccgttgt caggcaacgt ggcgtggtgt gcactgtgtt tgctgacgca    240
accccgtcg  gttggggcat tgccaccacc tgtcagctcc tttccgggac tttcgctttc    300
ccctccccta ttgccacggc ggaactcatc gccgctgcc  ttgcccgctg ctggacaggg    360
gctcggctgt tgggcactga caattccgtg gtgttgtcgg ggaaatcatc gtcctttcct    420
tggctgctcg cctgtgttgc cacctggatt ctgcgcggga cgtccttctg ctacgtccct    480
tcggccctca atccagcgga ccttccttcc cgcggcctgc tgccggctct gcggcctctt    540
ccgcgtcttc gccttcgccc tcagacgagt cggatctccc tttgggccgc ctccccgcct    600
aagcttatcg ataccgtcga gatcaactt  gtttattgca gcttataatg gttacaaata    660
aagcaatagc atcacaaatt tcacaaataa agcatttttt tcactgcatt ctagttgtgg    720
tttgtccaaa ctcatcaatg tatcttatca tgtctggatc tcgacctcga ctagagcatg    780
gctacgtaga taagtagcat ggcgggttaa tcattaacta caaggaaccc ctagtgatgg    840
agttggccac tccctctctg cgcgctcgct cgctcactga ggccgggcga ccaaaggtcg    900
cccgacgccc gggctttgcc cggcggcct  cagtgagcga gcgagcgcgc cagctggcgt    960
aatagcgaag aggcccgcac cgatcgccct tcccaacagt tgcgcagcct gaatggcgaa   1020
tggaattcca gacgattgag cgtcaaaatg taggtatttc catgagcgtt ttcctgttc    1080
caatggctgg cggtaatatt gttctggata ttaccagcaa ggccgatagt ttgagttctt   1140
ctactcaggc aagtgatgtt attactaatc aaagaagtat tgcgacaacg gttaatttgc   1200
gtgatgggac agactctttt actcggtggcc tcactgatta taaaaacact tctcaggatt   1260
ctggcgtacc gttcctgtct aaaatccctt aatcggcctc ccgtttagc  tcccgctctg   1320
attctaacga ggaaagcacg ttatacgtgc tcgtcaaagc aaccatagta cgcgccctgt   1380
agcggcgcat taagcgcggc gggtgtggtg gttacgcgca gcgtgaccgc tacacttgcc   1440
agcgccctag cgcccgctcc tttcgctttc ttcccttcct ttctcgccac gttcgccggc   1500
tttccccgtc aagctctaaa tcggggctc  ccttagggt  tccgatttag tgctttacg    1560
cacctcgacc ccaaaaaact tgattagggt gatggttcac gtagtgggcc atcgccctga   1620
tagacggttt ttcgcccttt gacgttggag tccacgttct ttaatagtgg actcttgttc   1680
caaactggaa caacactcaa ccctatctcg gtctattctt ttgatttata agggattttg   1740
ccgatttcgg cctattggtt aaaaaatgag ctgatttaac aaaaatttaa cgcgaatttt   1800
aacaaaatat taacgtttac aatttaaata tttgcttata caatcttcct gttttggggg   1860
cttttctgat tatcaaccgg ggtacatatg attgacatgc tagttttacg attaccgttc   1920
atcgattctc ttgtttgctc cagactctca ggcaatgacc tgatagcctt tgtagagacc   1980
```

```
tctcaaaaat agctaccctc tccggcatga atttatcagc tagaacggtt gaatatcata   2040
ttgatggtga tttgactgtc tccggccttt ctcacccgtt tgaatcttta cctacacatt   2100
actcaggcat tgcatttaaa atatatgagg gttctaaaaa tttttatcct tgcgttgaaa   2160
taaaggcttc tcccgcaaaa gtattacagg gtcataatgt ttttggtaca accgatttag   2220
ctttatgctc tgaggcttta ttgcttaatt ttgctaattc tttgccttgc ctgtatgatt   2280
tattggatgt tggaattcct gatgcggtat tttctcctta cgcatctgtg cggtatttca   2340
caccgcatat ggtgcactct cagtacaatc tgctctgatg ccgcatagtt aagccagccc   2400
cgacacccgc caacacccgc tgacgcgccc tgacgggctt gtctgctccc ggcatccgct   2460
tacagacaag ctgtgaccgt ctccgggagc tgcatgtgtc agaggttttc accgtcatca   2520
ccgaaacgcg cgagacgaaa gggcctcgtg atacgcctat ttttataggt taatgtcatg   2580
ataataatgg tttcttagac gtcaggtggc acttttcggg gaaatgtgcg cggaacccct   2640
atttgtttat ttttctaaat acattcaaat atgtatccgc tcatgagaca ataaccctga   2700
taaatgcttc aataatattg aaaaaggaag agtatgagta ttcaacattt ccgtgtcgcc   2760
cttattcctt ttttgcggc attttgcctt cctgttttg ctcacccaga aacgctggtg   2820
aaagtaaaag atgctgaaga tcagttgggg gcacgagtgg gttacatcga actggatctc   2880
aacagcggta agatccttga gagttttcgc cccgaagaac gttttccaat gatgagcact   2940
tttaaagttc tgctatgtgg cgcggtatta tcccgtattg acgccgggca agagcaactc   3000
ggtcgccgca tacactattc tcagaatgac ttggttgagt actcaccagt cacagaaaag   3060
catcttacgg atggcatgac agtaagagaa ttatgcagtg ctgccataac catgagtgat   3120
aacactgcgg ccaacttact tctgacaacg atcggaggac cgaaggagct aaccgctttt   3180
ttgcacaaca tgggggatca tgtaactcgc cttgatcgtt gggaaccgga gctgaatgaa   3240
gccataccaa acgacgagcg tgacaccacg atgcctgtag caatggcaac aacgttgcgc   3300
aaactattaa ctggcgaact acttactcta gcttcccggc aacaattaat agactggatg   3360
gaggcggata aagttgcagg accacttctg cgctcggccc ttccggctgg ctggtttatt   3420
gctgataaat ctggagccgg tgagcgtggg tctcgcggta tcattgcagc actggggcca   3480
gatggtaagc cctcccgtat cgtagttatc tacacgacgg ggagtcaggc aactatggat   3540
gaacgaaata gacagatcgc tgagataggt gcctcactga ttaagcattg gtaactgtca   3600
gaccaagttt actcatatat actttagatt gatttaaaac ttcattttta atttaaaagg   3660
atctaggtga agatcctttt tgataatctc atgaccaaaa tcccttaacg tgagttttcg   3720
ttccactgag cgtcagaccc cgtagaaaag atcaaaggat cttcttgaga tccttttttg   3780
ctgcgcgtaa tctgctgctt gcaaacaaaa aaaccaccgc taccagcggt ggtttgtttg   3840
ccggatcaag agctaccaac tctttttccg aaggtaactg gcttcagcag agcgcagata   3900
ccaaatactg tccttctagt gtagccgtag ttaggccacc acttcaagaa ctctgtagca   3960
ccgcctacat acctcgctct gctaatcctg ttaccagtgg ctgctgccag tggcgataag   4020
tcgtgtctta ccgggttgga ctcaagacga tagttaccgg ataaggcgca gcggtcgggc   4080
tgaacggggg gttcgtgcac acagcccagc ttggagcgaa cgacctacac cgaactgaga   4140
tacctacagc gtgagctatg agaaagcgcc acgcttcccg aagggagaaa ggcggacagg   4200
tatccggtaa gcggcagggt cggaacagga gagcgcacga gggagcttcc agggggaaac   4260
gcctggtatc tttatagtcc tgtcgggttt cgccacctct gacttgagcg tcgatttttg   4320
tgatgctcgt cagggggggcg gagcctatgg aaaaacgcca gcaacgcggc ctttttacgg   4380
ttcctggcct tttgctggcc ttttgctcac atgttctttc ctgcgttatc ccctgattct   4440
gtggataacc gtattaccgc ctttgagtga gctgataccg ctcgccgcag ccgaacgacc   4500
gagcgcagcg agtcagtgag cgaggaagcg gaagagcgcc caatacgcaa accgcctctc   4560
cccgcgcgtt ggccgattca ttaatgcagc agctgcgcgc tcgctcgctc actgaggccg   4620
cccgggcaaa gcccgggcgt cgggcgacct ttggtcgccc ggcctcagtg agcgagcgag   4680
cgcgcagaga gggagtggcc aactccatca ctaggggttc cttgtagtta atgattaacc   4740
cgcgcatgcta cttatctacg tagccatgct ctaggacatt gattattgac tagtggagtt   4800
ccgcgttaca taacttacgg taaatgcccc gcctggctga ccgcccaacg acccccgccc   4860
attgacgtca ataatgacgt atgttcccat agtaacgcca atagggactt tccattgacg   4920
tcaatggtgt gagtatttac ggtaaactgc ccacttggca gtacatcaag tgtatcatat   4980
gccaagtacg cccctattg acgtcaatga cggtaaatgg cccgcctggc attatgccca   5040
gtacatgacc ttatgggact ttcctacttg gcagtacatc tacgtattag tcatcgctat   5100
taccatggtc gaggtgagcc ccacgttctg cttcactctc cccatctccc cccctcccc   5160
acccccaatt ttgtatttat ttatttttta attattttgt gcagcgatgg gggcgggggg   5220
gggggggggc gcgcgccagg cggggcgggg cgggcgaggg ggcggagcg   5280
agaggtgcgg cggcagccaa tcagagcggc gcgctccgaa agtttccttt tatggcgagg   5340
cggcggcggc ggcggcccta aaaagcga agcgcgcggc gggcgggagt cgctgcgcgc   5400
tgccttcgcc ccgtgcccg ctccgccgcc gcctcgcgcc gcccgccccg gctctgactg   5460
accgcgttac taaaacaggt aagtccggcc tccgcgccgg gttttggcgc ctcccgcggg   5520
cgcccccctc ctcacggcga gcgctgccac gtcagacgaa gggcgcagcg agcgtcctga   5580
tccttccgcc cggacgctca ggacagcggc ccgctgctca taagactcgg ccttagaacc   5640
ccagtatcag cagaaggaca ttttaggacg ggacttgggt gactctaggg cactggtttt   5700
cttttccagag agcggaacag gcgaggaaaa gtagtccctt ctcggcgatt ctgcggaggg   5760
atctccgtgg ggcggtgaac gccgatgatg cctctactaa ccatgttcat gttttctttt   5820
tttttctaca ggtcctgggt gacgaacagg gtaccgccac cgccagaccc tgccgtgcat   5880
ttattttggt ggcggcctgc tgccgtttgg catgctgtgc gcgagcagca ccaccaaatg   5940
caccgtgagc catgaagtgg cggattcag ccatctgaaa ctgacccagg tgccggatga   6000
tctgccgacc aacattaccg tgctgaacct gaccctgaac cagctgcgcc gctgccggc   6060
ggcgaacttt acccgctata gccagctgac gtgggcttta acaccattag   6120
caaactggaa ccggaactgt gccagaaact gccgatgctg aaagtgctga acctgcagca   6180
taacgaactg agccagctga gcgataaaac ctttgcgttt gcaccaacc tgaccgaact   6240
gcatctgatg agcaacagca ttcagaaaat taaaaacaac ccgtttgtga acagaaaaa   6300
cctgattacc ctggatctga gccataacgg cctgagcagc accaaactgg gcacccaggt   6360
gagcctggaa aacctgcagg aactgctgct gagcaacaac aaaattcagg cgctgaaaag   6420
cgaagaactg gatatttttg cgaacagcag cctgaaaaaa ctggaactga gcagcaacca   6480
gattaaagaa tttagccccgg gctgctttca tgcgattggc cgcctgtttg gcctgtttct   6540
gaacaacgtg cagctgggcc cgagcctgac cgaaaaactg tgcctggaac tggcgaacac   6600
cagcattcgc aacctgagcc tgagcaacag ccagctgagc accaccagca accaccactt   6660
tctgggcctg aaatggacca acctgaccat gctggatctg agctataaca acctgaacgt   6720
```

```
ggtgggcaac gatagctttg cgtggctgcc gcagctggaa tatttttttc tggaatataa    6780
caacattcag catctgttta gccatagcct gcatggcctg tttaacgtgc gctatctgaa    6840
cctgaaacgc agctttacca aacagagcat tagcctggcg agcctgccga aaattgatga    6900
ttttagcttt cagtggctga aatgcctgga acatctgaac atggaagata cgatattcc    6960
gggcattaaa agcaacatgt ttaccggcct gattaacctg aaatatctga gcctgagcaa    7020
cagctttacc agcctgcgca ccctgaccaa cgaaacctt tgtgagcctgg cgcatagccc    7080
gctgcatatt ctgaacctga ccaaaaacaa aattagcaaa attgaaagcg atgcgtttag    7140
ctggctgggc catctggaag tgctggatct gggcctgaac gaaattggcc aggaactgac    7200
cggccaggaa tggcgcggcc tggaaaacat ttttgaaatt tatctgagct ataacaaata    7260
tctgcagctg acccgcaaca gctttgcgct ggtgccgagc ctgcagcgcc tgatgctgca    7320
ccgcgtggcg ctgaaaaacg tggatagcag cccgagcccg tttcagccgc tgcgcaacct    7380
gaccattctg gatctgagca caacaacat tgcgaacatt aacgatgata tgctggaagg    7440
cctggaaaaa ctggaaattc tggatctgca gcataacaac ctggcgcgcc tgtgaaaca    7500
tgcgaacccg ggcggcccga tttattttct gaaaggcctg agccatctgc atattctgaa    7560
cctgaaaagc aacggctttg atgaaattcc ggtggaagtg tttaaagatc tgtttgaact    7620
gaaaattatt gatctgggcc tgaacaacct gaacaccctg ccggcgagcg tgtttaacaa    7680
ccaggtgagc ctgaaaagcc tgaacctgca gaaaacctg attaccagcg tggaaaaaaa    7740
agtgtttggc ccggcgtttc gcaacctgac cgaactggat atgcgcttta acccgtttga    7800
ttgcacctgc gaaagcattg cgtggtttgt gaactggatt aacgaaaccc ataccaacat    7860
tccggaactg agcagccatt atctgtgcaa caccccgccg cattatcatg gctttccggt    7920
gcgcctgttt gataccagca gctgcaaaga tagcgcgccg tttgaactgt tttttatgat    7980
taacaccagc attctgctga ttttttatttt tattgtgctg ctgattcatt ttgaaggctg    8040
gcgcattagc ttttattgga acgtgagcgt gcatcgcgtg ctgggctta aagaaattga    8100
tcgccagacc gaacagtttg aatatgcggc gtatattatt catgcgtata agataaaga    8160
ttgggtgtgg gaacatttta gcagcatgga aaaagaagat cagagcctga atttttgcct    8220
ggaagaacgc gattttgaag cgggcgtgtt tgaactgtga acgattgtga acagcattaa    8280
acgcagccgc aaaattattt ttgtgattac ccatcatctg ctgaaagatc cgctgtgcaa    8340
acgctttaaa gtgcatcatg cggtgcagca ggcgattgaa cagaacctgg atagcattat    8400
tctggtgttt ctggaagaaa ttccggatta taaactgaac catgcgctgt gcctgcgccg    8460
cggcatgtttt aaaagccatt gcattctgaa ctggccggtg cagaaagaac gcattggcgc    8520
gtttcgccat aaactgcagg tggcgctggg cagcaaaaac agcgtgcatg ggcggatcag    8580
gcggatcacc caaatcttgt gacaaaactc acacatgccc accgtgccca gcacctgaac    8640
tcctgggggg accgtcagtc ttcctcttcc ccccaaaacc caaggacacc ctcatgatct    8700
cccggacccc tgaggtcaca tgcgtggtgg tggacgtgag ccacgaagac cctgaggtca    8760
agttcaactg gtacgtggac ggcgtggagg tgcataatgc caagacaaag ccgcgggagg    8820
agcagtacaa cagcacgtac cgtgtggtca gcgtcctcac cgtcctgcac caggactggc    8880
tgaatggcaa ggagtacaag tgcaaggtct ccaacaaagc cctcccagcc cccatcgaga    8940
aaaccatctc caaagccaaa gggcagcccc gagaaccaca ggtgtacacc ctgccccat    9000
cccgggagga gatgaccaag aaccaggtca gcctgacctg cctggtcaaa ggcttctatc    9060
ccagcgacat cgccgtggag tgggagagca atgggcagcc ggagaacaac tacaagacca    9120
cgcctcccgt gctggactcc gacggctcct tcttcctcta cagcaagctc accgtggaca    9180
agagcaggtg gcagcagggg aacgtcttct catgctccgt gatgcatgag gctctgcaca    9240
accactacac gcagaagagc ctctccctgt ctccgggtaa atag                     9284
```

```
SEQ ID NO: 9               moltype = DNA   length = 9738
FEATURE                    Location/Qualifiers
source                     1..9738
                           mol_type = other DNA
                           organism = synthetic construct
SEQUENCE: 9
ttctagaata atcaacctct ggattacaaa atttgtgaaa gattgactgg tattcttaac      60
tatgttgctc cttttacgct atgtggatac gctgctttaa tgcctttgta tcatgctatt    120
gcttcccgta tggctttcat tttctcctcc ttgtataaat cctggttgct gtctctttat    180
gaggagttgt ggcccgttgt caggcaacgt ggcgtggtgt gcactgtgtt tgctgacgca    240
accccactg gttgggcat tgccaccacc tgtcagctcc tttccgggac tttcgctttc    300
cccctcccta ttgccacggc ggaactcatc gccgcctgcc ttgcccgctg ctggacaggg    360
gctcggctgt tgggcactga caattccgtg gtgttgtcgg ggaaatcatc gtcctttcct    420
tggctgctcg cctgtgttgc cacctggatt ctgcgcggga cgtccttctg ctacgtccct    480
tcggccctca atccagcgga ccttccttcc cgcggcctgc tgccgctct gcggcctctt    540
ccgcgtcttc gccttcgccc tcagacgagt cggatctccc tttgggccgc ctccccgcct    600
aagcttatcg ataccgtcga gatcaacttc gttattgca gcttataatg gttacaaata    660
aagcaatagc atcacaaatt tcacaaataa agcatttttt tcactgcatt ctagttgtgg    720
tttgtccaaa ctcatcaatg tatcttatca tgtctggatc tcgacctcga ctagagcatg    780
gctacgtaga taagtagcat ggcgggttaa tcattaacta caaggaaccc ctagtgatgg    840
agttggccac tccctctctg cgcgctcgct cgctcactga ggccgggcga ccaaaggtcg    900
cccgacgccc gggctttgcc cggcggcct cagtgagcga gcgagcgcgc cagctggcgt    960
aatagcgaag aggcccgcac cgatcgccct tcccaacagt tgcgcagcct gaatggcgaa   1020
tggaattcca gacgattgag cgtcaaaatg taggtatttc catgagcgtt tttcctgttg   1080
caatgctgg tgtaatatt gttctgcgata ttaccagcaa ggccgatagt ttgagttctt   1140
ctactcaggc aagtgatgtt attactaatc aaagaagtat tgcgacaacg gttaatttgc   1200
gtgatggaca gactctttta ctcggtggcc tcactgatta aaaaacact tctcaggatt   1260
ctggcgtacc gttcctgtct aaaatccctt taatcggcct cctgtttagc tcccgctctg   1320
attctaacga ggaaagcacg ttatacgtgc tcgtcaaagc aaccatagta cgcgcccgtg   1380
agcggcgcat taagcgcggc gggtgtggtg gttacgcgca gcgtgaccgc tacacttgcc   1440
agcgccctag cgcccgctcc tttcgctttc ttcccttcct ttctcgccac gttcgccggc   1500
tttccccgtc aagctctaaa tcggggggtc ccttagggt tccgatttag tgctttacgg   1560
cacctcgacc ccaaaaaact tgattagggt gatggttcac gtagtgggcc atcgccctga   1620
tagacggttt ttcgcccttt gacgttggag tccacgttct ttaatagtgg actcttgttc   1680
caaactggaa caacactcaa ccctatctcg gtctattctt ttgatttata agggattttg   1740
```

```
ccgatttcgg cctattggtt aaaaaatgag ctgatttaac aaaaatttaa cgcgaatttt   1800
aacaaaatat taacgtttac aatttaaata tttgcttata caatcttcct gttttttgggg  1860
cttttctgat tatcaaccgg ggtacatatg attgacatgc tagttttacg attaccgttc  1920
atcgattctc ttgtttgctc cagactctca ggcaatgacc tgatagcctt tgtagagacc  1980
tctcaaaaat agctaccctc tccggcatga atttatcagc tagaacggtt gaatatcata  2040
ttgatggtga tttgactgtc tccggccttt ctcaccgtt tgaatcttta cctacacatt   2100
actcaggcat tgcatttaaa atatatgagg gttctaaaaa tttttatcct tgcgttgaaa  2160
taaaggcttc tcccgcaaaa gtattacagg gtcataatgt ttttggtaca accgatttag  2220
ctttatgctc tgaggcttta ttgcttaatt ttgctaattc tttgccttgc ctgtatgatt  2280
tattggatgt tggaattcct gatgcggtat tttctcctta cgcatctgtg cggtatttca  2340
caccgcatat ggtgcactct cagtacaatc tgctctgatg ccgcatagtt aagccagccc  2400
cgacacccgc caacacccgc tgacgcgccc tgacgggctt gtctgctccc ggcatccgct  2460
tacagacaag ctgtgaccgt ctccgggagc tgcatgtgtc agaggtttc accgtcatca   2520
ccgaaacgcg cgagacgaaa gggcctcgtg atacgcctat ttttataggt taatgtcatg  2580
ataataatgg tttcttagac gtcaggtggc acttttcggg gaaatgtgcg cggaacccct  2640
atttgtttat ttttctaaat acattcaaat atgtatccgc tcatgagaca ataaccctga  2700
taaatgcttc aataatattg aaaaaggaag agtatgagta ttcaacattt ccgtgtcgcc  2760
cttattccct ttttttgcggc attttgcctt cctgtttttg ctcacccaga aacgctggtg  2820
aaagtaaaag atgctgaaga tcagttgggt gcacgagtgg gttacatcga actggatctc  2880
aacagcggta agatccttga gagttttcgc cccgaagaac gttttccaat gatgagcact  2940
tttaaagttc tgctatgtgg cgcggtatta tcccgtattg acgccgggca agagcaactc  3000
ggtcgccgca tacactattc tcagaatgac ttggttgagt actcaccagt cacagaaaag  3060
catcttacgg atggcatgac agtaagagaa ttatgcagtg ctgccataac catgagtgat  3120
aacactgcgg ccaacttact tctgacaacg atcggaggac cgaaggagct aaccgctttt  3180
ttgcacaaca tgggggatca tgtaactcgc cttgatcgtt gggaaccgga gctgaatgaa  3240
gccataccaa acgacgagcg tgacaccacg atgcctgtag caatggcaac aacgttgcgc  3300
aaactattaa ctggcgaact acttactcta gcttcccggc aacaattaat agactggatg  3360
gaggcggata aagttgcagg accacttctg cgctcggccc ttccggctgg ctggtttatt  3420
gctgataaat ctggagccgg tgagcgtggg tctcgcggta tcattgcagc actggggcca  3480
gatggtaagc cctcccgtat cgtagttatc tacacgacgg ggagtcaggc aactatggat  3540
gaacgaaata gacagatcgc tgagataggt gcctcactga ttaagcattg gtaactgtca  3600
gaccaagttt actcatatat actttagatt gatttaaaac ttcattttta atttaaaagg  3660
atctaggtga agatcctttt tgataatctc atgaccaaaa tcccttaacg tgagttttcg  3720
ttccactgag cgtcagaccc cgtagaaaag atcaaaggat cttcttgaga tcctttttt   3780
ctgcgcgtaa tctgctgctt gcaaacaaaa aaaccaccgc taccagcggt ggtttgtttg  3840
ccggatcaag agctaccaac tctttttccg aaggtaactg gcttcagcag agcgcagata  3900
ccaaatactg tccttctagt gtagccgtag ttaggccacc acttcaagaa ctctgtagca  3960
ccgcctacat acctcgctct gctaatcctg ttaccagtgg ctgctgccag tggcgataag  4020
tcgtgtctta ccgggttgga ctcaagacga tagttaccgg ataaggcgca gcggtcgggc  4080
tgaacggggg gttcgtgcac acagcccagc ttggagcgaa cgacctacac cgaactgaga  4140
tacctacagc gtgagctatg agaaagcgcc acgcttcccg aagggagaaa ggcggacagg  4200
tatccggtaa gcggcagggt cggaacagga gagcgcacga gggagcttcc agggggaaac  4260
gcctggtatc tttatagtcc tgtcgggttt cgccacctct gacttgagcg tcgatttttt  4320
tgatgctcgt caggggggcg gagcctatgg aaaaacgcca gcaacgcggc ctttttacgg  4380
ttcctggcct tttgctggcc ttttgctcac atgttctttc ctgcgttatc ccctgattct  4440
gtggataacc gtattaccgc ctttgagtga gctgataccg ctcgccgcag ccgaacgacc  4500
gagcgcagcg agtcagtgag cgaggaagcg gaagagcgcc caatacgcaa accgcctctc  4560
cccgcgcgtt ggccgattca ttaatgcagc agctcgcgcg tcgctcgctc actgaggccg  4620
cccgggcaaa gcccgggcgt cgggcgacct ttggtcgccc ggcctcagtg agcgagcgag  4680
cgcgcagaga gggagtggcc aactccatca ctaggggttc cttgtagtta atgattaacc  4740
cgcgcttaca ctttatctag aagcatgct ctaggacatt gattattgac tagtggagtt    4800
ccgcgttaca taacttacgg taaatggccc gcctggctga ccgcccaacg acccccgccc  4860
attgacgtca ataatgacgt atgttcccat agtaacgcca atagggactt ccattgacg   4920
tcaatgggtg gagtatttac ggtaaactgc ccacttggca gtacatcaag tgtatcatat  4980
gccaagtacg cccccctattg acgtcaatga cggtaaatgg cccgcctggc attatgccca  5040
gtacatgacc ttatgggact ttcctacttg gcagtacatc tacgtattag tcatcgctat  5100
taccatggtc gaggtgagcc cacgttctgc ttcactctcc ccatctccc ccccctcccc   5160
accccccaatt ttgtatttat ttatttttta attattttgt gcagcgatgg gggcggggggg 5220
gggggggggc gcgcgccagg cggggcgggg cgggcgagg ggcggggcgg ggcgaggcgg   5280
agaggtgcgg cggcagccaa tcagacgggc gcgtccgaa agtttccttt tatggcgagg   5340
cggcggcggc ggcggcccta taaaagcga agcgcgcggc gggcgggagt cgctgcgcgc  5400
tgccttcgcc ccgtgcccgc tccgccgcc gcctcgcgcc gcccgcccg gctctgactg     5460
accgcgttac taaaacaggt aagtccggcc tccgcgccgg gttttggcgc ctcccgcggg  5520
cgccccctc ctcacggcga gcgctgccac gtcagacgaa gggcgcagcg agcgtcctga    5580
tccttccgcc cggacgctca ggacagcggc ccgctgctca taagactcgg ccttagaacc  5640
ccagtatcag cagaaggaca ttttaggacg ggacttgggt gactctaggg cactggtttt  5700
ctttccagag agcggaacag gcgaggaaaa gtagtccctt ctcggcgatt ctgcggaggg  5760
atctccgtgg ggcggtgaac gccgatgatg cctctactaa ccatgttcat gttttctttt  5820
tttttctaca ggtcctgggt gacgaacagg gtaccgccac catgaggggc atgaagctgc  5880
tgggggcgct gctggcactg gcggccctac tgcagggggc cgtgtccatg ggcttttgcc  5940
gcagcgcgct gcatccgctg agcctgctgg tgcaggcgat tatgctggcg atgacctgg   6000
cgctgggcac cctgccggcg tttctgccgt gcgaactgca gccgcatggc ctggtgaact  6060
gcaactggct gtttctgaaa agcgtgccgc atttagcat ggcggcgccg cgcggcaacg    6120
tgaccagcgc gagcgaggcg agcaaccgca ttcatcatct ccatgatagc gattttgcgt  6180
atctgccgag cctgcgccat ctgaacctga atggaactg cccgccgtg ggcctgagcc    6240
cgatgccttt tccgtgccat atgaccattg aaccgagcac ctttctggcg gtgccgaccc  6300
tggaagaact gaacctgagc tataacaaca ttatgaccgt gccggcgctg ccgaaaagcc  6360
tgattagcct gagcctgagc cataccaaca ttctgatgct ggatagcgcg agcctggcgg  6420
gcctgcatgc gctgcgcttt ctgtttatgg atggcaactg ctattataaa aacccgtgcc  6480
```

```
gccaggcgct ggaagtggcg ccgggcgcgc tgctgggcct gggcaacctg acccatctga    6540
gcctgaaata taacaacctg accgtggtgc cgcgcaacct gccgagcagc ctggaatatc    6600
tgctgctgag ctataaccgc attgtgaaac tggcgccgga agatctggcg aacctgaccg    6660
cgctgcgcgt gctggatgtg ggcggcaact gccgccgctg cgatcatgcg ccgaacccgt    6720
gcatgcaaatg cccgcgccat tttccgcagc tgcatccgga tacctttagc catctgagcc    6780
gcctggaagg cctggtgctg aaagatagca gcctgagctg gctgaacgcg agctggtttc    6840
gcggcctggg caacctgcgc gtgctggatc tgagcgaaaa ctttctgtat aaatgcatta    6900
ccaaaaccaa agcgtttcag ggcctgaccc agctgcgcaa actgaacctg agctttaact    6960
atcagaaacg cgtgagcttt gcgcatctga gcctggcgcg gagctttggc agcctggtgg    7020
cgctgaaaga actggatatg catggcattt ttttcgcag cctggatgaa accaccctgc    7080
gcccgctggc gcgcctgccg atgctgcaga ccctgcgcct gcagatgaac tttattaacc    7140
aggcgcagct gggcattttt cgcgcgtttc cgggcctgcg ctatgtggat ctgagcgata    7200
accgcattag cggcgcgagc gaactgaccg cgaccatggg cgaagcggat ggcggcgaaa    7260
aagtgtggct gcagccgggc gatctggcgc cggcgccggt ggatacccg agcagcgaag    7320
attttcgccc gaactgcagc accctgaact ttaccctgga tctgagccgc aacaacctgg    7380
tgaccgtgca gccggaaatg tttgcgcagc tgagccatct gcagtgcctg cgcctgagcc    7440
ataactgcat tagccaggcg gtgaacggca gccagtttct gccgctgacc ggcctgcagg    7500
tgctgatct gagccataac aaactggatc tgtatcatga acatagcttt accgaactgc    7560
gcgcctgga agcgctggat ctgagctata acaccagcc gtttggcatg cagggcgtgg    7620
gccataactt tagctttgtg gcgcatctgc gcacccctgcg ccatctgagc ctggcgcata    7680
acaacattca tagccaggtg agccagcagc tgtgcagcac cagcctgcgc gcgctggatt    7740
ttagcggcaa cgcgctgggc catatgtggg cggaaggcga tctgtatctg catttttttc    7800
agggcctgag cggcctgatt tgctgtgatc tgagccagaa ccgcctgcat accctgctgc    7860
cgcagaccct gcgcaacctg ccgaaaagcc tgcaggtgct gcgcctgcgc gataactatc    7920
tggcgttttt taaatggtgg agcctgcatt ttctgccgaa actggaagtg ctggatctgg    7980
cgggcaacca gctgaaaacg ctgaccaacg gcagcctgcc ggcggcacc cgtggcctgc    8040
gcctggatgt gagctgcaac agcattagct ttgtggcgcc gggcttttt agcaaagcga    8100
aagaactgcg cgaactgaac ctgagcgcga acgcctgaa aaccgtggat catagctggt    8160
ttggcccgct ggcgagcgcg ctgcagattc tggatgtgag cgcgaacccg ctgcattgcg    8220
cgtgcggcgc ggcgtttatg gattttctgc tggaagtgcc gggcgcggtg cgggcctgc    8280
cgagccgcgt gaaatgcggc agccccggcc agctgcaggg cctgagcatt tttgcgcagg    8340
atctgcgcct gtgcctggat gaagcgctga gctgggattg ctttgcgctg agcctgctgg    8400
cggtggcgct gggcctgggc gtgccgatgc tgcatcatct gtgcggctgg gatctgtggt    8460
attgctttca tctgtgcctg gcgtgatgc cgtggcgcgg ccgccagagc ggccgcgatg    8520
aagatgcgct gccgtatgat gcgtttgtgg tgtttgataa aacccagagc cggttggcgg    8580
attgggtgta taacgaactg cgcggccagc tggaagaatg ccgcggccgc tgggcgctgc    8640
gcctgtgcct ggaagaacgc gattggctgc cgggcaaaac cctgtttgaa aacctgtggg    8700
cgagcgtgta tggcagccgc aaaaccctgt ttgtgctggc gcataccgat cgcgtgagcg    8760
gcctgctgcg cgcgagcttt ctgctggcgc agcaagctgt gctggaagat cgcaaagatg    8820
tggtggtgct ggtgattctg agcccggatg gccgccgcag ccgctatgtg cgcctgcgcc    8880
agcgcctgtg ccgccagagc gtgctgctgt ggccgcatca gccgagcggc cagcgcagct    8940
tttgggcgca gctgggcatg gcgctgaccc gcgataacca tcatttttat aaccgcaact    9000
tttgccaggg cccgaccgcg gaagggcgga tcaggcggat cacccaaatc ttgtgacaaa    9060
actcacacat gcccaccgtg cccagcacct gaactcctgg ggggaccgtc agtcttcctc    9120
ttccccccaa aacccaagga caccctcatg atctccggga ccctgaggt cacatgcgtg    9180
gtggtggacg tgagccacga agaccctgag gtcaagttca actggtacgt ggacggcgtg    9240
gaggtgcata atgccaagac aaagccgcgg gaggagcagt acaacagcac gtaccgtgtg    9300
gtcagcgtcc tcaccgtcct gcaccaggac tggctgaatg gcaaggagta caagtgcaag    9360
gtctccaaca agcccctccc agcccccatc gagaaaacca tctccaaagc caagggcag    9420
ccccgagaac cacaggtgta caccctgccc ccatcccggg aggagatgac caagaaccag    9480
gtcagcctga cctgcctggt caaaggcttc tatcccagcg acatcgccgt ggagtgggag    9540
agcaatgggc agccggagaa caactacaag accacgcctc ccgtgctgga ctccgacggc    9600
tccttcttcc tctacagcaa gctcaccgtg gacaagagca ggtggcagca ggggaacgtc    9660
ttctcatgct ccgtgatgca tgaggctctg cacaaccact acacgcagaa gagcctctcc    9720
ctgtctccgg gtaaatag                                                 9738
```

SEQ ID NO: 10        moltype = DNA  length = 7364
FEATURE               Location/Qualifiers
source                1..7364
                       mol_type = other DNA
                       organism = synthetic construct
SEQUENCE: 10

```
ttctagaata tcaacctct ggattacaaa atttgtgaaa gattgactgg tattcttaac     60
tatgttgctc cttttacgct atgtggatac gctgctttaa tgcctttgta tcatgctatt    120
gcttcccgta tggctttcat tttctcctcc ttgtataaat cctggttgct gtctctttat    180
gaggagttgt ggcccgttgt caggcaacgt ggcgtggtgt gcactgtgtt tgctgacgca    240
accccactg gttggggcat tgccaccacc tgtcagctcc tttccgggac tttcgctttc    300
cccctcccta ttgccacggc ggaactcatc gccgcctgcc ttgccgtc tggacaggg    360
gctcggctgt tgggcactga caattccgtg gtgttgtcgg ggaaatcatc gtcctttcct    420
ggcctgctcg cctgtgttgc cacctggatt ctgcgcggga cgtccttctg ctacgtccct    480
tcggccctca atccagcgga ccttccttcc cgcggcctgc tgccggctct gcggcctctt    540
ccgcgtcttc gccttcgccc tcagacgagt cggatctccc tttgggccgc ctccccgcct    600
aagcttatcg ataccgtcga gatcaactt gtttattgca gcttataatg gttacaaata    660
aagcaatagc atcacaaatt tcacaaataa agcattttt tcactgcatt ctagttgtgg    720
tttgtccaaa ctcatcaatg tatcttatca tgtctggatc tcgacctcga ctagagcatg    780
gctacgtaga taagtagcat ggcgggttaa tcattaacta caaggaaccc ctagtgatgg    840
agttggccac tccctctctg cgcgctcgct cgctcactga ggccgggcga ccaaaggtcg    900
cccgacgccc gggctttgcc cgggcggcct cagtgagcga gcgagcgcgc cagctggcgt    960
aatagcgaag aggcccgcac cgatcgccct tcccaacagt tgcgcagcct gaatggcgaa   1020
```

-continued

```
tggaattcca gacgattgag cgtcaaaatg taggtatttc catgagcgtt tttcctgttg   1080
caatggctgg cggtaatatt gttctggata ttaccagcaa ggccgatagt ttgagttctt   1140
ctactcaggc aagtgatgtt attactaatc aaagaagtat tgcgacaacg gttaatttgc   1200
gtgatggaca gactctttta ctcggtggcc tcactgatta taaaaacact tctcaggatt   1260
ctggcgtacc gttcctgtct aaaatcccct taatcggcct cctgtttagc tcccgctctg   1320
attctaacga ggaaagcacg ttatacgtgc tcgtcaaagc aaccatagta cgcgccctgt   1380
agcggcgcat taagcgcggc gggtgtggtg gttacgcgca gcgtgaccgc tacacttgcc   1440
agcgccctag cgcccgctcc tttcgctttc ttcccttcct ttctcgccac gttcgccggc   1500
tttccccgtc aagctctaaa tcggggggctc cctttagggt tccgatttag tgctttacgg   1560
cacctcgacc ccaaaaaact tgattagggt gatggttcac gtagtgggcc atcgccctga   1620
tagacggttt ttcgcccttt gacgttggag tccacgttct taatagtgg actcttgttc   1680
caaactggaa caacactcaa ccctatctcg gtcattctt ttgatttata agggattttg   1740
ccgatttcgg cctattggtt aaaaaatgag ctgatttaac aaaaatttaa cgcgaatttt   1800
aacaaaatat taacgtttac aatttaaata tttgcttata caatcttcct gtttttgggg   1860
cttttctgat tatcaaccgg ggtacatatg attgacatgc tagttttacg attaccgttc   1920
atcgattctc ttgtttgctc cagactctca ggcaatgacc tgatagcctt tgtagagacc   1980
tctcaaaaat agctaccctc tccggcatga atttatcagc tagaacggtt gaatatcata   2040
ttgatggtga tttgactgtc tccggccttt ctcacccgtt tgaatcttta cctacacatt   2100
actcaggcat tgcatttaaa atatatgagg gttctaaaaa ttttttatcct tgcgttgaaa   2160
taaaggcttc tcccgcaaaa gtattacagg gtcataatgt ttttggtaca accgatttag   2220
ctttatgctc tgaggcttta ttgcttaatt ttgctaattc tttgccttgc ctgtatgatt   2280
tattggatgt tggaattcct gatgcggtat tttctccttca cgcatctgtg cggtatttca   2340
caccgcatat ggtgcactct cagtacaatc tgctctgatg ccgcatagtt aagccagccc   2400
cgacaccgc caacaccgc tgacgcgccc tgacgggctt gtctgctccc ggcatccgct   2460
tacagacaag ctgtgaccgt ctccgggagc tgcatgtgtc agaggttttc accgtcatca   2520
ccgaaacgcg cgagacgaaa gggcctcgtg atacgcctat ttttataggt taatgtcatg   2580
ataataatgg tttcttagac gtcaggtggc acttttcggg gaaatgtgcg cggaaccct   2640
atttgtttat ttttctaaat acattcaaat atgtatccgc tcatgagaca ataaccctga   2700
taaatgcttc aataatattg aaaaaggaag agtatgagta ttcaacattt ccgtgtcgcc   2760
cttattccct tttttgcggc attttgcctt cctgtttttg ctcacccaga aacgctggtg   2820
aaagtaaaag atgctgaaga tcagttgggt gcacgagtgg gttacatcga actggatctc   2880
aacagcggta agatcttga gagttttcgc cccgaagaac gttttccaat gatgagcact   2940
tttaaagttc tgctatgtgg cgcggtatta cccgtattg acgccgggca agagcaactc   3000
ggtcgccgca tacactattc tcagaatgac ttggttgagt actcaccagt cacagaaaag   3060
catcttacgg atggcatgac agtaagagaa ttatgcagtg ctgccataac catgagtgat   3120
aacactgcgg ccaacttact tctgacaacg atcggaggac cgaaggagct aaccgctttt   3180
ttgcacaaca tgggggatca tgtaactcgc cttgatcgtt gggaaccgga gctgaatgaa   3240
gccataccaa acgacgagcg tgacaccacg atgcctgtag caatggcaac aacgttgcgc   3300
aaactattaa ctggcgaact acttactcta gcttcccggc aacaattaat agactggatg   3360
gaggcggata aagttgcagg accacttctg cgctcggccc ttccggctgg ctggtttatt   3420
gctgataaat ctggagccgg tgagcgtggg tctcgcggta tcattgcagc actggggcca   3480
gatggtaagc cctcccgtat cgtagttatc tacacgacgg ggagtcaggc aactatggat   3540
gaacgaaata gacagatcgc tgagataggt gcctcactga ttaagcattg gtaactgtca   3600
gaccaagttt actcatatat actttagatt gatttaaaac ttcatttttta atttaaaagg   3660
atctaggtga agatccttttt tgataatctc atgaccaaaa tcccttaacg tgagttttcg   3720
ttccactgag cgtcagaccc cgtagaaaag atcaaaggat cttcttgaga tccttttttt   3780
ctgcgtaa tctgctgctt gcaaacaaaa aaaccaccgc taccagcggt ggtttgtttg   3840
ccggatcaag agctaccaac tctttttccg aaggtaactg gcttcagcag agcgcagata   3900
ccaaatactg tccttctagt gtagccgtag ttaggccacc acttcaagaa ctctgtagca   3960
ccgcctacat acctcgctct gctaatcctg ttaccagtgg ctgctgccag tggcgataag   4020
tcgtgtctta ccgggttgga ctcaagacga tagttaccgg ataaggcgca gcggtcgggc   4080
tgaacggggg gttcgtgcac acagcccagc ttggagcgaa cgacctacac cgaactgaga   4140
tacctacagc gtgagctatg agaaagcgcc acgcttcccg aagggagaaa ggcggacagg   4200
tatccggtaa gcggcagggt cggaacagga gagcgcacga gggagcttcc agggggaaac   4260
gcctggtatc tttatagtcc tgtcgggttt cgccacctct gacttgagcg tcgatttttg   4320
tgatgctcgt cagggggggcg gagcctatgg aaaaacgcca gcaacgcggc ctttttacgg   4380
ttcctggcct tttgctggcc ttttgctcac atgttctttc ctgcgttatc ccctgattct   4440
gtggataacc gtattaccgc ctttgagtga gctgataccg ctcgccgcag ccgaacgacc   4500
gagcgcagcg agtcagtgag cgaggaagcg gaagagcgcc caatacgcaa accgcctctc   4560
cccgcgcgtt ggccgattca ttaatgcagc agctgcgcgc tcgctcgctc actgaggccg   4620
cccgggcaaa gcccgggcgt cgggcgacct tggtcgcccg gcctcagtg agcgagcgag   4680
cgcgcagaga gggagtggcc aactccatca ctagggggtttc cttgtagtta atgattaacc   4740
cgccatgcta cttatctacg tagccatgct ctaggacatt gattattgac tagtggagtt   4800
ccgcgttaca taacttacgg taaatggccc gcctggctga ccgcccaacg acccccgccc   4860
attgacgtca ataatgacgt atgttcccat agtaacgcca atagggactt tccattgacg   4920
tcaatgggtg gagtatttac ggtaaactgc ccacttggca gtacatcaag tgtatcatat   4980
gccaagtacg ccccctattg acgtcaatga cggtaaatgg cccgcctggc attatgccca   5040
gtacatgacc ttatgggact ttcctacttg gcagtacatc tacgtattag tcatcgctat   5100
taccatggtc gaggtgagcc cacgttctg cttcactctc cccatctccc cccctccccc   5160
accccaatt tgtatttat ttattttta attatttttgt gcagcgatgg gggcggggg   5220
ggggggggc gcgcgccagg cggggcgggg cggggcgagg ggcggggcgg ggcgaggcgg   5280
agaggtgcgc cggcagccaa tcagagcggc gcgctccgaa agtttccttt tatggcgagg   5340
cggcggcggc ggcggcccta taaaaagcga agcgcgcggc gggcgggagt cgctgcgcgc   5400
tgccttgccc cgtgccccg ctccgccgcc gcctcgcgcc gcctcgctgc gcctctgactg   5460
accgcgttac taaaacaggt aagtccggcc tccgcgccgg gttttggcgc ctcccgcggg   5520
cgcccccctc ctcacggcga gcgctgccac gtcagacgaa gggcgcagcg agcgtcctga   5580
tccttccgcc cggacgctca ggacagcggc ccgctgctca taagactcgg ccttagaacc   5640
ccagtatcag cagaaggaca ttttaggacg ggacttgggt gactctaggg cactggtttt   5700
cttttccagag agcggaacag gcgaggaaaa gtagtcccctt ctcggcgatt ctgcggaggg   5760
```

```
atctccgtgg ggcggtgaac gccgatgatg cctctactaa ccatgttcat gttttcttttt  5820
tttttctaca ggtcctgggt gacgaacagg gtaccgccac catgaggggc atgaagctgc   5880
tgggggcgct gctggcactg gcggccctac tgcagggggc cgtgtccatg agcatgctgt   5940
tttatacect gattaccgcg tttctgattg gcattcaggc ggaaccgcat agcgaaagca   6000
acgtgccggc gggccatacc attccgcagg cgcattcgac caaactgaca catagcctgg   6060
ataccgcgct gcgccgcgcg cgcagcgcgc cggcggcggc gattgcggcg cgcgtggcgg   6120
gccagacccg caacattacc gtggatccgc gcctgtttaa aaaacgccgc ctgcgcagcc   6180
cgcgcgtgct gtttagcacc cagccgccgc gcgaagcggc ggatacccag gatctggatt   6240
ttgaagtggg cggcgcggcg ccgtttaacc gcacccatcg cagcaaacgc agcagcagcc   6300
atccgatttt tcatcggcgg gaatttagcg tgtgcgatag cgtgagcgtg tgggtgggcg   6360
ataaaaccac cgccgaccgat attaaaggca agaagtgat ggtgctgggc gaagtgaaca   6420
ttaacaacag cgtgtttaaa cagtattttt ttgaaaccaa atgccgcgat ccgaacccgg   6480
tggatagcgg ctgccgcggc attgatagca acattggaa cagctattgc accaccaccc   6540
atacctttgt gaaagcgctg accatggatg gcaaacaggc ggcgtggcgc tttattcgca   6600
ttgataccgc gtgcgtgtgc gtgctgagcc gcaaagcggt gcgccggcgc ggcggatcag   6660
gcggatcacc caaatcttgt gacaaaactc acacatgccc accgtgccca gcacctgaac   6720
tcctgggggg accgtcagtc ttcctcttcc ccccaaaacc caaggacacc ctcatgatct   6780
cccggacccc tgaggtcaca tgcgtggtgg tggacgtgag ccacgaagac cctgaggtca   6840
agttcaactg gtacgtggac ggcgtggagg tgcataatgc caagacaaag ccgcggggagg   6900
agcagtacaa cagcacgtac cgtgtggtca gcgtcctcac cgtcctgcac caggactggc   6960
tgaatggcaa ggagtacaag tgcaaggtct ccaacaaagc cctcccagcc cccatcgaga   7020
aaaccatctc caaagccaaa gggcagcccc gagaaccaca ggtgtacacc ctgccccat   7080
cccgggagga tgaccaag aaccaggtca gcctgacctg cctggtcaaa ggcttctatc   7140
ccagcgacat cgccgtggag tgggagagca atgggcagcc ggagaacaac tacaagacca   7200
cgcctcccgt gctggactcc gacggctcct tcttcctcta cagcaagctc accgtggaca   7260
agagcaggtg gcagcagggg aacgtcttct catgctccgt gatgcatgag gctctgcaca   7320
accactacac gcagaagagc ctctccctgt ctccgggtaa atag              7364
```

SEQ ID NO: 11         moltype = DNA  length = 6972
FEATURE            Location/Qualifiers
source             1..6972
                    mol_type = other DNA
                    organism = synthetic construct

SEQUENCE: 11

```
ttctagaata atcaacctct ggattacaaa atttgtgaaa gattgactgg tattcttaac   60
tatgttgctc cttttacgct atgtggatac gctgctttaa tgcctttgta tcatgctatt   120
gcttcccgta tggctttcat tttctcctcc ttgtataaat cctggttgct gtctctttat   180
gaggagttgt ggcccgttgt caggcaacgt ggcgtggtgt gcactgtgtt tgctgacgca   240
acccccactg gttgggcat tgccaccacc tgtcagctcc tttcgggac tttcgctttc   300
cccctcccta ttgccacggc ggaactcatc gccgcctgcc ttgcccgctg ctggacaggg   360
gctcggctgt tgggcactga caattccgtg gtgttgtcgg ggaaatcatc gtcctttcct   420
tggctgctcg cctgtgttgc cacctggatt ctgcgcggga cgtccttctg ctacgtccct   480
tcggccctca atccagcgga ccttccttcc cgcggcctgc tgccggctct gcggcctttc   540
ccgcgtcttc gccttcgccc tcagacgagt cggatctccc tttgggccgc ctccccgcct   600
aagcttatcg ataccgtcga gatcaacttg tttattgca gcttataatg gttacaaata   660
aagcaatagc atcacaaatt tcacaaataa agcatttttt tcactgcatt ctagttgtgg   720
tttgtccaaa ctcatcaatg tatcttatca tgtctggatc ctgacctga ctagagcatg   780
gctacgtaga taagtagcat ggcgggttaa tcattaacta caaggaaccc ctagtgatgg   840
agttggccac tccctctctg cgcgctcgct cgctcactga ggccgggcga ccaaaggtcg   900
cccgacgccc gggctttgcc cgggcggcct cagtgagcga gcgagcgcgc cagctggcgt   960
aatagcgaag aggcccgcac cgatcgccct cccaacagtt gcgcagcct gaatggcgaa   1020
tggaattcca gacgattgag cgtcaaaatg taggtatttc catgagcgtt tttcctgttg   1080
caatggctgg cggtaatatt gttctggata ttaccagcaa ggccgatagt ttgagttctt   1140
ctactcaggc aagtgatgtt attactaatc aaagaagtat tgcgacaacg gttaatttgc   1200
gtgatgaaca gactcttta ctcggtggcc tcactgatta taaaaacact tctcaggatt   1260
ctggcgtacc gttcctgtct aaaatccctt taatcggcct cctgtttagc tcccgctctg   1320
attctaacga ggaaagcacg ttatacgtgt cgtcaaagc aaccatagta cgcgccctgt   1380
agcggcgcat taagcgcggc gggtgtggtg gttacgcgca gcgtgaccgc tacacttgcc   1440
agcgccctag cgcccgctcc tttcgctttc ttcccttcct ttctcgccac gttcgccggc   1500
tttccccgtc aagctctaaa tcggggggctc cctttagggt tccgatttag tgctttacgg   1560
cacctcgacc ccaaaaaact tgattagggt gatggttcac gtagtgggcc atcgccctga   1620
tagacggttt ttcgcccttt gacgttggag tccacgttct ttaatagtgg actcttgttc   1680
caaactggaa caacactcaa ccctatctcg gtctattctt ttgatttata agggatttg    1740
ccgatttcgg cctattggtt aaaaaatgag ctgatttaac aaaaatttaa cgcgaattt    1800
aacaaaatat taacgtttac aatttaaata tttgcttata caatcttcct gtttttgggg   1860
cttttctgat tatcaaccgg ggtacatatg attgacatgc tagttttacg attaccgttc   1920
atcgattctc ttgtttgctc cagactctca ggcaatgacc tgatagcctt gtagagacc    1980
tctcaaaaat agctacctc tccggcatga atttatcagc taagacggtt gaatatcata   2040
ttgatggtga tttgactgtc tccggccttt ctcacccgtt tgaatcttta cctacacatt   2100
actcaggcat tgcatttaaa atatatgagg gttctaaaaa tttttatcct tgcgttgaaa   2160
taaaggcttc tcccgcaaaa gtattacagg gtcataatgt ttttggtaca accgatttag   2220
ctttatgctc tgaggcttta ttgcttaatt ttgctaattc tttgccttgc ctgtatgatt   2280
tattggatgt tggaattcct gatgcggtat ttcctcctta cgcatctgtg cggtatttca   2340
caccgcatat ggtgcactct cagtacaatc tgctctgatg ccgcatagtt aagccagccc   2400
cgacacccgc caacacccgc tgacgcgccc tgacgggctt gtctgctccc ggcatccgct   2460
tacagacaag ctgtgaccgt ctccgggagc tgcatgtgtc agaggttttc accgtcatca   2520
ccgaaacgcg cgagacgaaa gggcctcgtg atacgcctat ttttatagggt taatgtcatg   2580
ataataatgg tttcttagac gtcaggtggc acttttcggg gaaatgtgcg cggaacccct   2640
atttgtttat ttttctaaat acattcaaat atgtatccgc tcatgagaca ataaccctga   2700
```

```
taaatgcttc aataatattg aaaaaggaag agtatgagta ttcaacattt ccgtgtcgcc    2760
cttattccct tttttgcggc attttgcctt cctgttttg ctcacccaga acgctggtg     2820
aaagtaaaag atgctgaaga tcagttgggt gcacgagtgg gttacatcga actggatctc    2880
aacagcggta agatccttga gagttttcgc cccgaagaac gttttccaat gatgagcact    2940
tttaaagttc tgctatgtgg cgcggtatta tcccgtattg acgccgggca agagcaactc    3000
ggtcgccgca tacactattc tcagaatgac ttggttgagt actcaccagt cacagaaaag    3060
catcttacgg atggcatgac agtaagagaa ttatgcagtg ctgccataag catgagtgat    3120
aacactgcgg ccaacttact tctgacaacg atcggaggac cgaaggagct aaccgctttt    3180
ttgcacaaca tgggggatca tgtaactcgc cttgatcgtt gggaaccgga gctgaatgaa    3240
gccataccaa acgacgagcg tgacaccacg atgcctgtag caatggcaac aacgttgcgc    3300
aaactattaa ctggcgaact acttactcta gcttcccggc aacaattaat agactggatg    3360
gaggcggata aagttgcagg accacttctg cgctcggccc ttccggctgg ctggtttatt    3420
gctgataaat ctggagccgg tgagcgtggg tctcgcggta tcattgcagc actggggcca    3480
gatggtaagc cctcccgtat cgtagttatc tacacgacgg ggagtcaggc aactatggat    3540
gaacgaaata gacagatcgc tgagataggt gcctcactga ttaagcattg gtaactgtca    3600
gaccaagttt actcatatat actttagatt gatttaaaac ttcatttta atttaaaagg    3660
atctaggtga agatcctttt tgataatctc atgaccaaaa tcccttaacg tgagttttcg    3720
ttccactgag cgtcagaccc cgtagaaaag atcaaaggat cttcttgaga tcctttttt    3780
ctgcgcgtaa tctgctgctt gcaaacaaaa aaaccaccgc taccagcggt ggtttgtttg    3840
ccggatcaag agctaccaac tctttttccg aaggtaactg gcttcagcag agcgcagata    3900
ccaaatactg tccttctagt gtagccgtag ttaggccacc acttcaagaa ctctgtagca    3960
ccgcctacat acctcgctct gctaatcctg ttaccagtgg ctgctgccag tggcgataag    4020
tcgtgtctta ccgggttgga ctcaagacga tagttaccgg ataaggcgca gcggtcgggc    4080
tgaacggggg gttcgtgcac acagcccagc ttggagcgaa cgacctacac cgaactgaga    4140
tacctacagc gtgagctatg agaaagcgcc acgcttcccg aagggagaaa ggcggacagg    4200
tatccggtaa gcggcagggt cggaacagga gagcgcacga gggagcttcc agggggaaac    4260
gcctggtatc tttatagtcc tgtcgggttt cgccacctct gacttgagcg tcgatttttg    4320
tgatgctcgt caggggggcg gagcctatgg aaaaacgcca gcaacgcggc ctttttacgg    4380
ttcctggcct tttgctggcc ttttgctcac atgttcttc ctgcgttatc ccctgattct    4440
gtggataacc gtattaccgc ctttgagtga gctgataccg ctcgccgcag ccgaacgacc    4500
gagcgcagcg agtcagtgag cgaggaagcg gaagagcgcc caatacgcaa accgcctctc    4560
cccgcgcgtt ggccgattca ttaatgcagc agctgcgcgc tcgctcgctc actgaggccg    4620
cccgggcaaa gcccgggcgt cgggcgacct ttggtcgccc ggcctcagtg agcgagcgag    4680
cgcgcagaga gggagtggcc aactccatca ctaggggttc cttgtagtta atgattaacc    4740
cgccatgcta cttatctacg tagccatgct ctaggacatt gattattgac tagtggagtt    4800
ccgcgttaca taacttacgg taaatggccc gcctggctga ccgcccaacg acccccgccc    4860
attgacgtca ataatgacgt atgttcccat agtaacgcca atagggactt tccattgacg    4920
tcaatgggtg gagtatttac ggtaaactgc ccacttggca gtacatcaag tgtatcatat    4980
gccaagtacg ccccctattg acgtcaatga cggtaaatgg cccgcctggc attatgccca    5040
gtacatgacc ttatgggact ttcctacttg gcagtacatc tacgtattag tcatcgctat    5100
taccatggtc gaggtgagcc ccacgttctg cttcactctc cccatctccc cccctcccc    5160
acccccaatt ttgtatttat ttatttttta attattttgt gcagcgatgg gggcgggggg    5220
ggggggggc gcgcgccagg cggggcgggg cggggcgagg ggcggggcgg ggcgaggcgg    5280
agaggtgcgg cggcagccaa tcagagcggc gcgctccgaa agtttccttt tatggcgagg    5340
cggcggcggc ggcggcccta taaaaagcga agcgcgcggc gggcgggagt cgctgcgcgc    5400
tgccttcgcc ccgtgcccg ctccgccgcc gcctcgcgcc gcccgccccg gctctgactg    5460
accgcgttac taaaacaggt aagtccggcc tccgcgccgg gttttggcgc ctcccgcggg    5520
cgcccccctc ctcacggcga gcgctgccac gtcagacgaa gggcgcagcg agcgtcctga    5580
tccttccgcc cggacgctca ggacagcggc ccgctgctca taagactcgg ccttagaacc    5640
ccagtatcag cagaaggaca ttttaggacg ggacttgggt gactctaggg cactggtttt    5700
ctttccagag agcggaacag gcgaggaaaa gtagtcccct tcggcgatt ctgcggaggg    5760
atctccgtgg ggcggtgaac gccgatgatg cctctactaa ccatgttcat gttttctttt    5820
tttttctaca ggtcctgggt gacgaacagg gtaccgccac catgagggc atgaagctgc    5880
tggggcgct gctggcactg gcggcctac tgcaggggc cgtgtccatg gcgctgtgga    5940
tgcgcctgct gccgctgctg gcgctgctgg cgctgtgggg cccggatccg gcggcggcgt    6000
ttgtgaacca gcatctgtgc ggcagccatc tggtggaagc gctgtatctg gtgtgcggac    6060
aacgcggctt tttttatacc ccgaaaaccc gccgcgaagc ggaagatctg caggtgggcc    6120
aggtggaact gggcggcggc ccgggcgcgg gcagcctgca gccgctgcg ctggaaggca    6180
gcctgcagaa acgcggcatt gtggaacagt gctgcaccag catttgcagc ctgtatcagc    6240
tggaaaacta ttgcaacggg cggatcaggc ggatcaccca atcttgtgaa caaaactcac    6300
acatgcccac cgtgcccagc acctgaactc ctggggggac cgtcagtctt cctcttcccc    6360
ccaaaaccca aggacaccct catgatctcc cggaccctg aggtcacatg cgtggtggtg    6420
gacgtgagcc acgaagaccc tgaggtcaag ttcaactggt acgtggacgg cgtggaggtg    6480
cataatgcca agacaaagcc gcgggaggag cagtacaaca gcacgtaccg tgtggtcagc    6540
gtcctcaccg tcctgcacca ggactggctg aatggcaagg agtacaagtg caaggtctcc    6600
aacaaagccc tcccagcccc catcgagaaa accatctcca aagccaaagg gcagccccga    6660
gaaccacagg tgtacaccct gcccccatcc cgggaggaga tgaccaagaa ccaggtcagc    6720
ctgacctgcc tggtcaaagg cttctatccc agcgacatcg ccgtggagtg ggagagcaat    6780
gggcagccgg agaacaacta caagaccacg cctcccgtgt tggactccga cggctccttc    6840
ttcctctaca gcaagctcac cgtggacaag agcaggtggc agcaggggaa cgtcttctca    6900
tgctccgtga tgcatgaggc tctgcacaac cactacacgc agaagagcct ctccctgtct    6960
ccgggtaaat ag                                                        6972
```